United States Patent [19]
Blake et al.

[11] Patent Number: 5,377,283
[45] Date of Patent: Dec. 27, 1994

[54] CONFIGURATION CONTROL OF MODE COUPLING ERRORS

[75] Inventors: James N. Blake, College Station, Tex.; John R. Feth, Phoenix; Bogdan Szafraniec, Cave Creek, both of Ariz.

[73] Assignee: Honeywell Inc., Minneapolis, Minn.

[21] Appl. No.: 49,185

[22] Filed: Apr. 16, 1993

Related U.S. Application Data

[63] Continuation-in-part of Ser. No. 890,938, May 29, 1992, abandoned.

[51] Int. Cl.$^5$ ............................................. G02B 6/26
[52] U.S. Cl. .................................. 385/11; 385/12; 356/350; 250/227.7
[58] Field of Search .................... 385/1, 11, 12, 13, 14, 385/27, 31, 32; 356/350, 351; 250/227.11, 227.17, 227.21, 227.24

[56] References Cited

U.S. PATENT DOCUMENTS

| | | | |
|---|---|---|---|
| 4,354,760 | 10/1982 | Schiffner | 356/350 |
| 4,529,312 | 7/1985 | Pavleth et al. | 356/350 |
| 4,529,313 | 7/1985 | Petermann et al. | 356/350 |
| 4,712,306 | 12/1987 | Cahill et al. | 33/304 |
| 4,787,741 | 11/1988 | Udd et al. | 356/35.5 |
| 4,881,817 | 11/1989 | Kim et al. | 356/350 |
| 4,997,282 | 3/1991 | Pavlath | 356/350 |
| 5,046,808 | 9/1991 | Chang | 385/13 |
| 5,046,848 | 9/1991 | Udd | 356/345 |
| 5,136,667 | 8/1992 | Ohno et al. | 385/11 |
| 5,187,757 | 2/1993 | Ohno et al. | 385/11 |

FOREIGN PATENT DOCUMENTS

| | | |
|---|---|---|
| 0260885 | 3/1988 | European Pat. Off. . |
| 0522843A2 | 7/1992 | European Pat. Off. . |
| 0474389A1 | 8/1992 | European Pat. Off. . |
| 0474389 | 11/1992 | European Pat. Off. . |
| 3115804C2 | 4/1992 | Germany . |

OTHER PUBLICATIONS

Bohm et al., "Performance of Lyot Depolarizers with Birefringent Single-Mode Fibers", *Journal of Lightwave Technology*, vol. LT-1, No. 1, Mar. 1983 pp. 71-74.

"Polarization and Depolarization in the Fiber-Optic Gyroscope," R. Ulrich, *Fiber-Optic Rotation Sensors and Related Technologies*, pp. 52-77 (1982).

"Birefringence and Polarization Effects in Fiber Gyroscopes," G. A. Pavlath et al. *Applied Optics*, vol. 21 (10), pp. 1752-1757 (1982).

"Intensity-Dependent Nonreciprocal Phase Shift in Fiber-Optic Gyroscopes for Light Sources with Low Coherence," *Optics Letters*, vol. 7 (12), pp. 623-625 (1982).

"The Temporal Coherence of Various Semiconductor Light Sources Used in Optical Fiber Sensors," R. Epworth, *Fiber-Optic Rotation Sensors and Related Technology*, Published by Springer-Verlag, Berlin, Germany, 1982, pp. 237-244.

"Depolarization in a Single-Mode Optical Fiber," W. K. Burns et al, *Journal of Lightwave Technology*, vol. LT-1, No. 1, Mar. 1983, pp. 44-50.

"Performance of Lyot Depolarizers with Birefringent Single-Mode Fibers," K. Bohm et al, *Journal of Lightwave Technology*, vol. LT-1, No. 1, Mar. 1983, pp. 71-74.

"Depolarised Broadband Source," R. P. Moeller et al, *Electronics Letters*, vol. 19, No. 5, Mar. 3, 1983, pp. 187-188.

(List continued on next page.)

*Primary Examiner*—Akm E. Ullah
*Attorney, Agent, or Firm*—John G. Shudy, Jr.

[57] ABSTRACT

An optical fiber rotation sensor having an ordinary single mode fiber coil with a depolarizer in series therewith configured with component optical path lengths therein and birefringent axes relationships therein chosen with respect to the source autocorrelation. Amplitude related phase errors due to polarization mode coupling can be eliminated or reduced economically, and signal fading can be substantially prevented.

43 Claims, 12 Drawing Sheets

OTHER PUBLICATIONS

"Degree of Polarization in the Lyot Depolarizer," W. K. Burns, *Journal of Lightwave Technology*, vol LT-1, No. 3, Sep. 1983, pp. 475-479.

"Phase Error Bounds of Fiber Gyro with Imperfect Polariser/Depolariser," *Electronics Letters*, vol. 20 (8), pp. 330-332 (1984).

"Degree of Polarization in Jointed Fibers: the Lyot Depolarizer," K. Mochizuki, *Applied Optics*, vol. 23, No. 19, Oct. 1, 1984-3288.

"Fiber Gyroscopes with Birefringence Modulation," S. L. A. Carrara et al, *Proceedings of SPIE, Fiber Optic Gyros: 10th Anniversary Conference*, vol. 719, (1986), pp. 45-52.

"Bias Reduction by Polarisation Dispersion in the Fibre-Optic Gyroscope," E. Jones et al, Electronics Letters, vol. 22(1), pp. 54-56 (1986).

"The Depolarized Fiber-Optic Gyro for Future Tactical Applications," M. Bramson, Proceedings of SPIE: Fiber Optic Laser Sensors VIII, vol. 1367, (1990) pp. 155-160.

"Polarization Noise Reduction in Optical Fiber Sensors," R. T. de Carvalho et al, *Proceedings of the 12th International Measurement Conference*, Beijing, China, Sep. 1991.

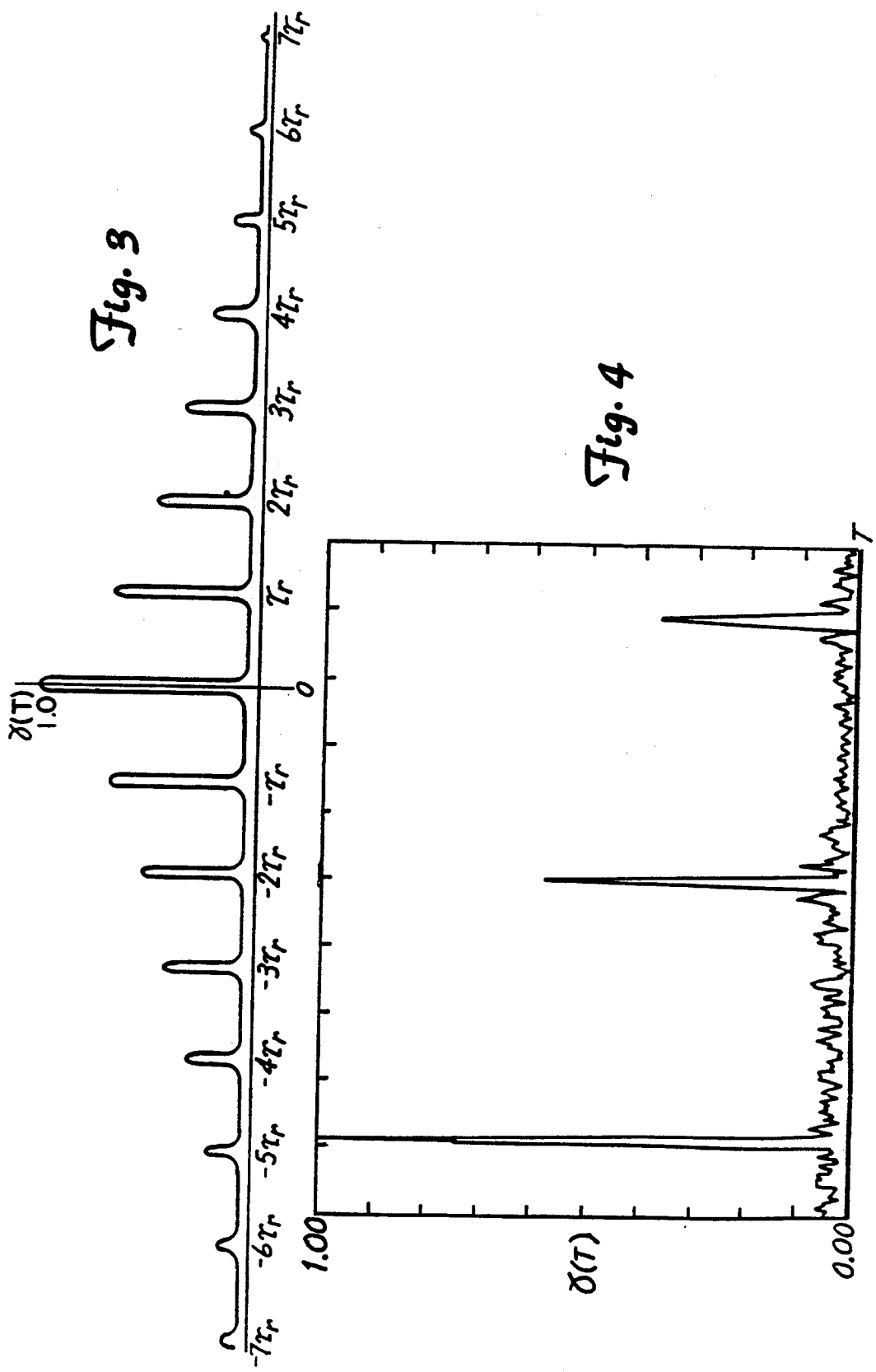

CONFIGURATION CONTROL OF MODE COUPLING ERRORS

This is a continuation-in-part of application Ser. No. 07/890,938, filed on May 29, 1992, now abandoned.

BACKGROUND OF THE INVENTION

The present invention relates to fiber optic gyroscopes used for rotation sensing and, more particularly, to interferometric fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates which can be a problem in other types of optical gyroscopes.

There are various forms of optical inertial rotation sensors which use the well-known Sagnac effect to detect rotation about a pertinent axis thereof. These include active optical gyroscopes which have the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes, such as low rotation rate lock-in, bias drift and some causes of scale factor variations.

Interferometric fiber optic gyroscopes typically employ a single spatial mode optical fiber of a substantial length, typically 100 to 2,000 meters, which length is formed into a coil by being wound on a core to form a closed optical path. An electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce a phase shift between those waves in interferometric fiber optic gyroscopes in either rotation direction, i.e. the well-known Sagnac effect. The use of a coiled optical fiber is desirable because the amount of phase difference shift due to rotation, and so the output signal, depends on the length of the entire optical path through the coil traversed by the two opposing directional electromagnetic waves. Thus, a relatively large phase shift difference can be obtained in a long optical fiber, but also in the relatively small volume taken by that fiber in its being coiled.

The output current from the photodetector system photodiode in response to the opposite direction traveling electromagnetic waves impinging thereon, after passing through the coiled optical fiber, follows a raised cosine function, that is, the output current depends on the cosine of the phase difference between these two waves. Since a cosine function is an even function, such an output function gives no indication as to the relative direction of the phase difference shift, and so no indication as to the direction of the rotation about the axis. In addition, the rate of change of a cosine function near zero phase value is very small, and so such an output function provides very low sensitivity for low rotation rates.

Because of these unsatisfactory characteristics, the phase difference between the two electromagnetic waves is usually modulated by placing an optical phase modulator on one side of the coiled optical fiber. As a result, one of the opposite direction propagating waves passes through the modulator just after entering the coil, while the other wave, traversing the coil in the opposite direction, passes through the modulator just before exiting the coil. In addition, a phase sensitive demodulator is provided to receive the photodetector output current. Both the optical phase modulator and the phase sensitive demodulator are typically operated by a sinusoidal signal generator, but other waveform types of a similar fundamental frequency can also be used.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and the maximum rate of change of signal value as a function of rotation rate near a zero rotation rate. That is, the signal has its maximum sensitivity near zero phase shift so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator is a substantial improvement over the characteristics of the output current of the photodetector.

Reducing erroneous phase shifts from other sources is, however, a difficult problem in fiber optic gyroscopes. Avoidance of erroneous phase shifts in the electromagnetic waves reaching the photodetector requires that each of the interfering waves, at least those of the same wavelength, have traveled over the same optical path, that is, the electromagnetic wave of a wavelength associated with a clockwise direction of travel from the coil and the one of the same wavelengths associated with the counterclockwise direction of the coil each must travel over an indistinguishable optical path from the source to the photodetector absent any rotation of the coil. A system with this characteristic is often termed "reciprocal." At a minimum, the optical paths corresponding to the common wavelength clockwise electromagnetic waves and counterclockwise electromagnetic waves must be identical on an optical ray tracing basis in the absence of rotation. In meeting this requirement, a "minimum reciprocal configuration" has been found to be as shown in FIG. 1 in connection with the coiled optical fiber, 10, shown there. Coiled optical fiber 10 in FIG. 1 is, as indicated above, wound about a core or spool using primarily an ordinary single spatial mode optical fiber wrapped about an axis thereof which becomes the axis about which rotation is to be sensed. The use of such a single mode fiber allows the paths of the electromagnetic waves to be defined nearly uniquely, and further allows the phase fronts of such a guided wave to be defined uniquely. This greatly aids in maintaining reciprocity.

However, the optical fiber in coil 10 is not entirely ordinary single spatial mode optical fiber because of a depolarizer included relatively near one end thereof, although this depolarizer could be located anywhere in coil 10. The ordinary single spatial mode optical fiber used in a very great fraction of coil 10 is subject to having changing birefringence therein introduced by mechanical stress changing with temperature, and by the Faraday effect in magnetic fields. This changing birefringence will lead to randomly varying polarization rotations of the beams passing therethrough even to the extent of being so great that the interference of those beams at the photodetector vanishes. One method for solving this problem is the use of so-called polarization-maintaining optical fiber exhibiting a high birefringence in place of the ordinary single spatial mode fiber without such marked birefringence. The significant birefringence constructed into such a fiber leaves birefringence changes from other sources being relatively insignificant.

However, such polarization-maintaining optical fiber is relatively expensive so that there is a substantial desire to be able to use just ordinary single spatial mode optical fiber. That desire can be satisfied with the use of a depolarizer, 10', located within coil 10 and shown in FIG. 1 to be positioned near one end in coil 10 for ease of winding that coil. Such a depolarizer tends to closely equalize the electromagnetic wave intensities in, and decorrelate, the two orthogonal polarization modes permitted therein and overwhelm the effects of the randomly changing birefringence in the ordinary single spatial mode fiber in the rest of coil 10 thus preventing such opposing direction beam interference at the optical subsystem output photodiode from vanishing.

Such a depolarizer can be formed with two lengths of polarization-maintaining fiber, 10" and 10"', with the latter being substantially twice as long as the former to thereby cause approximately twice the optical delay caused by the other. In each of these lengths, there is a high refractive index axis, i.e. the slower propagation axis or the "x" axis, and a low refractive index axis, i.e. the faster propagation axis or "y" axis, which are orthogonal to one another. The lengths are joined in a fused splice in such a manner that the "x" axis in one length is approximately equidistant from the "x" and "y" axes in the other length, i.e. the "x" axis in the former is at 45° from each of the "x" and "y" axes in the other. The opposite ends of each of the depolarization fiber lengths are then spliced by fusing to corresponding portions of the single spatial mode ordinary optical fiber in coil 10 so that a beam of light, propagating through any of the depolarizer or either of the single spatial mode ordinary optical fiber portions, substantially propagates through all of them.

Coil 10 with depolarizer 10' is typically wound on a spool using the "quadripole" technique so that similarly located points in the coil with respect to center are near one another. This reduces the effects of time-varying phenomena, such as thermal gradients, from affecting opposite direction propagating electromagnetic waves differently from one another.

The electromagnetic waves which propagate in opposite directions through coil 10 are provided from an electromagnetic wave source, or light source, 11, in FIG. 1. This source is typically a superluminescent diode or, alternatively, a laser diode operating below its threshold for stimulated emission, either of which provide electromagnetic waves typically in the near-infrared part of the spectrum with a typical wavelength of 830 nm. Source 11 must have a short coherence length for emitted light to reduce the phase shift difference errors between these waves due to Rayleigh scattering at scattering sites in coil 10. Because of the nonlinear Kerr effect in coil 10, differing intensities in the two propagating waves can also lead to phase difference shifts therebetween. This situation can also be aided by the use of a short coherence length source for source 11 which leads to modal phase shift canceling. Rayleigh scattering and the nonlinear Kerr effect lead to non-reciprocal phase shifts between the counter-rotating electromagnetic waves in coil 10 even in a minimum reciprocal configuration. A superluminescent diode, or a laser diode operating below threshold, each have a wide emission spectrum compared to that of a laser diode operating past its threshold in the stimulated emission mode of operation.

Between laser diode 11 and fiber optic coil 10 in FIG. 1 there is shown an optical path arrangement formed by an extension of the ends of the optical fiber forming coil 10 to some optical coupling components which separate the overall optical path into several optical path portions. A portion of polarization-maintaining optical fiber is positioned against a face of laser diode 11 at a location of optimum light emission therefrom, a point from which it extends to a first optical directional coupler, 12, to be joined thereto. If, on the other hand, coupler 12 is formed by fusing two optical fibers together in a coupling region, either a pair of polarization-maintaining optical fibers or a pair of ordinary single spatial mode optical fibers, the excess length of one of the optical fibers may be positioned against diode 11 to provide this optical path between diode 11 and this wave coupling region of coupler 12, or the excess length may be spliced to another polarization-maintaining or ordinary single mode optical fiber, respectively, extending from diode 11.

Optical directional coupler 12 has light transmission media therein which extend between four ports, two on each end of that media, and which are provided on each end of coupler 12 in FIG. 1. One of these ports has the optical fiber extending from laser diode 11 positioned thereagainst (or vice versa for a fused coupler, i.e. a fiber extending from the coupler coupling region to be positioned against the emitting face of diode 11). At the other port on the same end of optical coupler 12 there is shown a further optical fiber positioned thereagainst (or alternatively extending from the fused coupler if used) which extends to be positioned against a photodiode, 13, which is electrically connected to a photodetection system, 14. This optical fiber may be a polarization-maintaining optical fiber or it may be an ordinary single spatial mode optical fiber. In practice, as indicated above, coupler 12 may be formed from fused lengths of such optical fiber so that the remaining lengths past the fused portion, or the light coupling region therein, extend either all the way to laser diode 11 and photodiode 13, or are spliced to other optical fibers extending therefrom.

Photodiode 13 detects electromagnetic waves, or light waves, impinging thereon from the portion of the optical fiber positioned thereagainst (or extending thereto) and provides a photocurrent in response. This photocurrent, as indicated above, in the situation of two nearly coherent electromagnetic waves impinging thereon, follows a raised cosine function in providing a photocurrent output which depends on the cosine of the phase difference between such a pair of electromagnetic waves. Photodiode 13 is operated in either the photovoltaic mode or the photoconductive mode, as needed, into an amplifier circuit of appropriate impedance to provide a photocurrent which is substantially a linear function of the impinging radiation intensity, and is typically a p-i-n photodiode.

Optical directional coupler 12 has another polarization-maintaining optical fiber against a port at the other end thereof which extends to a polarizer, 15. Again, the excess length in an optical fiber past the coupling region in coupler 12 may have the end thereof extend all the way to polarizer 15, or may be spliced to another optical fiber portion extending from polarizer 15 with the principal birefringence axes in each such portion of optical fiber closely aligned to those of the other. At the other port on that same side of coupler 12 there is a non-reflective termination arrangement, 16, involving the excess length of one of the optical fibers fused together forming coupler 12 or, again, another optical fiber spliced to such an excess length. This optical fiber leading to arrangement 16 can again be polarization-maintaining optical fiber or ordinary single spatial mode optical fiber.

Directional optical coupler 12, in receiving electromagnetic waves, or light, at any port, or at any end of an excess portion of optical fiber extending past the coupling region therein, transmits such electromagnetic waves so that a preselected fraction thereof, typically one-half, appears at each of the two ports, or ends of the two excess optical fiber lengths past the coupling region, which are at the opposite end of coupler 12 from that having the incoming port or excess optical fiber length receiving the incoming waves. On the other hand, no electromagnetic waves are transmitted to the port or excess fiber length which is on the same end of coupler 12 as is the incoming port. The polarization of the incoming electromagnetic waves with respect to the principal refringent axes at the input port can be fairly well preserved at the corresponding axes of the two output ports if coupler 12 is formed of two portions of polarization-maintaining optical fiber with the principal axes suitably aligned, but there will be some coupling of waves between axes in the coupling region of the coupler. If a pair of ordinary single spatial mode optical fiber portions are fused together to form coupler 12, the polarization of the incoming electromagnetic waves with respect to the principal birefringent axes in one component fiber can be fairly well preserved through the coupling region to the other fiber, but there may be substantial coupling thereafter even before coupled waves reach the output port of the ordinary single spatial mode optical fiber.

Polarizer 15 is used because, even in a single spatial mode optical fiber, two polarization modes are possible for electromagnetic waves passing through such a fiber along orthogonal axes. Thus, polarizer 15 is provided for the purpose of transmitting the electromagnetic wave component along one of these axes, for one of these polarization modes, between the optical fibers connected to the ports on either end thereof, i.e. between the "x" slow axis of the polarization-maintaining optical fiber connected thereto to provide a propagation path to and from directional coupler 12 and the ordinary single spatial mode optical fiber placed against the port on the opposite side thereof to be described below. At the same time, polarizer 15 substantially blocks transmission from the "y" or fast axis of the polarization-maintaining optical fiber extending between it and directional coupler 12 and the ordinary single spatial mode fiber on the opposite side thereof. Hence, the slow axis of the polarization-maintaining optical fiber extending from coupler 12 is aligned with the transmission axis of polarizer 15 at a port on one side thereof, or with the slow principal birefringent axis of an optical fiber connection portion extending from polarizer 15 that is closely aligned with the transmission axis of the polarizer. The fast axis of this optical fiber is then closely aligned to the blocking axis at the port of the polarizer, or to the fast principal birefringent axis of a connection optical fiber extending therefrom which is closely aligned with a polarizer blocking axis.

Polarizer 15, however, is not capable of entirely blocking electromagnetic waves in the one state of polarization that it is intended to block. This shortcoming in the extinction coefficient thereof leads to a non-reciprocity between two opposite direction traveling waves over the optical paths they follow, and so to a non-reciprocal phase shift occurring between them which can vary with the conditions of the environment in which the polarizer and the remainder of the system of placed.

Positioned against the port of polarizer 15 on the end opposite that connected with optical directional coupler 12, or spliced to a polarization-maintaining optical fiber length extending therefrom, is an ordinary single spatial mode optical fiber which extends to a further optical directional coupler, 17, a coupler which is typically formed of two portions of such ordinary single spatial mode fiber. Directional coupler 17 also transmits received electromagnetic waves so that a preselected fraction thereof, again typically one-half, appears at each of the two ports, or the ends of the two excess optical fiber lengths past the coupling region, which are at the opposite end of coupler 17 from that having the incoming port or having the excess optical fiber length receiving the incoming waves. Again, no electromagnetic waves are transmitted to the port or excess fiber length which is on the same end of coupler 17 as the incoming port. The polarization of incoming electromagnetic waves at an input port will not be very well preserved at the corresponding pair of output ports. Alternatively, directional coupler 17 could be formed using a pair of portions of polarization-maintaining optical fiber, but this will lead to somewhat different optical performance in the optical subsystem portion of FIG. 1 which would be similar to the performance of such a subsystem if directional coupler 17 was alternatively formed in an integrated optic chip.

If directional coupler 17 is formed by fusing together two optical fibers, the excess portion of one of the optical fibers therein past the coupler region therein may extend all the way to the appropriate port on one end of polarizer 15. In an alternative, this excess portion may be spliced to an ordinary single spatial mode optical fiber portion extending from polarizer 15 (or to a polarization-maintaining fiber portion extending therefrom).

The second port on the same end of coupler 17 from which the first port is coupled to polarizer 15 is connected in a non-reflective termination arrangement, 18, using a further ordinary single spatial mode optical fiber portion or the excess length of an optical fiber associated with that port beyond the coupling region in coupler 17 in the situation of fused optical fibers. One of the ports on the opposite end of coupler 17 is connected to a further optical component in the optical path portion extending thereto from one end of the optical fiber in coil 10. The other port on that end of coupler 17 is directly coupled to the remaining end of optical fiber coil 10 near which depolarizer 10' is located, and this coupling is typically accomplished through a splice between the excess length of an optical fiber past the coupling region in coupler 17 and the optical fiber in coil 10.

Between coil 10 and coupler 17, on the side of coil 10 opposite the directly connected side thereof, there is provided an optical phase modulator, 19. Optical phase modulator 19 has a port on either end of the transmission media contained therein which occur in FIG. 1 at the opposite ends of that phase modulator. The ordinary single spatial mode optical fiber from coil 10 is positioned against a port of modulator 19. The ordinary single spatial mode optical fiber extending from coupler 17 is positioned against the port on the opposite end of modulator 19.

Optical phase modulator 19 can be of the variety formed by wrapping an optical fiber portion around a piezoelectric cylinder so that the fiber may be stretched by the application of voltage to that cylinder, or this phase modulator may be formed as an optical integrated chip using a substrate of lithium niobate, for instance, with metallic depositions provided thereon as electrodes and positioned adjacent a waveguide provided therein. Such depositions typically result in plate-like electrode structures on the substrate to both provide electrical contacts to the modulator and a means through which varying electric fields can be established in the waveguide to result in the necessary modulation of the phase of electromagnetic waves passing through that waveguide.

Optical phase modulator 19 is thus capable of receiving electrical signals on these plates to cause the introduction of phase differences in electromagnetic waves transmitted therethrough by changing the index of refraction of the transmission medium, or transmission media, because of the resulting electric fields established therein to thereby change the effect of optical path lengths experienced by such waves. Optical phase modulators constructed in optical integrated circuit form have a large bandwidth, i.e. are able to provide phase changes following a waveform that has substantial high frequency content. Note also that polarizer 15, and source and loop optical directional couplers 12 and 17, could also be formed in similar integrated optic chips, including possibly being formed in a common such chip.

Directional optical coupler 17 serves as a beam-splitting apparatus in that electromagnetic waves emitted from source 11 that are transmitted through coupler 12 and polarizer 15 to be received by coupler 17 are there split in approximately half with a corresponding one of the resulting portions passing out of each of the two ports on the opposite end of coupler 17. Out of one port on that opposite end of coupler 17 the corresponding electromagnetic wave portion passes through depolarizer 10', the rest of optical fiber coil 10, through optical phase modulator 19 and back to coupler 17. A portion of that electromagnetic wave passes through the port of coupler 17 leading to polarizer 15 and then to coupler 12 where a part of the remainder of the wave portion is transmitted to photodiode 13.

The other portion of the electromagnetic wave after the split in coupler 17 leaves that other port on the coil 10 end of coupler 17 to first pass through optical phase modulator 19, through most of optical fiber coil 10, and then through depolarizer 10' to reenter coupler 17 and, again, from there follow the same path as the first portion previously described to finally impinge in part on photodiode 13. In the presence of modulation provided by phase modulator 19, and in the presence of any rotation of coil 10 about its axis, or because of effects in coupler 17, some of the energy of the combined waves will be lost through non-reflective arrangement 18.

In an interferometric fiber optic gyroscope using polarization-maintaining optical fiber for coil 10 without a depolarizer, the electromagnetic waves passing through coil 10 are all intended to take the same optical path. In the system of FIG. 1, however, the nature of the ordinary single spatial mode optical fiber used in coil 10 gives rise to random occurrences of birefringence therein induced by various causes, including stress change due to temperature changes, which result in the possibility of different optical paths being available for the waves to propagate over. Depolarizer 10' forces waves to differing polarization states periodically over wavelength, and so to corresponding different optical paths. Thus, the polarization history of electromagnetic waves through coil 10 and depolarizer 10' together is wavelength dependent. Nevertheless, any waves reaching the transmission axis of polarizer 15 at a point in time will have had the same polarization history. Assuming then that depolarizer 10' distributes the optical waves between the polarization states uniformly, depolarizer 10' acts to equalize the wave energy in each of the optical paths.

As indicated above, photodiode 13 provides an output current proportional to the intensity of the combined electromagnetic waves, or light waves, impinging thereon dependent on the phase difference therebetween. The arrangement of FIG. 1 leads to the electromagnetic waves propagating in opposite directions through coil 10 over various optical paths to in part reach photodiode 13 so that the intensity thereon is an average of the electromagnetic waves traveling in both directions over each polarization determined optical path, i.e. averaged over the wavelengths present, but including primarily only those waves propagating over those optical paths over which returning waves have a polarization at polarizer 15 which is substantially passed by that polarizer. That is, the returning waves included in the averaging process are primarily just those following optical paths which extend through the transmission axis of polarizer 15. Corresponding photocurrent from photodiode 13 follows a raised cosine function in being based on the cosine of the average phase difference between portions of each of the electromagnetic waves propagating in opposite directions in coil 10 impinging thereon taken over the wavelengths present therein. This relationship follows because the photocurrent depends on the resulting optical intensity of the pairs of opposite direction propagating electromagnetic waves incident on photodiode 13 which intensity will vary depending on how much constructive or destructive interference occurs between these waves at that diode.

This interference of waves will change with rotation of the coiled optical fiber forming coil 10 about its axis as such rotation introduces a phase difference shift between the waves because of the Sagnac effect. Further, additional phase difference shifts will be introduced by optical phase modulator 19 as will be described in connection with the electrical system shown in the remainder of FIG. 1.

The electrical system portion of FIG. 1 shows an open loop fiber optical gyroscope system, but could also be converted to a closed loop fiber optic gyroscopic system, i.e. using feedback around the system shown. This would be accomplished by having the electrical system provide a feedback signal based on the output of the system shown in FIG. 1 to control a further optical phase modulator inserted in the optical path next to modulator 19, or to additionally control modulator 19. Optical phase modulator 19 is of the kind described above and is used in conjunction with a phase sensitive demodulator, or phase detector, for converting the output signal of photodiode 13 and photodetector system 14, following a cosine function, to a signal following a sine function. Following such a sine function provides, in that output signal, information both as to rate of rotation and as to direction of that rotation about the axis of coil 10. Modulator 19 is operated by a sinusoidal signal provided at the output of a bias modulation signal generator, 20, which also provides this signal to operate a phase detector which, as indicated, is a phase sensitive demodulator.

Thus, the output signal from photodetector system 14, including photodiode 13, is provided to an amplifier, 21, where it is amplified and passed through a filter, 22, to a phase detector, 23. The phase sensitive demodulator serving as phase detector 23 is a well-known device. Such a phase sensitive demodulator senses changes in the first harmonic, or fundamental frequency, of signal generator 20 to provide an indication of the relative phase of the pair of electromagnetic waves impinging on photodetector 13. This information is presented by phase detector 23 in an output signal following a sine function, i.e. the sine of the phase difference between the two electromagnetic wave portions impinging on photodiode 13.

Bias modulation signal generator 22, in modulating the electromagnetic wave portions in the optical path at a frequency set by the output signal supplied thereby as described above, also generates a strong second harmonic component in photodetector system 14. Filter 22 is a notch filter for removing this second harmonic component.

In operation, the phase difference changes in the two opposite direction propagating electromagnetic waves passing through coil 10 in the optical paths therethrough to reach photodiode 13 will lead to average net phase difference changes which will be relatively small, and which will vary relatively slowly compared to the phase difference changes due to optical phase modulator 19 and bias modulator signal generator 20. Any average phase difference shift due to the Sagnac effect will be merely shift the average phase difference between the electromagnetic waves, and the output signal from phase sensitive demodulator 23, after photodiode signal demodulation therein, will depend on the sine of this phase difference multiplied by an amplitude scaling factor set by the modulation of the waves due to phase modulator 19 and signal generator 20. This synchronous demodulation thus substantially extracts from the photodiode output signal the amplitude of the sinusoidal modulation frequency component at the modulation frequency introduced by signal generator 20 and modulator 19, which includes the result of any rotation of coil 10 about its axis, to provide the demodulator output signal.

As indicated above, however, additional phase shifts between the counter-propagating electromagnetic waves can be introduced even with the fiber optic gyroscope system in a minimum reciprocal configuration by various effects occurring therein. Typically, a significant source of such non-reciprocal phase shifts from other than the Sagnac effect is the following of different optical paths by the two different polarization components of the counter-propagating electromagnetic waves leading to phase shift errors in the output indistinguishable from Sagnac phase shifts.

Two types of such phase shift errors have been found to occur, as will be shown below. Amplitude type phase error occurs where electromagnetic waves that have passed through along the blocking axis of polarizer 15, because of polarizer imperfections, coherently mix in any of the loop optical components, beginning with loop coupler 17 and continuing beyond in FIG. 1 to include coil 10, with waves that have been passed along the transmission axis of polarizer 15. Since the electromagnetic waves emitted by source 11 along two linear polarization axes are uncorrelated, as will be set out below, and since these two polarization components are attempted to be kept separated until they reach polarizer 15, the conditions leading to amplitude type error will only occur through a failure to keep the components separated because of some coupling point being present ahead of polarizer 15 where such a polarization component can be partially coupled into the optical path of the other. Such coupling points include splice and interface locations in the optical paths because of the interruption introduced by such changes.

Intensity type phase error occurs when electromagnetic wave polarization components that have passed along the transmission axis of polarizer 15 are coupled in any of these same loop optical components to the polarization components which passed along the blocking axis, again due to polarizer imperfections, and thereafter reaches the blocking axis of polarizer 15 to interfere with the waves having the same history traveling in the opposite direction through coil 10. A phase shift error in the opposite direction occurs for waves doing the opposite, that is, passing along the blocking axis of polarizer 15 and being coupled to reach the transmission axis. Thus, these phase shift errors are offsetting of one another to the extent of the smaller of the two.

However, these unwanted phase shift errors are reduced or eliminated by the presence of depolarizer 10' in the system of FIG. 1 leading to the uniform (though not necessarily coherent) mixing of the electromagnetic wave components from the transmission and blocking axes of polarizer 15. That is, depolarizer 10' distributes portions of these incoming wave components into orthogonal polarization states such that they become thoroughly mixed at the other end of the depolarizer. The use of depolarizer 10' thus avoids the expense of using polarization-maintaining fiber throughout coil 10, but at the cost of losing in polarizer 15 approximately half of the electromagnetic wave energy entering coil 10.

All of these unwanted phase shifts would be eliminated, of course, if polarizer 15 were a perfect polarizing component permitting complete wave transmission in the transmission axis thereof and no transmission in the blocking axis thereof. However, polarizers, including polarizer 15 as indicated above, are not perfect and so are characterized by an extinction ratio, $\epsilon$, representing the fraction of incident electromagnetic wave on the polarizer in the blocking axis which is found in that same axis at the output of the polarizer. Such an imperfect polarizer, even with the presence of depolarizer 10', can lead to errors at photodiode 13 since coupling between polarization components at interfaces, splices and along the course of the ordinary single spatial mode optical fiber used in coil 10 results in effective non-reciprocal phase shifts.

Such errors in the transmission of electromagnetic waves in the system of FIG. 1 can be represented based on using a reference point between source coupler 12 and polarizer 15 in FIG. 1 since nothing fundamentally new or different will be added to these errors by the remaining propagation effects in reaching photodetector 13. This reference point will be represented as a "wavy" line in FIG. 1 at which outgoing and returning electromagnetic waves will be compared. Electromagnetic waves at this "wavy" line reference point will be represented as $E_x(t)$ and $E_y(t)$ for the components traveling along the principal birefringent axes of the polarization-maintaining optical fiber extending from this reference point to polarizer 15. The "x" designation, as indicated above, indicates the slow axis electromagnetic wave component and the "y" designation indicates the fast axis electromagnetic wave component.

The electromagnetic waves returning to the reference point after having left the reference point to traverse through coil 10 and the optical components therebetween can be written as follows:

$$\vec{\mathscr{E}}_{cw}(\nu) = G_{cw}(\nu)e^{+j\phi_r}\vec{\mathscr{E}}_i(\nu)$$

$$\vec{\mathscr{E}}_{ccw}(\nu) = G_{ccw}(\nu)e^{-j\phi_r}\vec{\mathscr{E}}_i(\nu)$$

where $\nu$ is the optical frequency. The vector $\vec{\mathscr{E}}_i(\nu)$ (designated as such through having an arrow over the top thereof) represents the electromagnetic waves leaving the reference plane to travel through coil 10 and return, and so is composed of just the two scalars $E_x(t)$ and $E_y(t)$ indicated above as occurring at the reference point but represented here by the Fourier transformation thereof, or $$\mathscr{E}_x(\nu) = \lim_{T\to\infty} \frac{1}{\sqrt{T}} \int_{-\frac{T}{2}}^{\frac{T}{2}} E_x(t)e^{j2\pi\nu t}dt$$

$$\mathscr{E}_y(\nu) = \lim_{T\to\infty} \frac{1}{\sqrt{T}} \int_{-\frac{T}{2}}^{\frac{T}{2}} E_y(t)e^{j2\pi\nu t}dt$$

where $$\vec{\mathscr{E}}_i(\nu) = \begin{bmatrix} \mathscr{E}_x(\nu) \\ \mathscr{E}_y(\nu) \end{bmatrix}$$

The transfer matrices representing the effects of the polarization-maintaining fiber, polarizer 15 and coupler 17, operating on the representation of the departing waves $\mathscr{E}_i$ from the reference point, yields the returning wave vector $\vec{\mathscr{E}}_{cw}(\nu)$ and $\vec{\mathscr{E}}_{ccw}(\nu)$, and can be written as follows:

$$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix} = G_{ccw}^T$$

The Sagnac phase shift is represented by $2\phi_r$.

As described above, the output signal provided by phase sensitive demodulator 23 depends on the total phase shift, $\Delta\phi$, occurring between the counter-propagating electromagnetic wave passing through coil 10 to reach photodetector 13. Thus, this output will depend essentially on the phase difference of the waves returning to the "wavy" line reference point which can be found from the argument of the complex matrix resulting from the product of the two waves, or $$\Delta\phi(\nu) = \arg[\vec{\mathscr{E}}_{ccw}^\dagger(\nu)\vec{\mathscr{E}}_{cw}(\nu)]$$

The "dagger" symbol $\dagger$ indicates that the Hermitian conjugate of the matrix is being used. This last equation can be rewritten using the equations above for $\vec{\mathscr{E}}_{cw}(\nu)$ and $\vec{\mathscr{E}}_{ccw}(\nu)$ and taking $\phi_r$ to be zero, i.e. no rotation of coil 10 about its axis perpendicular to the plane of the coil in FIG. 1, so only phase differences due to errors remain. Then, the phase differences, or path difference phase errors, $\Delta\phi_e$, due to polarization component path differences appear as:

$$\Delta\phi_e(\nu) = \arg[\vec{\mathscr{E}}_i^\dagger(\nu) G_{ccw}^\dagger G_{cw} \vec{\mathscr{E}}_i(\nu)]$$

Here again, the $\dagger$ indicates that the Hermitian conjugate of the matrix is being used. This last result is obtained at each optical frequency $\nu$, and so is the end result if a near monochromatic optical source is used for source 11. However, since source 11 is typically going to be a "broadband" optical source, the total error can be found only through integrating the last equation over the optical frequency although such a step is not made explicit here.

The off-diagonal elements of the transfer matrices $[G_{cw}]$ and $[G_{ccw}]$ in the system of FIG. 1 are much smaller in magnitude than the diagonal terms therein in an optical fiber based gyroscope using a polarizer despite the presence of depolarizer 10'. Since these off diagonal terms in these matrices are small, the last equation can be shown to be approximately:

$$\Delta\phi_e \approx \Delta\phi_{ampl} + \Delta\phi_{inten}$$

where:

$$\Delta\phi_{Ampl}(\nu) \triangleq$$

$$\frac{\epsilon Im\{g_{xx}^*(\nu)g_{xy}(\nu)\mathscr{E}_x^*(\nu)\mathscr{E}_y(\nu) + g_{xx}(\nu)g_{xy}^*(\nu)\mathscr{E}_x(\nu)\mathscr{E}_y^*(\nu)\}}{|g_{xx}(\nu)\mathscr{E}_x(\nu)|^2}$$

and $$\Delta\phi_{Inten}(\nu) \triangleq \frac{\epsilon^2 Im\{g_{xy}^*(\nu)g_{yx}(\nu)(|\mathscr{E}_x(\nu)|^2 - |\mathscr{E}_y(\nu)|^2)\}}{|g_{xx}(\nu)\mathscr{E}_x(\nu)|^2}$$

That is, the total phase error $\Delta\phi_e$ at any optical frequency $\nu$ can be separated into two parts, an amplitude related phase error, $\Delta\phi_{Ampl}$, and an intensity related phase error, $\Delta\phi_{Inten}$. The last two expressions show that amplitude related phase errors depend on the relative phases of the electromagnetic wave polarization components $\mathcal{E}_x(\nu)$ and $\mathcal{E}_y(\nu)$ and the first power of the polarization extinction coefficient, whereas the intensity related phase error depends on the differences in optical power in the two polarization component optical paths and the square of the polarizer extinction coefficient.

Clearly, errors can remain if $\epsilon$ has a value other than zero which it inevitably has. Thus, there is a desire for a measure or measures to reduce or eliminate such errors.

SUMMARY OF THE INVENTION

The present invention provides error reducing configurations for an optical fiber rotation sensor in which rotation information in the form of phase differences between a pair of substantially coherent electromagnetic waves entering from a polarizer to propagate in opposite directions through an ordinary single mode optical fiber coil with a depolarizer in series therewith to thereafter impinge on a photodetector after exiting through the polarizer. These configurations have component optical path lengths therein and birefringent axes relationships therein determined with respect to the autocorrelation of the source chosen for the system. As a result, amplitude related phase errors due to polarization mode coupling can be eliminated or reduced economically, and signal fading can be substantially prevented.

BRIEF DESCRIPTION OF THE DRAWINGS

FIG. 3 shows a graph describing an aspect of an electromagnetic wave source;

FIG. 4 shows a graph describing an aspect of an electromagnetic wave source;

DETAILED DESCRIPTION OF THE PREFERRED EMBODIMENTS

The errors set forth in the foregoing equations are represented too abstractly to clearly demonstrate the nature thereof. To more fully see that nature, representative transfer matrix elements describing the optical paths must be used in these equations and a better representation of the relationship between source 11 and source coupler 12 must also be used. Further, the errors must be evaluated across the spectrum of source 11.

Turning to amplitude related phase errors first, the total amplitude phase error across the optical frequency spectrum of interest, $\Delta\phi_{AmplTot}$, determined primarily by the spectral width of the electromagnetic waves emitted by source 11, is the normalized value of the error $\Delta\phi_{Ampl}$ occurring at each such included optical frequency weighted by the average optical power inserted into the system at that frequency, or $$\Delta\phi_{AmplTot} = \frac{\int |g_{xx}(\nu)\mathcal{E}_x(\nu)|^2 \Delta\phi_{Ampl}(\nu) d\nu}{\int |g_{xx}(\nu)\mathcal{E}_x(\nu)|^2 d\nu}.$$

Figure 1:
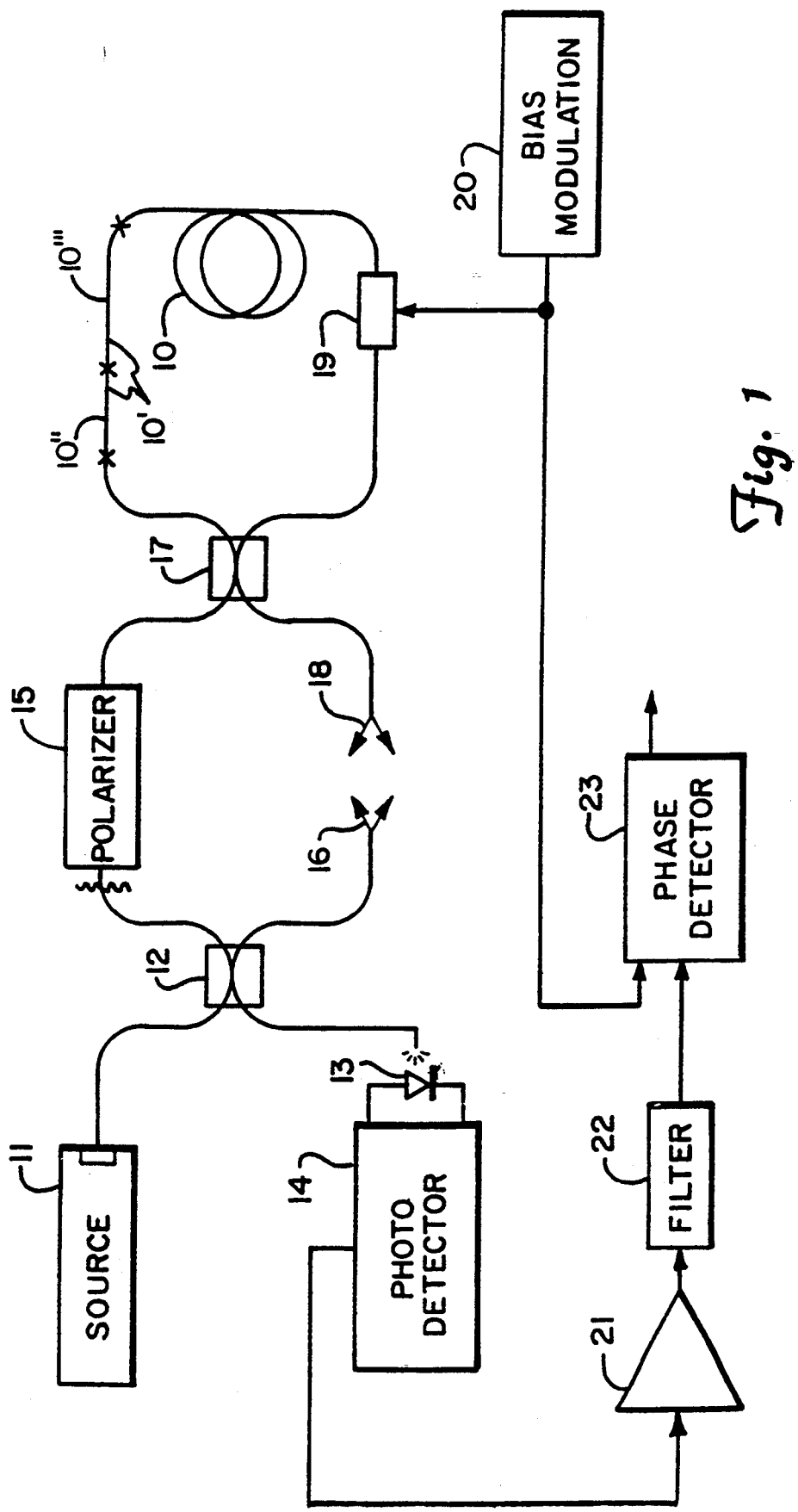
FIG. 1 shows a system schematic diagram combining a signal processing arrangement and an optical transmission path and device arrangement known in the prior art.

Here, the optical power is indicated to be introduced along the "x" principle birefringent axis in accord with the description given above for the system shown in FIG. 1. Substituting for $\Delta\phi_{Ampl}$ from the equation defined therefor above yields:

$$\Delta\phi_{Ampltot} =$$

$$\frac{\epsilon \int Im\{g_{xx}^*(\nu)g_{xy}(\nu)\mathcal{E}_x(\nu)\mathcal{E}_y(\nu) + g_{xx}(\nu)g_{yx}^*(\nu)\mathcal{E}_x(\nu)\mathcal{E}_y^*(\nu)\}d\nu}{\int |g_{xx}(\nu)\mathcal{E}_x(\nu)|^2 d\nu}$$

$$= \frac{\epsilon Im \int \{g_{xx}^*(\nu)g_{xy}(\nu)\mathcal{E}_x^*(\nu)\mathcal{E}_y(\nu) + g_{xx}(\nu)g_{yx}^*(\nu)\mathcal{E}_x(\nu)\mathcal{E}_y^*(\nu)\}d\nu}{\int |g_{xx}(\nu)\mathcal{E}_x(\nu)|^2 d\nu}$$

as the integral of the imaginary part of a complex variable over a real variable is equal to the imaginary part of the integral of that complex variable over the real variable.

Figure 2:
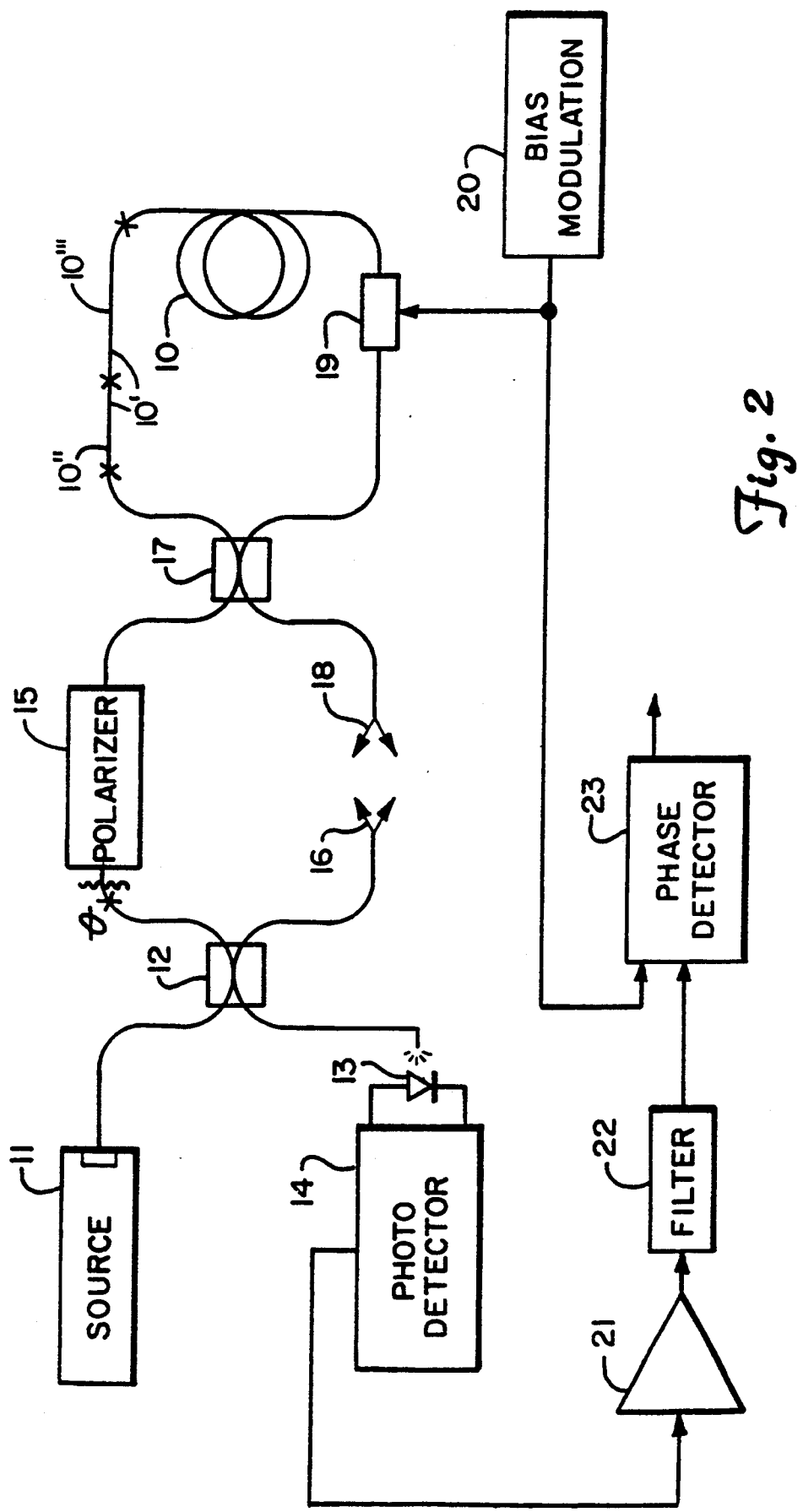
FIG. 2 shows a system schematic diagram combining a signal processing arrangement and an optical transmission path and device arrangement embodying the present invention.

The representation of source 11 and source coupler 12, and of the transfer matrix elements, needed to clarify the nature of this error, will be based on the system shown in FIG. 2 which is generally like the system of FIG. 1. There, in FIG. 2, is shown a coupling point between polarizer 15 and source coupler 12 which has been arbitrarily chosen in the optical paths of the electromagnetic waves traveling from source 11 through coil 10 and back to source coupler 12. Thus, assume that the excess polarization-maintaining optical fiber from source, or input, coupler 12 is spliced with an optical fiber portion extending from polarizer 15 to someplace between these two components. At that location, the splice is assumed to have a rotational misalignment of a value $\theta$ between the principal birefringent axes in each of the optical fibers on either side of the splice which remains after attempting to closely align the fast axes of these fibers during the formation of the splice. FIG. 2 shows the system of FIG. 1 with this rotational misalignment point indicated by a "x" on the optical path representation of such locations, and with the corresponding rotational misalignment value written adjacent thereto.

The "wavy" line reference point for comparison of the outgoing and returning waves is chosen on the polarizer 15 side of the $\theta$ value rotational misalignment point just immediately to the right thereof in FIG. 2. This has been done since whatever alternate polarization path errors may arise in the system in the portion on the right cannot be changed by propagation to the left of this plane on the way to photodiode 13 by anything in the system between this plane and photodiode 13 since the returning waves are past polarizer 15.

The optical fiber positioned against laser diode 11 has its principal birefringence axes rotated to match a particular pair of axes of the source, these axes being the two axes therein along which electromagnetic waves are emitted such that the waves along one axis are uncorrelated with those waves emitted along the other. One electromagnetic wave polarization component from source 11 is thus introduced into the polarization component optical path along the one birefringent axis that is chosen to be given minimal effect in the desire to avoid errors in the sensing result through being aligned with the polarizer blocking axis, that component here being the polarization component following the fast axis. Hence, that wave component, to the extent not blocked by polarizer 15, will at least be uncorrelated with the wave component introduced along the other polarization component optical path. Such a pair of source axes that are orthogonal can always be found, or selected, depending on the nature of the electromagnetic waves emitted. If the source emits electromagnetic waves which are entirely unpolarized, any pair of orthogonal axes across the emitting face of the source will satisfy the requirement that the waves emitted along one axis not be correlated with those along the other simply from the definition of unpolarized electromagnetic waves. If, on the other hand, the electromagnetic waves are partially polarized, these waves, as is well known, can be represented by a pair of components one of which is a polarized component with the other being an unpolarized component. Thus, electromagnetic waves, emitted along that source face axis along which such a polarized component is emitted, will be uncorrelated with emitted electromagnetic waves following the orthogonal axis.

Typically, the symmetry of the geometrical configuration of the source will lead to the two axes along which these uncorrelated components are emitted being at right angles to one another, just as the principal birefringent axes are in the optical fiber to be butted thereagainst so these pairs of axes can be aligned with one another. The one of these source axes having the greater emission intensity will typically be aligned with the chosen primary propagation axis of the primary birefringent axes of the optical fiber positioned against the source, here the slow axis.

As a result of closely aligning the uncorrelated emission axes of the source and the principal birefringent axes of the optical fiber, a component of the electromagnetic waves, u(t), will be emitted from source 11 along one of its uncorrelated emission axes to propagate along one principal birefringent axis of the optical fiber extending therefrom. This component is written as a scalar without any geometric orientation parameter because of the definition thereof. Similarly, a second component of electromagnetic waves, v(t), again written as a scalar, will be emitted from source 11 along its other uncorrelated emission axis to propagate along the other principal birefringent axis of that optical fiber. Components u(t) and v(t), being uncorrelated, satisfy the relationship $$\overline{u(t)v^*(t-\tau)} = 0$$

for all values of relative delay $\tau$, with $v^*$ indicating that the complex conjugate of v(t) is being used.

On the source, or left, side of the $\theta$ rotational misalignment, the electromagnetic waves along the principal birefringent axes of the optical fiber portion extending from coupler 12 can thus be written as qu(t) and qv(t). This follows because, after passing through coupler 12, only a fraction q of these electromagnetic waves reach the $\theta$ misalignment location because of the splitting of the waves by coupler 12 and propagation losses.

On the polarizer 15 side of the $\theta$ rotational misalignment, or the right-hand side of this misalignment in FIG. 2, the electromagnetic waves will again be represented as $E_x(t)$ and $E_y(t)$ for the components traveling along the principal birefringent axes of the polarization-maintaining optical fiber extending from the misalignment location to polarizer 15. The "x" designation indicates the slow axis which is here assumed perfectly aligned to the transmission axis of polarizer 15. Similarly, the symbol "y" indicates the fast axis electromagnetic wave component which is here assumed perfectly aligned with the blocking axis of polarizer 15. These alignment assumptions are made since only the result of polarization components changing optical paths at the $\theta$ rotation misalignment location is going to be considered initially (excepting there are other path changes due to the uses of ordinary single spatial mode fiber and depolarizer 10' in coil 10). As a result, the relationship between the electromagnetic wave polarization components on either side of the $\theta$ rotational misalignment can be written in matrix form as follows:

$$\begin{bmatrix} E_x(t) \\ E_y(t) \end{bmatrix} = \begin{bmatrix} \cos\theta & \sin\theta \\ -\sin\theta & \cos\theta \end{bmatrix} \begin{bmatrix} qu(t) \\ qv(t) \end{bmatrix}.$$

Even though u(t) is delayed on the slow axis with respect to v(t), no delay representation has been incorporated in this last equation since both components are uncorrelated.

Evaluating the expression for the total amplitude phase error $\Delta\phi_{AmplTot}$ requires supplying expressions for the transfer matrix elements $g_{xx}$, $g_{xy}$ and $\dot{g}_{yx}$. These expressions will assume that essentially the only effects of traveling from the reference plane through coil 10 and back are delays necessary to travel over the polarization component optical paths traversed by electromagnetic waves leaving the reference point to pass through coil 10 and return thereto, the couplings and possibilities of couplings between polarization component optical paths occurring because of the use of ordinary single spatial mode optical fiber and depolarizer 10', and the lumped effects of coupler 17 and various fixed losses therein and in the optical fibers in the optical paths. The effects of polarizer 15 are already incorporated in the last expression for this error as represented by the extinction coefficient, and so will not be further considered here other than to the extent that they add to the length of the optical paths taken.

Finally, the bias modulation in the optical paths introduced by optical phase modulator 19 will be ignored in these expressions, and so the only contribution thereto will be the added length in the optical paths due to the presence of modulator 19. The effects of modulator 19 are to introduce a time dependence in the equations in addition to the frequency dependence already indicated, an added complexity which would greatly complicate the valuation of the last error expression. Further, the time dependence as introduced by optical phase modulator 19 has been shown not to affect the results obtained in evaluating the last error expression.

Accepting such limitations, a composite Jones matrix operator can be written on the basis of the well-known Jones calculus for operating on the expression for the electromagnetic waves propagating in the clockwise direction from the "wavy" reference line through coil 10 and back to represent the effects of propagation on these waves, this operator being $$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix} = \begin{bmatrix} 1 & 0 \\ 0 & \epsilon e^{-j2\pi\nu \frac{l_p}{c} \Delta n_p(\nu)} \end{bmatrix} [L_2] \times$$

$$\begin{bmatrix} 1 & 0 \\ 0 & e^{-j2\pi\nu \frac{2l_d}{c} \Delta n_d(\nu)} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi\nu \frac{l_d}{c} \Delta n_d(\nu)} \end{bmatrix} \times$$

$$[L_1] \begin{bmatrix} 1 & 0 \\ 0 & \epsilon e^{-j2\pi\nu \frac{l_p}{c} \Delta n_p(\nu)} \end{bmatrix}$$

The distance $L_1$ represents the length of the ordinary single spatial mode optical fiber extending between polarizer 15, through coupler 17 assuming a fiber coupler, to depolarizer 10'. Polarizer 15 could have a length of polarization-maintaining optical fiber extending therefrom to a splice with the ordinary single spatial mode optical fiber used in coupler 17. If so, length $L_1$ will be the length extending from that splice through coupler 17 to the splice with depolarizer 10'. Length $L_2$ represents the length of the ordinary single spatial mode optical fiber extending from the opposite side of the polarizer 10' through coil 10, through optical phase modulator 19 and through the coupling region of loop coupler 17 and from there to polarizer 15 or to a splice with the polarization-maintaining optical fiber extending from polarizer 15.

The parameters of these two fiber lengths are represented in the foregoing composite matrix operator by a pair of Jones matrices which are associated with these lengths in the operator through each having the corresponding length written in the associated pair of matrix brackets, or $[L_1]$ and $[L_2]$. These matrices have within them elements which represent the behavior of the ordinary single spatial mode optical fiber over the extent thereof not involved in forming fiber optic components, and also the behavior of those portions of that fiber in loop coupler 17 and in optical phase modulator 19 optical components. These elements will substantially vary with the environment such as changes in the birefringence present therein with changes in temperature.

The last matrix appearing in the foregoing composite transfer matrix represents the effects on a clockwise electromagnetic wave leaving the "wavy" line reference point due to polarizer 15 and any polarization-maintaining optical fibers extending from the ports thereof to a splice with an ordinary single spatial mode optical fiber or with an optical component in the optical path on the way to coil 10. This physical path length is designated $l_p$, and the difference in the refracted index between the "x" and "y" polarization paths therethrough, that is, along the blocking and transmission axes thereof, is represented as $\Delta n_p(\nu) \triangleq n_{xp}(\nu) - n_{yp}(\nu)$. The symbol c represents the speed of light in a vacuum, the symbol $\nu$ represents optical frequency, and the symbol $\epsilon$ is again the extinction ration of the polarizer. The letter j is used in the representation of imaginary numbers, $j \triangleq \sqrt{-1}$. There is assumed to be no significant coupling between the polarization modes in the polarizer.

After the clockwise electromagnetic wave is passed through polarizer 15, and propagated through optical fiber length $L_1$, that wave encounters depolarizer 10'. The middle three matrices in ordered multiplication in the composite matrix operator for the clockwise transfer matrix $G_{cw}$ given above represent depolarizer 10'. The right-hand matrix in these three multiplied matrices represents the shorter polarization-maintaining fiber length 10" in depolarizer 10' which is seen to have a physical length designated $l_d$. The difference in indices of refraction between the "x" and "y" axes of the polarization-maintaining fiber in length 10" is represented by $\Delta n_d(\nu) \triangleq n_{xd}(\nu) - n_{yd}(\nu)$. There is assumed to be no cross coupling between the polarization modes in this fiber piece.

The left matrix in this middle group of three matrices of the clockwise composite transfer matrix $G_{cw}$ represents the longer polarization-maintaining fiber length 10''' in depolarizer 10' and uses the same symbols as the last matrix in this multiplicative group of middle matrices. However, the length of section 10''' is twice that of section 10", and so a 2 appears in front of the symbol $l_d$ in that matrix.

The center matrix in this middle group of three ordered multiplied matrices representing depolarizer 10' in the composite transfer matrix $G_{cw}$ is a rotation matrix. This rotation matrix represents the effect of having the principal birefringent axes of polarization-maintaining optical fiber lengths 10" and 10''' on either side of the splice therebetween lying substantially equidistantly from the principal birefringent axes in the length on the other side thereof.

After propagating through length $L_2$ upon emerging from depolarizer 10', the clockwise electromagnetic wave passes again through polarizer 15. Thus, the first matrix in the composite transfer matrix $G_{cw}$ is identical with the last matrix in that composite matrix, and so its elements, having been described above, need not be further described here.

As indicated above, the variable $n_{xp}(\nu)$ represents the index of refraction along the "x" primary polarization propagation optical path in polarizer 15, i.e. the transmission axis thereof, and the variable $n_{yp}(\nu)$ represents the index of refraction along the "y" primary axis therein. Similarly, $n_{xd}(\nu)$ represents the index of refraction along the "x" primary polarization propagation optical path, i.e. the slow axes of the polarization-maintaining optical fibers in depolarizer 10', both sections 10" and 10'''. Again, the variable $n_{yd}(v)$ represents the index of refraction along the "y" primary polarization propagation optical path or the fast axes of the polarization-maintaining optical fiber lengths 10" and 10'''.

The composite transfer matrix $G_{cw}$ contains component matrices for the optical components in the clockwise path, other than the lengths of ordinary single spatial mode fiber $L_1$ and $L_2$, which components have no cross coupling between the polarization modes occurring therein, other than the 45° splice in depolarizer 10'. The two primary polarization modes along the principal birefringent axes are represented as having a relative delay therebetween through using exponential propagation phase functions which have propagation expressions in the arguments thereof that depend on the optical paths followed in these elements.

The dependence of the indices of refraction $n_{xp}(v)$, $n_{yp}(v)$, $n_{xd}(v)$ and $n_{yd}(v)$ upon optical frequency $v$ indicates that dispersive media may be encountered in the polarizer 15 and depolarizer 10', and the elements of the matrices $[L_1]$ and $[L_2]$ will also have elements containing optical frequency dependent indices of refraction. Such dispersion will cause electromagnetic wave components at different frequencies to have differing delays along the optical paths followed thereby. Thus, if $n_{xp}(v)$, $n_{yp}(v)$, $n_{xd}(v)$ and $n_{yd}(v)$ all equal constant values, the exponential terms in the component matrices of the clockwise composite transfer matrix $G_{cw}$ will have constant exponents which can be rewritten to contain corresponding fixed time delays. Thus, $$e^{-j2\pi v \frac{l_p}{c} \Delta n_{pconst}} = e^{-j2\pi v \tau_p}; \tau_p \triangleq \frac{l_p}{c} \Delta n_{pconst}$$

$$e^{-j2\pi v \frac{l_d}{c} \Delta n_{dconst}} = e^{-j2\pi v \tau_d}; \tau_d \triangleq \frac{l_d}{c} \Delta n_{dconst}$$

The fixed time delays $\tau_p$ and $\tau_d$ represent the fixed propagation delays of each optical frequency in the electromagnetic waves through polarizer 15 and through length 10" of depolarizer 10'.

However, if dispersion is present and significant to first order, the indices of refraction must be written as $$\Delta n_p(v) \simeq \Delta n_{po} + v \frac{d\Delta n_p(v)}{dv}$$

$$\Delta n_d(v) \simeq \Delta n_{do} + v \frac{d\Delta n_d(v)}{dv}$$

Repeating the examples above yields $$e^{-j2\pi v \frac{l_p}{c} [\Delta n_{po} + v \frac{d\Delta n_p(v)}{dv}]} \simeq e^{-j2\pi v \frac{l_p}{c} [\Delta n_p(\bar{v}) + \bar{v} \frac{d\Delta n_p(v)}{dv}|\bar{v}]}$$
$$= e^{-j2\pi v \frac{l_p}{c} \{\overline{\frac{d[v \Delta n_p(v)]}{dv}}\}}$$
$$= e^{-j2\pi v \tau_p}$$

where $$\tau_p \triangleq \frac{l_p}{c} \left( \overline{\frac{d[v \Delta n_p(v)]}{dv}} \right)$$

and $$e^{-j2\pi v \frac{l_d}{c} [\Delta n_{do} + v \frac{d\Delta n_d(v)}{dv}]} \simeq e^{-j2\pi v \frac{l_d}{c} [\Delta n_d(\bar{v}) + \bar{v} \frac{d\Delta n_d(v)}{dv}|\bar{v}]}$$
$$= e^{-j2\pi v \frac{l_d}{c} \{\overline{\frac{d[v \Delta n_d(v)]}{dv}}\}}$$
$$= e^{-j2\pi v \tau_d}$$

where $$\tau_d \triangleq \frac{l_d}{c} \left( \overline{\frac{d[v \Delta n_d(v)]}{dv}} \right)$$

Here, the delays $\tau_p$ and $\tau_d$ represent fixed group delays corresponding to times it would take an electromagnetic wave pulse to travel over the corresponding polarization component optical path lengths. A bar symbol over a variable or a function indicates that an average value of that variable or function is intended.

A further possibility is that second order dispersion effects would also be significant. Such a situation can arise with the use of an integrated optic chip such as one having substrate formed of lithium niobate, $LiNbO_3$, a situation, as previously indicated, which could occur in the structure of optical phase modulator 19 and perhaps other components. Lithium niobate as a significant second order effect at wavelengths around 0.8 μm which would typically be included in the spectral width of source 11. In these circumstances, the indices of refraction are written as $$\Delta n_p(v) \simeq \Delta n_{po} + v \frac{d\Delta n_p(v)}{dv} + \frac{1}{2} v^2 \frac{d^2 \Delta n_p(v)}{dv^2}$$

$$\Delta n_d(v) \simeq \Delta n_{do} + v \frac{d\Delta n_d(v)}{dv} + \frac{1}{2} v^2 \frac{d^2 \Delta n_d(v)}{dv^2}$$

Such effects cause added complications and result in having to consider several different group delays for each of several portions of the emission spectrum for source 11 giving rise to what is often termed a group delay dispersion, a situation which will be further described below.

In view of the foregoing, the expression for the clockwise composite transfer matrix can be rewritten as follows:

$$G_{cw} = \begin{bmatrix} 1 & 0 \\ 0 & \epsilon e^{-j2\pi v \tau_p} \end{bmatrix} [L_2] \times$$

$$\begin{bmatrix} 1 & 0 \\ 0 & e^{-j2\pi v 2\tau_d} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi v \tau_d} \end{bmatrix} \times$$

$$[L_1] \begin{bmatrix} 1 & 0 \\ 0 & \epsilon e^{-j2\pi v \tau_p} \end{bmatrix}$$

In this last expression, the delays $\tau_p$ and $\tau_d$ represent fixed group delays generally, although they also represent fixed delays in the absence of dispersion, this latter situation being unlikely to occur as dispersion is commonly present in optical fibers. In any event, the possibility of group delay dispersion is not explicitly provided for in this last expression.

The middle three component matrices in this last expression for the clockwise composite transfer matrix $G_{cw}$ again together represent depolarizer 10'. Consolidating these three component matrices into a single matrix representing depolarizer 10' through performing the matrix multiplication associated therewith yields $$\begin{bmatrix} 1 & 0 \\ 0 & e^{-j2\pi v 2\tau d} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi v \tau d} \end{bmatrix} =$$

$$\begin{bmatrix} \frac{1}{\sqrt{2}} & \frac{e^{-j2\pi v \tau d}}{\sqrt{2}} \\ -\frac{e^{-j2\pi v 2\tau d}}{\sqrt{2}} & \frac{e^{-j2\pi v 3\tau d}}{\sqrt{2}} \end{bmatrix}$$

which shows that each electromagnetic wave polarization component entering and propagating through depolarizer 10' will experience a different delay on exiting that optical component whether in the same polarization mode or coupled to the opposite mode.

The component matrices representing the lengths of ordinary single spatial mode optical fiber $L_1$ and $L_2$, $[L_1]$ and $[L_2]$, can be represented in general form as $$[L_1] = \begin{bmatrix} A_1 & B_1 \\ C_1 & D_1 \end{bmatrix}, [L_2] = \begin{bmatrix} A_2 & B_2 \\ C_2 & D_2 \end{bmatrix}.$$

The matrices in the first of these matrix equations represent the effects on the propagation of electromagnetic wave components over fiber length $L_1$ from the transmission and blocking axes of polarizer 15 (or from the "x" and "y" axes of any polarization-maintaining fiber extending therefrom aligned to such polarizer axes) to the "x" and "y" axes of section 10'' of depolarizer 10'. Similarly, the matrices in the second of these matrix equations represent the effects on the propagation of electromagnetic wave components over fiber length $L_2$ from the "x" and "y" axes of section 10''' of depolarizer 10' to the transmission and blocking axes of polarizer 15 (or to the "x" and "y" axes of any polarization-maintaining fiber extending therefrom aligned to such polarizer axes). The elements $A_1$, $B_1$, $C_1$ and $D_1$ representing propagation through ordinary single spatial mode optical fiber length $L_1$, and the elements $A_2$, $B_2$, $C_2$ and $D_2$ representing the propagation through ordinary single spatial mode optical fiber length $L_2$, would be very complex if explicitly represented since they depend on environmental conditions such as temperature. Thus, these matrix elements will be kept in their general representation form as will be sufficient for purposes here.

If all of the matrix multiplications indicated in the last expression for the clockwise composite transfer matrix operator $G_{cw}$ are carried out, the elements of that matrix $g_{xx}(v)$, $g_{xy}(v)$, $g_{yx}(v)$ and $g_{yy}(v)$ can be found. The result is $$g_{xx}(v) = \frac{1}{\sqrt{2}}(A_1 A_2 + C_1 A_2 e^{-j2\pi v \tau d} - A_1 B_2 e^{-j2\pi v 2\tau d} +$$

$$C_1 B_2 e^{-j2\pi v 3\tau d})$$

$$g_{xy}(v) = \frac{1}{\sqrt{2}} e^{-j2\pi v \tau p}(B_1 A_2 + D_1 A_2 e^{-j2\pi v \tau d} - B_1 B_2 e^{-j2\pi v 2\tau d} +$$

$$D_1 B_2 e^{-j2\pi v 3\tau d})$$

$$g_{yx}(v) = \frac{1}{\sqrt{2}} e^{-j2\pi v \tau p}(A_1 C_2 + C_1 C_2 e^{-j2\pi v \tau d} - A_1 D_2 e^{-j2\pi v 2\tau d} +$$

$$C_1 D_2 e^{-j2\pi v 3\tau d})$$

$$g_{yy}(v) = \frac{1}{\sqrt{2}} e^{-j2\pi v \tau p}(B_1 C_2 + D_1 C_2 e^{-j2\pi v \tau d} - B_1 D_2 e^{-j2\pi v 2\tau d} +$$

$$D_1 D_2 e^{-j2\pi v 3\tau d})$$

These transfer matrix elements are to be used in evaluating the previous expression for $\Delta\phi_{AmplTot}$ found above. Noting the last expression therefor given above, the products $g^*_{xx}(v) \cdot g_{xy}(v)$ and $g_{xx}(v) \cdot g^*_{yx}(v)$ must be determined to evaluate this amplitude error. Thus, substituting from the foregoing equations with the transfer matrix elements, the first product is evaluated as $$g^*_{xx}(v)g_{xy}(v) = \frac{1}{2} \sum_{N=-3}^{3} \alpha_N e^{-j2\pi v(\tau p + N\tau d)} + \frac{1}{2}(A_1^* A_2^* B_1 A_2 +$$

$$C_1^* A_2^* D_1 A_2 + A_1^* B_2^* B_1 B_2 + C_1^* B_2^* D_1 B_2)e^{-j2\pi v \tau p}$$

where $\alpha_{-3} \triangleq A_1^* 81 A_1^* D_1 B_2$, $\alpha_{-2} \triangleq C_1^* A_1^* D_1 B_2 - A_1^* A_1^* B_1 B_2$, $\alpha_{-1} \triangleq A_1^* A_1^* D_1 A_2 - C_1 {}_* A_* B_1 B_2 - A_* B_* D_1 B_2$, $\alpha_0 \triangleq 0$ $\alpha_1 \triangleq C_1^* A_1^* B_1 A_2 - A_1^* B_* D_1 A_2 - C_* B_* B_1 B_2$, $\alpha_2 \triangleq C_1^* B_1^* D_1 A_2 - A_1^* B_1^* B_1 A_2$, and $\alpha_3 \triangleq C_1^* B_1^* B_1 A_2$.

If losses in the ordinary single spatial mode optical fiber are entirely independent of polarization, the transfer matrix elements in either of the optical fiber operator matrices representing the propagation characteristics of the corresponding optical fiber length from transmission and blocking axes of polarizer 15 to one of the outer ends "x" axes of depolarizer 10' will be equal in magnitude to the transfer matrix elements representing the propagation characteristics of that optical fiber length from transmission and blocking axes of polarizer 15 to the "y" axis on that same outer end of depolarizer 10'. That is, if the optical fiber lengths $L_1$ and $L_2$ have only polarization independent losses, the directly transmitted portions of each polarization component propagating from the axes of polarizer 15 to the principal birefringent axes of an outer end of depolarizer 10' will have the same loss factor associated with each, and the cross-coupled portions of these polarization components will each have a common loss factor associated therewith. If, as is often the practical situation, length of the optical fiber is determinative of the loss factor experienced by electromagnetic wave polarization components propagating therethrough, there will be a single loss factor commonly associated with both the directly coupled and the cross-coupled portions of the polarization components reaching a depolarizer outer end pair of principal birefringent axes.

This last relatively simple situation can be expressed for the matrices $[L_1]$ and $[L_2]$ by rewriting them in the form $$[L_1] = p_1 e^{-\zeta_1} \begin{bmatrix} A_1' & B_1' \\ C_1' & D_1' \end{bmatrix}, [L_2] = p_1 e^{-\zeta_2} \begin{bmatrix} A_2' & B_2' \\ C_2' & D_2' \end{bmatrix}.$$

Thus, these matrices in the situation where the losses therein are independent of polarization, and of association with either direct or cross-coupled portions of the polarization components, can be written with the common loss factors taken outside of the matrices as multiplying constants with a single loss parameter for the corresponding fiber length for each matrix. That is, length dependent loss parameters $\zeta_1$ and $\zeta_2$ each appear in the corresponding loss factor associated with the matrices for lengths $L_1$ and $L_2$, respectively. The further loss factor $p_1$ accounts for the splitting of the electromagnetic waves between the fused fibers in loop directional coupler 17 and losses therein.

The resulting transfer matrix elements in the matrices to the right of the equal signs in the last pair of matrix equations have been redesignated with a prime to indicate that the loss factor has been removed therefrom, and so these resulting elements are now lossless. Hence, any operation by these matrix operators having the primed transfer elements therein on vectors representing electromagnetic waves propagating through the corresponding fiber lengths will leave the magnitude of those vectors, and so the wave magnitudes, unchanged.

Matrix operators transforming vectors so as to leave the magnitude thereof unchanged are performing what are known as unitary transformations, and are termed unitary operators. As is well known, the inverse of such an operator must equal its Hermitian conjugate, or $$\begin{bmatrix} A_1' & B_1' \\ C_1' & D_1' \end{bmatrix}^\dagger = \begin{bmatrix} A_1'^* & C_1'^* \\ B_1'^* & D_1'^* \end{bmatrix} = \begin{bmatrix} A_1' & B_1' \\ C_1' & D_1' \end{bmatrix}^{-1} = \frac{1}{A_1'D_1' - B_1'C_1'} \begin{bmatrix} D_1' & -B_1' \\ -C_1' & A_1' \end{bmatrix},$$

and $$\begin{bmatrix} A_2' & B_2' \\ C_2' & D_2' \end{bmatrix}^\dagger = \begin{bmatrix} A_2'^* & C_2'^* \\ B_2'^* & D_2'^* \end{bmatrix} = \begin{bmatrix} A_2 & B_2' \\ C_2' & D_2' \end{bmatrix}^{-1} = \frac{1}{A_2'D_2' - B_2'C_2'} \begin{bmatrix} D_2' & -B_2' \\ -C_2' & A_2' \end{bmatrix}.$$

Determining the determinant of the inverse matrix shows it to have a magnitude of 1, and thus so does the determinant the Hermition conjugate matrix. By finding the conjugate of the latter determinant, one can see that the magnitude of the determinant of the original lossless matrix is also 1, in accord with the well known result that the absolute value of the determinant of any unitary transformation matrix is 1.

With these results, equating the necessary components of the Hermitian conjugate and the inverse matrices, several expressions can be constructed. These include $$|A_1'| = |D_1'|,$$

$$|B_1'| = |C_1'|,$$

$$|A_2'| = |D_2'|,$$

$$|B_2'| = |C_2'|,$$

$$|A_1'|^2 = |B_1'|^2 =,$$

$$|A_2'|^2 = |B_2'|^2 =,$$

$$A_1'^* B_1' + C_1'^* D_1' = 0,$$

and $$A_2'^* B_2' + C_2'^* D_2' = 0.$$

Since multiplying a matrix by a constant like a loss factor is equivalent to multiplying each element in the matrix by that constant, the first four and the last two equations hold also for the original matrices representing the optical fibers in which the elements appear unprimed. On the other hand, the right sides of the fifth and sixth equations for unprimed elements will equal the square of the corresponding loss factors.

Returning to the last equation for $g_{xx}^*(\nu)g_{xy}(\nu)$, that equation can be rewritten after factoring the second term as $$g_{xx}^*(\nu)g_{xy}(\nu) = \frac{1}{2} \sum_{N=-3}^{3} \alpha_N e^{-j2\pi\nu(\tau_p + N\tau_d)} +$$

$$\frac{1}{2} [(|A_2|^2 + |B_2|^2)(A_1^* B_1 + C_1^* D_1)] e^{-j2\pi\nu\tau_p}$$

However, as the second equation preceding this last equation shows, the second factor in the parentheses in the term on the right has a value of zero. Thus, the expression for $g_{xx}^*(\nu) g_{xy}(\nu)$ contains only terms in which $\tau_d$ is present if losses in the ordinary single spatial mode fiber are independent of polarization, or $$g_{xx}^*(\nu)g_{xy}(\nu) = \frac{1}{2} \sum_{N=-3}^{3} \alpha_N e^{-j2\pi\nu(\tau_p + N\tau_d)}$$

The optical fiber loss factors have been left integrated in the matrices $[L_1]$ and $[L_2]$ so that the original and unprimed elements of these matrices are used in the last two expressions. In a similar manner, the product $g_{xx}(\nu)g_{yx}^*(\nu)$ can be found to be $$g_{xx}(\nu)g_{yx}^*(\nu) = \frac{1}{2} \sum_{N=-3}^{3} \beta_N e^{-j2\pi\nu(\tau_p + N\tau_d)}$$

where $$\beta_o = 0,$$

and the other $\beta_n$ also are functions of the transfer matrix elements from the matrices [L₁] and [L₂] as were the $\alpha_n$ but which will not be explicitly set out here as there will be no reliance on the specific values in the following.

Thus, in the presence of polarization independent losses through the lengths of ordinary single spatial mode optical fibers L₁ and L₂, and through loop directional coupler 17, only terms in which the delay parameter from depolarizer 10' appear will appear in the amplitude error term $\phi_{AmplTot}$. This result comes about because of the equalization of electro-magnetic wave intensities in the polarization components occurring because of the use of depolarizer 10'.

On the other hand, the formation of coupler 17 almost always introduces a slight polarization dependent loss which thereby will leave some amplitude error terms of value which do not depend on the delay parameter associated with depolarizer 10', and so which must be taken into account in reducing or eliminating the amplitude error as will be further described below. That is, the cancellation at the surface of photodiode 13 due to depolarizer 10' implied by the term found to be zero above in each of the two transfer element products evaluated, $g_{xx}^*(\nu)g_{xy}(\nu)$ and $g_{xx}(\nu)g_{yx}^*(\nu)$, will not be perfect thereby leaving some residual error due to these terms which will be ignored for now. Again in these last expressions, the delays $\tau_p$ and $\tau_d$ represent fixed group delays generally, although they also represent fixed delays in the absence of dispersion which is unlikely, where again group delay dispersion is not explicitly provided for in these expressions.

Returning to evaluating the amplitude error $\Delta\phi_{AmplTot}$, the expression given therefor previously is more easily dealt with if broken into its numerator terms and its denominator term for purposes of evaluation. Doing so provides the following result $$\Delta\phi_{AmplTot} = \frac{\epsilon Im(\Delta\phi_{AmplTot-fn} + \Delta\phi_{AmplTot-sn})}{\Delta\phi_{AmplTot-d}}$$

where $$\Delta\phi_{AmplTot-fn} = \int G_{xx}^*(\nu)G_{xy}(\nu)\mathscr{E}_x^*(\nu)\mathscr{E}_y(\nu)d\nu$$

$$\Delta\phi_{AmplTot-sn} = \int G_{xx}(\nu)G_{yx}^*(\nu)\mathscr{E}_x(\nu)\mathscr{E}_y^*(\nu)d\nu$$

$$\Delta\phi_{AmplTot-d} = \int |G_{xx}(\nu)\mathscr{E}_x(\nu)|^2 d\nu$$

The first of the numerator terms, $\Delta\phi_{AmplTot-fn}$, can be written with a transfer matrix elements products inserted therein as $$\Delta\phi_{AmplTot-fn} = \frac{1}{2}\sum_{N=-3}^{3}\alpha_N \int e^{-j2\pi\nu(\tau_p+N\tau_d)}\mathscr{E}_x^*(\nu)\mathscr{E}_y(\nu)d\nu$$

where the summation of $\alpha_n$ has been taken outside the integral side since $\alpha_n$ is approximately constant over the optical frequency $\nu$. That is, there is very little polarization dispersion in ordinary single spatial mode optical fiber wound on a spool, although this is less true in colder temperatures. Thus, some allowance may have to be made for operation at colder temperatures as will be described below.

Substituting in this last expression the Fourier transforms of $E_x(t)$, yielding $\mathscr{E}_x(\nu)$, and of $E_y(t)$, yielding $\mathscr{E}_y(\nu)$, respectively, as given above, provides the result $$\Delta\phi_{AmplTot-fn} = \lim_{T\to\infty}\frac{1}{2T}\sum_{N=-3}^{3}\alpha_N \int_\nu \int_{-\frac{T}{2}}^{\frac{T}{2}}\int_{-\frac{T}{2}}^{\frac{T}{2}} E_x^*(t)E_y(t')e^{-j2\pi\nu(t-t'-\tau_p-N\tau_d)}dt\,dt'\,d\nu$$

From the theory of generalized functions the integral over the optical frequency $\nu$ in the last expression yields the Dirac delta function, or $$\int_\nu e^{-j2\pi\nu(t-t'-\tau_p-N\tau_d)}d\nu = \delta(t - t' - \tau_p - N\tau_d).$$

Thus, interchanging the order of integration and performing the integral over the optical frequency $\nu$ in the last expression for $\Delta\phi_{AmplTot-fn}$ results in the following expression $$\Delta\phi_{AmplTot-fn} =$$

$$\lim_{T\to\infty}\frac{1}{2T}\sum_{N=-3}^{3}\alpha_N \int_{-\frac{T}{2}}^{\frac{T}{2}}\int_{-\frac{T}{2}}^{\frac{T}{2}} E_x^*(t)E_y(t')\delta(t - t' - \tau_p - N\tau_d)dt\,dt'.$$

Again, from generalized function theory, the Dirac delta function provides a "sifting" effect on the remaining integrals to give the result $$\Delta\phi_{AmplTot-fn} =$$

$$\lim_{T\to\infty}\frac{1}{2T}\sum_{N=-3}^{3}\alpha_N \int_{-\frac{T}{2}}^{\frac{T}{2}} E_x^*(t)E_y(t - \tau_p - N\tau_d)dt.$$

The integral in this last expression is directly related to the time average value of the product of the two electromagnetic wave polarization components, that is $$\Delta\phi_{amplTot-fn} = \frac{1}{2}\sum_{N=-3}^{3}\alpha_N <E_x^*(t)E_y(t - \tau_p - N\tau_d)>$$

Note that this time average of the product of the two electromagnetic wave polarization components departing from the wavy line reference point has one of these components substantially delayed with respect to the other as a result of the effects of propagation over the optical path followed. The amount of delay of the one component with respect to the other has several values because of the different possible paths through depolarizer 10', and is equal to the difference in delays between the two axes of polarizer 15 plus a series of differing delays through depolarizer 10' reflecting alternate path possibilities. Thus, there are a series of time averages each based on a different delay of the polarization component $E_y$ with respect to component $E_x$, and with each such time average for a corresponding one of the different delays also having an amplitude factor corresponding thereto.

The second numerator term $\Delta\phi_{AmplTot-sn}$ can be similarly evaluated using the expression therefor above and the appropriate transfer matrix element product giving $$\Delta\phi_{AmplTot-fn} = \frac{1}{2} \sum_{N=-3}^{3} \beta_N \int e^{j2\pi v(\tau_p + N\tau_d)} \mathscr{E}_x(v) \mathscr{E}_y^*(v) dv.$$

Since this expression is entirely analogous to the previous one for the first numerator term involving $\alpha_n$, the result of evaluating the integral therein can be written by analogy as $$\Delta\phi_{AmplTot-sn} = \frac{1}{2} \sum_{N=-3}^{3} \beta_N <E_y^*(t) E_x(t + \tau_p + N\tau_d)>.$$

However, the above procedure used for evaluating the integrals for the two numerator terms $\Delta\phi_{AmplTot-fn}$ and $\Delta\phi_{AmplTot-sn}$ cannot be used in the presence of significant second order dispersion or group delay dispersion, i.e. where $$\frac{d^2 n(v)}{dv^2}$$

is significant. In these circumstances, the relationship giving the Dirac delta function from generalized function theory cannot be properly invoked where the delay times in the exponent in the exponential term under the integral are a function of the optical frequency $v$. The integration over the optical frequency $v$ in the triple integral above will yield a relatively sharply peaked function, certainly, but not so sharp as a Dirac delta function. This resulting broadened peak function, i.e. the effect of such dispersion, will effectively increase the relative polarization component delay difference terms $\tau_p$ and $\tau_d$.

In such a situation, the emitted irradiation from source 11 leaving the "wavy" line reference point, $\mathscr{E}_x(v)$ and $\mathscr{E}_y(v)$, must be separated into optical frequency bands sufficiently narrow so that the group delay dispersion become negligible within each such band, or $$\mathscr{E}_x(v) \triangleq \sum_i \mathscr{E}_{xi}(v), \quad \mathscr{E}_y(v) \triangleq \sum_i \mathscr{E}_{yi}(v).$$

Then, the first numerator term for the total amplitude phase error $\Delta\phi_{AmplTot-fn}$ can be written $$\Delta\phi_{AmplTot-fn} =$$

-continued $$\frac{1}{2} \sum_{N=-3}^{3} \alpha_N \sum_i \int e^{-j2\pi v(\tau_{pi} + N\tau_{di})} \mathscr{E}_{xi}^*(v) \mathscr{E}_{yi}(v) dv$$

where $\tau_{pi}$ is the difference in the fixed group delays between the polarization component optical paths in the $i^{th}$ frequency band of the source spectrum through polarizer 15, and where $\tau_{di}$ is the difference in the fixed group delays between the polarization component optical paths in the $i^{th}$ frequency band of the source spectrum in depolarizer 10'.

At this point, the procedure follows much as before. A substitution of Fourier transformations for the electromagnetic waves in each frequency band gives $$\Delta\phi_{AmplTot-fn} = \frac{1}{2} \sum_{N=-3}^{3} \alpha_N \sum_i \lim_{T\to\infty} \frac{1}{T} \int_v \int_{-\frac{T}{2}}^{\frac{T}{2}} \int_{-\frac{T}{2}}^{\frac{T}{2}} E_{xi}^*(t) E_{yi}(t') e^{-j2\pi v(t-t'-\tau_{pi}-N\tau_{di})} dt\, dt'\, dv$$

with $$\mathscr{E}_{xi}(v) = \lim_{T\to\infty} \frac{1}{\sqrt{T}} \int_{-\frac{T}{2}}^{\frac{T}{2}} E_{xi}(t) e^{j2\pi v t} dt, \quad \mathscr{E}_{yi}(v) = \lim_{T\to\infty} \frac{1}{\sqrt{T}} \int_{-\frac{T}{2}}^{\frac{T}{2}} E_{yi}(t) e^{j2\pi v t} dt.$$

Then, for each optical frequency band the Dirac delta function can be used after interchanging the order of integration to yield $$\Delta\phi_{AmplTot-fn} =$$

$$\frac{1}{2} \sum_{N=-3}^{3} \alpha_N \sum_i \lim_{T\to\infty} \frac{1}{T} \int_{-\frac{T}{2}}^{\frac{T}{2}} \int_{-\frac{T}{2}}^{\frac{T}{2}} E_{xi}^*(t) E_{yi}(t') \delta(t - t' - \tau_{pi} - N\tau_{di}) dt\, dt'$$

Use of the sifting property then gives the result $$\Delta\phi_{AmplTot-fn} =$$

$$\frac{1}{2} \sum_{N=-3}^{3} \alpha_N \sum_i \lim_{T\to\infty} \frac{1}{T} \int_{-\frac{T}{2}}^{\frac{T}{2}} E_{xi}^*(t) E_{yi}(t - \tau_{pi} - N\tau_{di}) dt$$

or, using the definition of the time average given above, the following result is reached $$\Delta\phi_{AmplTot-fn} = \frac{1}{2} \sum_{N=-3}^{3} \alpha_N \sum_i <E_{xi}^*(t) E_{yi}(t - \tau_{pi} - N\tau_{di})>$$

Thus, where the previous result for $\Delta\phi_{AmplTot-fn}$ depends on several time averages summed over the parameter n in the situation of either fixed delays in the absence of dispersion effects, or fixed group delays in the situation where just first order dispersion is significant [$dn(v)/dv$ significant], the situation involving group delay dispersion differs. In this group delay situation, where second order dispersion is significant [$d^2 n(v)/dv^2$ significant], the result for $\Delta\phi_{AmplTot-fn}$ depends on the sum of the weighted array of time averages with there being $2ni$ time averages in that array. The effect is to take each of the time averages found above absent group delay dispersion and break them into separate but closely spaced time averages to thereby broaden the delay associated therewith into a range of delays.

Similarly, because of the similarity between the first and second numerator terms for $\Delta\phi_{AmplTot}$, the second numerator term in the presence of group delay dispersion can be written $$\Delta\phi_{AmplTot-sn} = \frac{1}{2} \sum_{N=-3}^{3} \beta_N \sum_i <E_{yi}^*(t)E_{xi}(t + \tau_{pi} + N\tau_{di})>$$

The two numerator terms found for $\Delta\phi_{AmplTot}$ can be combined in a single expression. In the absence of group delay dispersion, the result is $$\Delta\phi_{AmplTot-fn} + \Delta\phi_{AmplTot-sn} =$$

$$\frac{1}{2} \sum_{N=-3}^{3} (\alpha_N - \beta_N^*)<E_x^*(t)E_y(t - \tau_p - N\tau_d)>$$

Turning now to the denominator $\Delta\phi_{AmplTot-d}$ of the amplitude error term $\Delta\phi_{AmplTot}$, the transfer element product $|g_{xx}(\nu)|^2$ must be found to evaluate this denominator. Substituting the value found for $g_{xx}(\nu)$ above provides the following $$|g_{xx}(\nu)|^2 = \sum_{N=-3}^{3} \sigma_N' e^{j2\pi\nu N\tau d} +$$

$$\frac{1}{2}(|A_1 A_2|^2 + |C_1 A_2|^2 + |A_1 B_2|^2 + |C_1 B_2|^2)$$

where $$\sigma_{-3}' \triangleq A_1^* A_2^* C_1 B_2,$$

$$\sigma_{-2}' \triangleq \frac{(|C_1|^2 - |A_1|^2)A_2^* B_2}{2},$$

$$\sigma_{-1}' \triangleq \frac{(|A_2|^2 - |B_2|^2)A_1^* C_1 - A_1 A_2^* B_2 C_1^*}{2},$$

$$\sigma_0' = 0,$$

$$\sigma_1' \triangleq \frac{(|A_2|^2 - |B_2|^2)A_1 C_1^* - A_1^* A_2 B_2^* C_1}{2},$$

$$\sigma_2' \triangleq \frac{(|C_1|^2 - |A_1|^2)A_2 B_2^*}{2}, \text{ and}$$

$$\sigma_3' \triangleq A_1 A_2 C_1^* B_2^*.$$

This last transfer matrix element product can be rewritten noting that the term on the right is factorable as $$|g_{xx}(\nu)|^2$$

$$= \sum_{N=-3}^{3} \sigma_N' e^{j2\pi\nu N\tau d} + \frac{1}{2}[(|A_1|^2 + |C_1|^2)(|A_2|^2 + |B_2|^2)]$$

$$= \sum_{N=-3}^{3} \sigma_N' e^{j2\pi\nu N\tau d} + \frac{1}{2}[(|A_1|^2 + |B_1|^2)(|A_2|^2 + |B_2|^2)],$$

since, from the equations above found in connection with the matrix operators having primed elements associated with matrices $[L_1]$ and $[L_2]$, $|C_1| = |B_1|$ because $|C_1'| = |B_1'|$.

Further, in connection with the description above of the matrices representing the two ordinary single spatial mode optical fiber lengths $L_1$ and $L_2$ shown as $$[L_1] = \begin{bmatrix} A_1 & B_1 \\ C_1 & D_1 \end{bmatrix} = p_1 e^{-\xi_1} \begin{bmatrix} A_1' & B_1' \\ C_1' & D_1' \end{bmatrix}$$

and $$[L_2] = \begin{bmatrix} A_2 & B_2 \\ C_2 & D_2 \end{bmatrix} = p_1 e^{-\xi_2} \begin{bmatrix} A_2' & B_2' \\ C_2' & D_2' \end{bmatrix},$$

there was further found another pair of relationships between matrix elements in the matrix operators associated with lengths $L_1$ and $L_2$ having such elements which set out as $$|A_1'|^2 + |B_1'|^2 = 1,$$

$$|A_2'|^2 + |B_2'|^2 = 1,$$

Converting these relationships to ones involving the unprimed matrix operator elements associated with these fiber lengths requires substituting in these last relationships for the primed transfer matrix elements the corresponding unprimed transfer matrix elements divided by the splitting factor and the loss factor. This yields $$|A_1|^2 + |B_1|^2 = p_1^2 e^{-2\xi_1},$$

$$|A_2|^2 + |B_2|^2 = p_1^2 e^{-2\xi_2}.$$

Using these last two expressions in the last expression for $|g_{xx}(\nu)|^2$ yields $$|g_{xx}(\nu)|^2 = \sum_{N=-3}^{3} \sigma_N' e^{j2\pi\nu N\tau d} + \frac{p_1^2}{2} e^{-2(\xi_1 + \xi_2)}.$$

This result can be consolidated by redefining $\sigma_N'$ to being $\sigma_N$ if $N \neq 0$, that is $$\sigma_N = \sigma_N', N \neq 0$$

and $$\sigma_0 \triangleq \frac{p_1^2}{2} e^{-2(\xi_1 + \xi_2)}.$$

This consolidation then permits $|g_{xx}(\nu)|^2$ to be written compactly as $$|g_{xx}(\nu)|^2 = \sum_{N=-3}^{3} \sigma_N e^{j2\pi\nu N\tau d}.$$

Having this result, the denominator for the amplitude error $\Delta\phi_{AmplTot}$ can be evaluated. This term is written as $$\Delta\phi_{AmplTot-d} = \int \left| \sum_{N=-3}^{3} \sigma_N e^{j2\pi\nu N\tau d} \mathscr{E}_x(\nu) \right|^2 d\nu$$

$$= \sum_{N=-3}^{3} \sigma_N \int e^{j2\pi\nu N\tau d} \mathscr{E}_x(\nu) \mathscr{E}_x^*(\nu) d\nu.$$

The second form is obtained by interchanging the integration and summation, and by introducing the equivalent expression for the absolute value of $\mathscr{E}_x(\nu)$.

The use of the Fourier transformation relation given above transforming $E_x(t)$ to $\mathscr{E}_x(\nu)$ permits the preceding relationship to be rewritten as $$\Delta\phi_{AmpleTot-d} = \lim_{T\to\infty} \frac{1}{T} \sum_{N=-3}^{3} \sigma_N \int_\nu \int_{-\frac{T}{2}}^{\frac{T}{2}} \int_{-\frac{T}{2}}^{\frac{T}{2}} E_x(t)E_x^*(t')e^{j2\pi\nu(t-t'+N\tau_d)}dt dt' d\nu$$

Interchanging the order of integration and integrating over the optical frequency $\nu$ with the use of the expression given above for the Dirac delta function yields $$\Delta\phi_{AmplTot-d} =$$

$$\lim_{T\to\infty} \frac{1}{T} \sum_{N=-3}^{3} \sigma_N \int_{-\frac{T}{2}}^{\frac{T}{2}} \int_{-\frac{T}{2}}^{\frac{T}{2}} E_x(t)E_x^*(t')\delta(t-t'+N\tau_d)dt dt'.$$

Integrating over time, the "sifting" action of the delta function gives the result $$\Delta\phi_{AmplTot-d} = \lim_{T\to\infty} \frac{1}{T} \sum_{M=-3}^{3} \sigma_N \int_{-\frac{T}{2}}^{\frac{T}{2}} E_x(t)E_x^*(t+N\tau_d)dt$$

Once again, this integral is related to the time average of the product of the two electromagnetic wave polarization components departing from the "wavy" reference line, and thus this last expression can be rewritten as $$\Delta\phi_{AmplTot-d} = \sum_{N=-3}^{3} \sigma_N <E_x(t)E_x^*(t+N\tau_d)>$$

Thus, the denominator term for the amplitude error $\Delta\phi_{AmplTot}$ is a series of time averages of the electromagnetic wave polarization components in the transmission axis of polarizer 15 leaving the "wavy" line reference having corresponding amplitude weights, and autocorrelated with itself with a delay depending for each average on a corresponding multiple of the basic delay time in depolarizer 10'.

Again, however, the procedure for obtaining this last expression cannot be used in the presence of significant second order dispersion, or group delay dispersion, i.e. where $$\frac{d^2n(\nu)}{d\nu^2}$$

is significant. In those circumstances, in analogy with the result found for the first numerator term in such conditions, the last expression becomes $$\Delta\phi_{AmplTot-d} = \sum_{N=-3}^{3} \sigma_N \sum_i <E_{xi}(t)E_{xi}^*(t+N\tau_{di})>$$

where again i designates the optical frequency bands over the source spectrum which are made sufficiently narrow so that the group delay dispersion becomes negligible within each such band.

Either of these last two expressions for $\Delta\phi_{Ampltot-d}$ represents the signal information obtained through a traverse of coil 10, including depolarizer 10', by electromagnetic waves leaving the "wavy" reference line to pass through the transmission axis of polarizer 15. Since $(\tau_d)$ or $(\tau_{di})$ change with temperature, or otherwise introduced stress in the optical fiber in depolarizer 10', as do the values for $\sigma_N$, the signal traversing coil 10 would be quite susceptible to unwanted value changes due to environmental influences if represented by either of these last two expressions. Thus, there is the possibility in some environmental conditions that the signal information could disappear altogether. Such a result is unacceptable.

Avoiding such an unwanted result requires that the time averages in the denominator which depend on $\tau_d$ be required to be of zero value. That is, the time averages are to have a value of zero for those averages in which the value of N is other than zero so that the parameter $\tau_d$ a appears therein. The manner in which this requirement will be imposed will be further described below, but the imposition will be accepted now as being in effect with the result expressed as $$E_x(t)E_x^*(t-N\tau_d) = 0, N\neq 0.$$

With this limitation, the expression for the denominator term $\Delta\phi_{Ampltot-d}$ in the absence of group delay dispersion given above then becomes $$\Delta\phi_{AmpleTot-d} = \frac{p_1^2}{2} e^{-2(\zeta_1+\zeta_2)} < |E_x(t)|^2 >.$$

The expression for the total amplitude phase error $\Delta\phi_{AmplTot}$ was given above in the form $$\Delta\phi_{AmplTot} = \frac{\epsilon Im(\Delta\phi_{AmplTot-fn} + \Delta\phi_{AmplTot-sn})}{\Delta\phi_{AmplTot-d}}.$$

Using, in this last expression, the results found in the foregoing for the sum of the two numerator terms and the for denominator term, assuming the absence of group delay dispersion, permits writing this amplitude total phase error as $$\Delta\phi_{AmplTot} =$$

$$\frac{\epsilon Im\left[\frac{1}{2}\sum_{N=-3}^{3}(\alpha_N-\beta_N^*)<E_x^*(t)E_y(t-\tau_p-N\tau_d)>\right]}{\frac{p_1^2}{2}e^{-2(\zeta_1+\zeta_2)}<|E_x(t)|^2>}.$$

This last expression is the amplitude phase error at the "wavy" line reference in the absence of group delay dispersion for electromagnetic waves propagating from the "wavy" line reference through coil 10 including depolarizer 10' and back.

The effect of the presence of group delay dispersion will lead to summations of time averages in the numerator and the denominator of the expression for the total amplitude error $\Delta\phi_{AmplTot}$ preceding the last. These summations are introduced therein by the use of the group delay dispersion versions of the expressions given above for the two numerator terms and for the denominator term. Such summations will broaden the ranges of delays.

However, to complete finding the total amplitude phase error for the system as it occurs at the "wavy" reference line, the electromagnetic waves emitted from source 11, passing through coupler 12 and the $\theta$ rotational misalignment, must be introduced into this last expression. This is accomplished through using the individual equations implied in the matrix equation set out previously relating $E_x(t)$ and $E_y(t)$ to $u(t)$ and $v(t)$. Thus, the conjugate of the time average of the polarization components in the last expression can be rewritten using those relationships from that matrix equation as $$\begin{aligned}<E_x(t)E_y^*(t-\tau_p-N\tau_d)> &= <[qu(t)\cos\theta + qv(t)\sin\theta] \times \\
&\quad [-qu^*(t-\tau_p-N\tau_d)\sin\theta + \\
&\quad qv^*(t-\tau_p-N\tau_d)\cos\theta]> \\
&= -q^2<u(t)u^*(t-\tau_p-N\tau_d)>\sin\theta\cos\theta + \\
&\quad q^2<v(t)v^*(t-\tau_p-N\tau_d)>\sin\theta\cos\theta - \\
&\quad q^2<v(t)u^*(t-\tau_p-N\tau_d)>\sin^2\theta + \\
&\quad q^2<u(t)v^*(t-\tau_p-N\tau_d)>\cos^2\theta.\end{aligned}$$

Because the two emitted electromagnetic waves are uncorrelated, the time averages in the last expression involving the product of emission components $v(t)$ and $u(t)$ equal zero, giving the result $$E_x(t)E_y^*(t-\tau_p-N\tau_d) = q^2\sin\theta\cos\theta[v(t)v^*(t-\tau_p-N\tau_d) - u(t)u^*(t-\tau_p-N\tau_d)].$$

The two time averages remaining in this last expression each represent the self-coherence function, or the time-based autocorrelation function, of the corresponding emission component of the electromagnetic waves emitted by source 11. If these self-coherence, or autocorrelation, functions are normalized by dividing each by the corresponding optical power, the result is the complex degree of coherence for each of these emission components, $\gamma_u(\tau_p+N\tau_d)$ and $\gamma_v(\tau_p+N\tau_d)$, or $$\gamma_u(\tau_p+N\tau_d) \triangleq \frac{<u(t)u^*(t-\tau_p-N\tau_d)>}{P_u},$$

$$\gamma_v(\tau_p+N\tau_d) \triangleq \frac{<v(t)v^*(t-\tau_p-N\tau_d)>}{P_v},$$

where $$P_u \triangleq <|u(t)|^2>, P_v \triangleq <|v(t)|^2>,$$

that is, $P_u$ and $P_v$ are the optical powers of the u and v emission components. Thus, the conjugate of the time average of the polarization components in the numerator of the expression for $\Delta\phi_{AmplTot}$ can be written as $$E_x(t)E_y^*(t-\tau_p-N\tau_d) = q^2\sin\theta\cos\theta[P_v\gamma_v(\tau_p+N\tau_d)-P_u\gamma_u(\tau_p+N\tau_d)]$$

This last expression can be further simplified if, as is true of some laser diodes operated below threshold, each emission component has the same optical spectra because then the complex degree of coherence for each will be equal to that of the other, or $$\gamma_u(\tau_p+N\tau_d) = \gamma_v(\tau_p+N\tau_d) \triangleq \gamma(\tau_p+N\tau_d).$$

This results in the previous expression being simplified to $$E_x(t)E_y^*(t-\tau_p-N\tau_d) = q^2\sin\theta\cos\theta\gamma(\tau_p+N\tau_d)[P_v-P_u].$$

Hence, this time average is determined in part by the value of the complex degree of coherence of the electromagnetic waves emitted by source 11 at the specific time delays $\tau_p+N\tau_d$ between the two components thereof.

The denominator in the expression for the maximum of the total amplitude phase error is found making this same sort of substitution from the equations involved in the matrix relating the polarization components to the emission components above with the result $$\begin{aligned}<|E_x(t)|^2> &= <|qu(t)\cos\theta + qv(t)\sin\theta|^2> \\
&= <q^2|u(t)|^2>\cos^2\theta + <q^2|v(t)|^2>\sin^2\theta \\
&= q^2P_u\cos^2\theta + q^2P_v\sin^2\theta,\end{aligned}$$

noting that the time averages of the products of the $u(t)$ and $v(t)$ emission components are again zero since they are uncorrelated.

Thus, the total amplitude phase error $\Delta\phi_{AmplTot}$ can now be written, this expression being $$\Delta\phi_{AmplTot} = \frac{\frac{\epsilon q^2\sin\theta\cos\theta}{2}(P_v-P_u)I_m\left[\sum_{N=-3}^{3}(\alpha_N-\beta_N^*)\gamma^*(\tau_p+N\tau_d)\right]}{\frac{p_1^2}{2}e^{-2(\zeta_1+\zeta_2)}(q^2P_u\cos^2\theta + q^2P_v\sin^2\theta)}.$$

Because the rotational alignment will be slight where the principal axes of birefringence on either side of the splice at the $\theta$ rotational misalignment point are attempted to be closely aligned with one another, the angle $\theta$ will also be quite small with the result $$\sin\theta \approx \theta \triangleq k, \cos\theta \approx 1.$$

Substituting these results into the previous expression gives the final expression for the total amplitude phase error, or $$\Delta\phi_{AmplTot} = \frac{k\epsilon(P_v-P_u)I_m\left[\sum_{N=-3}^{3}(\alpha_n-\beta_N^*)\gamma^*(\tau_p+N\tau_d)\right]}{P_u p_1^2 e^{-2(\zeta_1+\zeta_2)}}.$$

This last expression represents the amplitude phase error for the single rotational misalignment to the left of the wavy reference line in the system of FIG. 2. However, as previously described, there may be further splices to the left of polarizer 15 in FIG. 2 which could further give rise to a phase error expression like the last. Such errors will combine additively. As a result, the total phase error due to all splices or other coupling locations, $\Delta\phi_{AmplTot-as}$, which is cumulative, can be written $$\Delta\phi_{AmplTot-as} = \frac{\epsilon}{p_1^2 e^{-2(\zeta_1+\zeta_2)}} \sum_i \left(\frac{P_u - P_v}{P_u}\right) k_j I_m \left[\sum_{N=-3}^{3} (\alpha_N - \beta_N^*)\gamma^*(\tau_p + \tau_i + N\tau_d)\right]$$

Here, the subscript i refers to the $i^{th}$ coupling point on the source side of polarizer 15 in FIG. 2. The delay $\tau_i$ accounts for any added relative polarization component delay between the $i^{th}$ coupling point and the point where polarizer 15 is joined with the optical system portion leading to source 11 and photodiode 13.

Thus, this amplitude phase error comes about from electromagnetic waves coupling between the orthogonal polarization axes before entering polarizer 15, and then finding alternative paths through depolarizer 10′ (and perhaps abetted in finding different paths by the presence of other coupling points to the right of polarizer 15) on the return of the waves through the waveline reference point. Thus, these returning waves in having taken different optical paths in leaving the wavy reference line point and returning to it to subsequently interfere at the surface of photodiode 13, will exhibit phase differences indistinguishable from a rotation induced phase shift, and so will represent error. Also, this last expression also represents the situation of no dispersion or, if there is dispersion, only first order dispersion with $\tau_p$ and $\tau_d$ being fixed group delays. The presence of group delay dispersion will result in a summation over the optical frequency bands defined above in accommodating such dispersion in the corresponding complex degree of coherence.

A further relationship needs to also be developed concerning the signal information time averages which appear in the denominator of the total amplitude phase error $\Delta\phi_{AmplTot}$ before the imposition of the requirement that those time averages with $\tau_d$ therein be equal to zero. This relationship is developed again through using the individual equations implied in the matrix equation above relating $E_x(t)$ and $E_y(t)$ to $u(t)$ and $v(t)$. Thus, these signal time averages involving $\tau_d$ can be written $$\langle E_x(t)E_x^*(t+N\tau_d)\rangle = \langle [qu(t)\cos\theta + qv(t)\sin\theta] \times [qu^*(t+N\tau_d)\cos\theta + qv^*(t+N\tau_d)\sin\theta]\rangle$$

$$= q^2\langle u(t)u^*(t+N\tau_d)\cos^2\theta\rangle + q^2\langle u(t)v^*(t+N\tau_d)\cos\theta\sin\theta\rangle + q^2\langle v(t)u^*(t+N\tau_d)\cos\theta\sin\theta\rangle + q^2\langle v(t)v^*(t+N\tau_d)\sin^2\theta\rangle, N \neq 0.$$

Once again, since the two emitted electromagnetic waves from source 11 are uncorrelated, the time averages in the last expression involving the product of emission components v(t) and u(t) equals zero, and so $$E_x(t)E_x^*(t+N\tau_d) = q^2[ u(t)u^*(t+N\tau_d) \cos^2\theta + v(t)v^*(t+N\tau_d) \sin^2\theta], N\neq 0.$$

As before, the two time averages remaining in this last expression each represent the self-coherence function, or the time-based autocorrelation function, of the corresponding emission components of the electro-magnetic waves emitted by source 11. Again, if these self-coherence, or autocorrelation, functions are normalized by dividing each by the corresponding optical power, the result is the complex degree of coherence for each of these emission components, $\gamma_u(N\tau_d)$ and $\gamma_v(N\tau_d)$, or $$\gamma_u(N\tau_d) \triangleq \frac{\langle u(t)u^*(t+N\tau_d)\rangle}{P_u},$$

$$\gamma_v(N\tau_d) \triangleq \frac{\langle v(t)v^*(t+N\tau_d)\rangle}{P_v}, N\neq 0,$$

where again N is allowed to have the values $-3$, $-2$, $-1$, 1, 2 and 3, but not zero. $P_u$ and $P_v$ are the optical powers of the u and v emission components as before. Again, assuming that each emission component has the same optical spectra, as is usual, each of the foregoing complex degree of coherence functions will equal the other, $\gamma_u(N\tau_d)=\gamma_v(N\tau_d)$ $\gamma(N\tau_d)$, giving the result $$E_x(t)E_x^*(t+N\tau_d) = q^2\gamma(N\tau_d)(P_u\cos^2\theta + P_v\sin^2\theta), N\neq 0.$$

Thus, to eliminate amplitude phase error the last expression found above for $\Delta\phi_{AmplTot-as}$ must be set to zero and, to eliminate signal fading, the immediately preceding expression must also be set to zero. Before considering how this is to be done, the general nature of the complex degree of coherence of source 11, $\gamma(T)$ or $\gamma_k(T)$ for the key frequency band if group delay dispersion is present, must be determined. While this will typically be done by measurement of the source autocorrelation function, the general nature of the measurement outcome can be easily found.

In a laser diode, as is typically used for source 11 in the system of the present invention, electromagnetic waves or light E(t) are spontaneously emitted in the interior thereof upon establishing a current therethrough. Some of these waves will be emitted at the emission face thereof into the optical fiber butted thereagainst, and some will be reflected from that interface to be transmitted through the interior of that diode to the opposite surface where these wave portions are again reflected to return to this same interface $\tau_s$ seconds later as the geometrical structure determined round trip propagation time. As is well known, the amplitude of these returning waves will be $r_1r_2g$ where $r_1$ and $r_2$ are the reflection coefficients at the diode emission surface and the diode surface opposite thereto, and g is the gain in the effective resonance cavity established between these surfaces. Thus, the total of the emitted electromagnetic waves, considering multiple, back-and-forth reflections can be written as $$E_{Tot}(t) 26 E(t) + r_1r_2gE(t-\tau_s) + r_1^2r_2^2g^2E(t-2\tau_s) + \ldots$$

The complex degree of coherence function for the electromagnetic waves emitted by source 11, or its normalized autocorrelation function, in accord with the foregoing can be written as $$\gamma(T) = \frac{<E_{Tot}(t)E_{Tot}^*(t-T)>}{|E_{Tot}(t)|^2}$$

with T being the relative retardation delay time between the two wave representations in the numerator. Substitution of the expression above for $E_{Tot}(t)$ yields $$\gamma(T) \approx \frac{<(E(t) + r_1r_2gE(t-\tau_s) + \ldots)(E^*(t-T) + r_1r_2gE^*(t-\tau_s-T) + \ldots)>}{|E_{Tot}(t)|^2}$$

Since, for the spontaneous emission $<E(t)E^*(t-T)>\approx 0$ unless $T\approx 0$, this last expression has the values:

$$\gamma(T) = 1 \text{ for } T = 0$$
$$\approx r_1r_2g \text{ for } T = \pm\tau_s$$
$$\approx r_1^2r_2^2g^2 \text{ for } T = \pm 2\tau_s$$
etc.

and has a value of approximately zero for other values of T. However, dispersion within the laser diode will lead to some broadening of the peaks about the multiples of the effective retardation time interval delays $\tau_r$, set by the laser diode geometrical structure round trip propagation time of the same duration ($\tau_s=\tau_r$), along retardation delay time axis T to thereby extend over fractions of delays $\tau_r$ at the opposite ends of each, and will lead to some diminution of the values of those peaks. Such a source normalized autocorrelation function is shown in FIG. 3 for a laser diode operating below the lasing threshold of $r_1r_2g=1$. A portion of a measured source function is shown in FIG. 4. The peaks in each instance are separated in retardation delay time by time durations, or retardation interval delays $\tau_r$, on the order of $7\times 10^{-12}$ seconds. The half-power width in time of the peaks is representative of the coherence time of the laser diode operating below threshold, and is typically around $5\times 10^{-14}$ seconds.

Some potential sources for source 11 have considerably more complicated complex degree of coherence functions. Some broadband semiconductor sources, for instance, have absorptive material in the resonant cavity portion thereof which thereby provides multiple paths for electromagnetic radiation therein, and so a number of different geometrical structure round trip propagation times, $\tau_{s-i}$. Each such propagation time leads to a corresponding set of peaks in the complex degree of coherence function which may so densely overlap so as to make difficult or impossible to find any repetitive, relatively large low function value ranges as effective repetitive retardation intervals. That is, there may be retardation intervals of different delay duration values in the function. Such sources often have fairly rapidly decaying complex degree of coherence functions. These functions typically are at very low values for all retardation times exceeding four times the single pass propagation delay through the longest linear dimension of the complex cavity in such sources in which the electromagnetic waves to be emitted are generated.

The total phase error due to all splices $\Delta\phi_{AmplTot-as}$, set out in the expression given above therefor, can be substantially avoided in the system of FIG. 2 by keeping the complex degree of coherence function therein, $\gamma(\tau_p+N\tau_d)$, relatively small. Such avoidance of amplitude related phase error can be achieved by choosing the results of combining the difference in propagation times for electromagnetic waves traveling in the transmission and blocking axes of polarizer 15, $\tau_p$, with each alternative integral multiple (N=0 excluded) of the difference in propagation time of such waves in the "x" and "y" axes of section 10" of depolarizer 10', $N\tau_d$, at values for which the corresponding complex degree of coherence function $\gamma(\tau_p+N\tau_d)$ is negligibly small. Simultaneously, to avoid signal fading, the complex degree of coherence function $\gamma(N\tau_d)$ associated with the signal time averages, or signal autocorrelation functions, must be kept relatively small also (excluding the N=0 situation). This requirement is met by keeping the difference in propagation time between electromagnetic waves in the "x" and "y" axes of section 10" of depolarizer 10', $\tau_d$, and its multiples, at values such that this latter complex degree of coherence function also is negligibly small in these other situations. That is, the polarization state preserving elements on the loop or coil side of the coupling point to the left of polarizer 15 are chosen to have selected polarization component propagation time differences to keep the amplitude related phase errors relatively small, and to avoid signal fading.

Thus, measuring the complex degree of coherence function for source 11 permits determining the retardation time interval $\tau_r$ (or the various different interval delay durations $\tau_{r-n}$ present) associated therewith. Then a polarizer 15 must be chosen having a certain difference in time between electromagnetic waves propagating therethrough in the blocking and transmission axes thereof, as must the length of polarization-maintaining optical fiber for section 10" of depolarizer 10' to set the total delay time therein between waves propagating in its fast and slow axes (section 10''' of depolarizer 10' is made twice as long section 10" thereof). The time delays through the chosen polarizer 15 and the chosen length of polarization-maintaining optical fiber section 10" must be such that $\tau_p+N\tau_d(N\neq 0)$ have values along the time delay axis over which the complex degree of coherence of source 11 is measured that fall between the peaks of that function where it has relatively low values. A similar requirement must also be met by the length of polarization-maintaining optical fiber 10" such that $N\tau_d$ ($N\neq 0$) has values along the time delay axis over which the complex degree of coherence of source 11 is measured that simultaneously fall between the peaks of that function where it has relatively low values.

Of course, as can be seen in FIG. 3, if the polarizer chosen for use including any polarization-maintaining optical fiber extending therefrom has a sufficient delay time for propagation of orthogonal polarization components $\tau_p$ between its transmission and blocking axes, the complex degree of coherence function will have become negligible even at peaks therein. However, such polarizers are relatively expensive and so there is a desire to use polarizers offering shorter delays between electromagnetic waves propagating in its blocking and transmission axes. Thus, by allowing the length to be used to be such that polarization propagation velocity difference times plus those for multiples of the propagation difference time in section 10" of depolarizer 10' fall between the peaks of the source complex degree of coherence function, but out to no more than the fourth peak, for instance, relatively shorter lengths of fiber may be used while still avoiding amplitude type phase error.

On the other hand, the polarization component propagation time differences in polarizer 15 usually will not be at the zeroth peak since current practical polarizers will introduce some delay difference, and often cannot be near the first peak because that will not assure a sufficient attenuation of the error. This latter situation comes about because the result explicitly found for the amplitude type error is based on some special situations such as the losses in the ordinary single spatial mode fiber, including in the fused couplers, not being polarization independent, and that the $\alpha_N$ and $\beta_N$ coefficients do not exhibit any significant polarization dispersion even at lower temperatures, situations which have been indicated above to not always be true. In systems where these special situations do not occur, or in the further situation in which group dispersion delay occurs, setting the delays for polarization 15 and section 10" of depolarizer 10' around the second peak of the source complex degree of coherence function better assures sufficient attenuation to adequately reduce the additional errors that these last described conditions can cause to arise.

For instance, if the losses in loop coupler 17 are polarization dependent, such as is effectively the result of having different splitting ratios of electromagnetic waves at two coupler output ports of waves introduced at an input coupler port for each of the two orthogonal wave polarizations, additional amplitude phase error terms will become significant and appear in the equation for $\Delta\phi_{AmplTot-as}$. Such additional terms will generally have the forms $$(A_1B_1^* + C_1D_1^*)\frac{P_u - P_v}{P_u} k\epsilon\gamma(\tau_p),$$

$$(A_2B_2^* + C_2D_2^*)\frac{P_u - P_v}{P_u} k\epsilon\gamma(\tau_p)$$

and $$[(C_2{}^2 + D_2{}^2) - (B_1{}^2 + D_1{}^2)]\frac{P_u - P_v}{P_u} k\epsilon\gamma(\tau_p).$$

$P_u$ and $P_v$ remain the powers of the electromagnetic waves emitted along the orthogonal axes of source 11, respectively.

If, as is suggested below, the delay time $\tau_p$ associated with the polarizer (plus any length of polarization-maintaining optical fiber extending therefrom to the splice with optical fiber extending from loop coupler 17, and plus any such length of fiber extending from the opposite side of polarizer 15 to the $i^{th}$ coupling point between polarizer 15 and source 11) is set equal to a multiple of a retardation interval in the source complex degree of coherence function, these additional error terms will be significant in the circumstances since the complex degree of coherence function involved will be relatively large. Hence, setting $\tau_p$ to a multiple of the source retardation interval greater than one will substantially reduce this source of error because of the significant diminution in peak values with increasing multiples of the retardation interval in the source complex degree of coherence function. Further, the loss difference between the two polarization modes in coupler 17 between an input port or fiber and an output port or fiber may have to be specified at a suitable maximum such as being less than 10%.

Hence, one choice of polarization component propagation relative delay times for polarizer 1B and section 10" of depolarizer 10' (which, of course, sets the length for section 10'") which has been found satisfactory is to choose the delay time $\tau_p$ associated with the polarizer (plus any length of polarization-maintaining optical fiber extending therefrom to the splice with optical fiber extending from loop coupler 17, and plus any such length of fiber extending from the opposite side of polarizer 15 to the $i^{th}$ coupling point between polarizer 15 and source 11) to be equal to a multiple of a retardation interval in the source complex degree of coherence function (assuming equal repeated intervals in the function), i.e. set $\tau_p = m\tau_r$ where m is an integer. In addition, the polarization component relative propagation time delay associated with section 10" is set to be equal to a fraction of the retardation interval time of the source complex degree of coherence function. The choice (a) giving the greatest spacing between the resulting delay values of $\tau_p + N\tau_d$ for $N = -3, -2, -1, 1, 2$ and 3 along the delay axis over which the complex degree of coherence function for source 11 is measured, and the peaks located at multiples of $\tau_r$ along the delay axis in that same function, and (b) using the least amount of polarization-maintaining optical fiber, is to set $\tau_d = \tau_r/4$.

Figure 5:
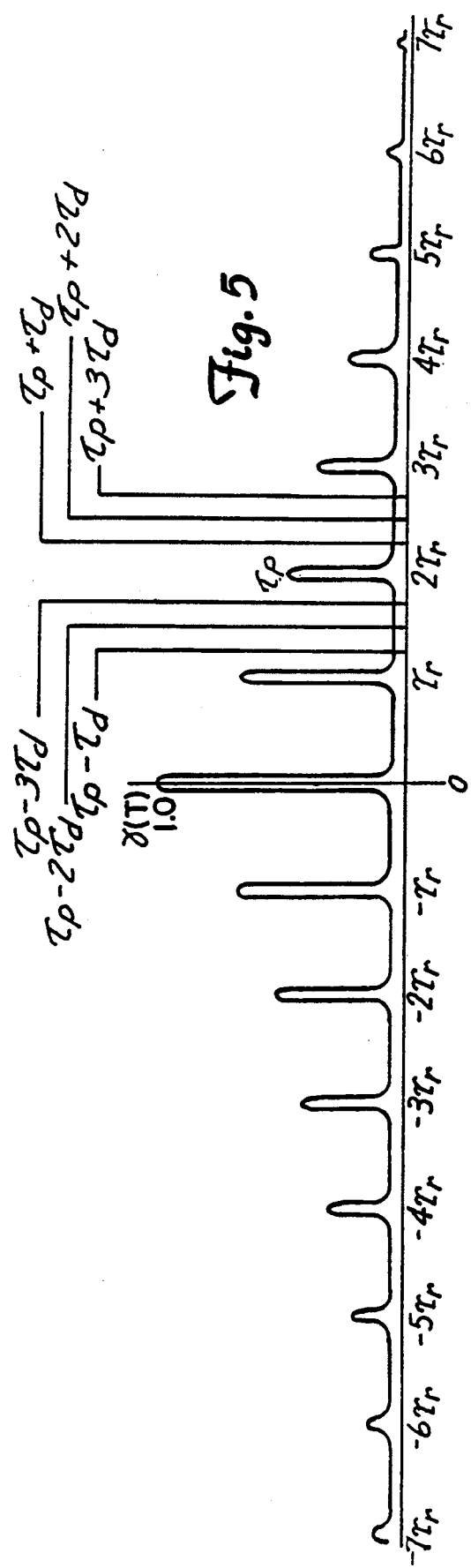
FIG. 5 shows a graph describing an aspect of an electromagnetic wave source and a relationship therewith for the system of FIG. 2.

Making that choice, and making the choice of m=2 so that $\tau_p = 2\tau_r$ rather than m=1 to reduce errors arising because of the situations described above, the delays shown as vertical arrows will occur along the delay axis over which the complex degree of coherence function for source 11 of FIG. 3 as shown in FIG. 5. Of course, other values could be chosen for $\tau_d$ which would also clear the peaks in the source 11 complex degree of coherence function, assuming $\tau_p$ chosen to be a multiple of $\tau_r$, including $\tau_d = 2/5\tau_r, 3/5\tau_r$ or $3/4\tau_r$.

Choosing $\tau_d$ to give the widest spacing between members of the delays $\tau_p + N\tau_d (N \neq 0)$ and the peaks of the source 11 complex degree of coherence function provides a degree of safety through the tolerance provided by keeping the delays $\tau_p + N\tau_d (N \neq 0)$ as far as possible from the nearest peaks of the source 11 complex degree of coherence function. Such a tolerance can be needed because, at cold temperatures, the ordinary single spatial mode optical fiber in coil 10 develops significant birefringence which gives the possibility of this fiber in effect constituting an extension of the polarization-maintaining optical fibers in depolarizer 10'. In that situation, $\tau_d$ supposedly set by the lengths of polarization-maintaining optical fiber chosen for sections 10" and 10'" of depolarizer 10' may effectively change through the result of having delay increments added thereto because of the behavior of the ordinary single spatial mode optical fiber in the remainder of coil 10.

Further, the presence of dispersion over the optical path from the "wavy" reference line through coil 10 and back means added delays. Such delays may be fixed delays or group delays, or several differing group delays one in each of several corresponding frequency bands, and the resulting broadening of the delays into ranges of delay in at least some situations must be taken into account in determining the propagation time differences between electromagnetic waves traveling through polarizer 15 or depolarizer 10', or through an optical integrated circuit which may be used for optical phase modulator 19 and loop coupler 17 for instance. The ranges of delays resulting from the broadening of the propagation time differences from single values to effectively a range of values requires that the appropriate ranges of delays must then be kept between the peaks of the source complex degree of coherence function to keep the value of that function negligibly small as indicated above.

As shown above, the phase error $\Delta\phi_e$ comprises two kind of error terms as was reflected in the equation $\Delta\phi_e = \Delta\phi_{Ampl} + \Delta\phi_{Inten}$. As indicated above, this last equation should have the notation therein changed when the source spectrum is taken into account to more fully indicate its breadth for splices, i.e. $\Delta\phi_e = \Delta\phi_{AmplTot} + \Delta\phi_{IntenTot}$. Because of the cumulative nature of the phase errors due to each splice considered alone, the last expression, following the indications above, should be generalized further to $\Delta\phi_e = \Delta\phi_{AmplTot-as} + \Delta\phi_{IntenTot-as}$. This generalization of the additive expression for the phase error $\Delta\phi_e$, involving the amplitude related phase error and the intensity related phase error, holds for the intensity phase error consideration of which will begin with the term $\Delta\phi_{Inten}$ since the expression therefor was given above.

Beginning with the expression for $\Delta\phi_{Inten}$ found above, but again finding the total intensity type related error, $\Delta\phi_{IntenTot}$, across the spectral width of at least source 11 requires once more taking into consideration the optical power provided at each value of the optical frequency $\nu$ in the optical frequency range of interest, or as a nominal value, $$\Delta\phi_{IntenTot} = \frac{\int |g_{xx}(\nu)\mathscr{E}_x(\nu)|^2 \Delta\phi_{Inten}(\nu)d\nu}{\int |g_{xx}(\nu)\mathscr{E}_x(\nu)|^2 d\nu}$$

to yield $$\Delta\phi_{IntenTot} = \frac{\epsilon^2 \int Im\{g_{xy}^*(\nu)g_{yx}(\nu)[|\mathscr{E}_x(\nu)|^2 - |\mathscr{E}_y(\nu)|^2]\}d\nu}{\int |g_{xx}(\nu)\mathscr{E}_x(\nu)|^2 d\nu}$$

Once again, the evaluation of this expression based on substituting the corresponding transfer matrix elements therein is more conveniently dealt with through breaking this last expression up according to is numerator and its denominator as $$\Delta\phi_{Intentot} \triangleq \frac{\epsilon^2 Im(\Delta\phi_{IntenTot-fn} - \Delta\phi_{IntenTot-sn})}{\Delta\phi_{IntenTot-d}}$$

where $$\Delta\phi_{IntenTot-fn} \triangleq \int g_{xy}^*(\nu)g_{xy}(\nu)|\mathscr{E}_x(\nu)|^2 d\nu,$$

$$\Delta\phi_{IntenTot-sn} \triangleq \int g_{xy}^*(\nu)g_{xy}(\nu)|\mathscr{E}_y(\nu)|^2 d\nu,$$

and $$\Delta\phi_{IntenTot-d} \triangleq \int |g_{xx}(\nu)\mathscr{E}_x(\nu)|^2 d\nu.$$

Again, use was made of the fact that the integral of the imaginary part of a complex variable over a real variable is equal to the imaginary part of the integral of that complex variable over the real variable. The values of the transfer matrix elements must then be substituted into these expression, which elements were set out above.

The remainder of the analysis based on the last equations with the appropriate transfer matrix elements therein proceeds much as the analysis did in the determination of the amplitude related phase error. However, the steps in this analysis will not be repeated here as the phase error related to intensity turns out to be relatively insignificant. Just a single term in the resulting equation found for the intensity error has the potential to give a magnitude which could be sufficiently large to add appreciably to the total phase error. That term is of the form $$\Delta\phi_{IntenTot} = 2\epsilon^2 \frac{P_{PolTran-in} - P_{PolBlock-in}}{P_{PolTran-in}} \Delta\psi f([L_1], [L_2]),$$

where $f([L_1],[L_2])$ represents a function of the matrix elements in the matrix operators $[L_1]$ and $[L_2]$ representing optical fiber lengths $L_1$ and $L_2$, respectively. The symbol $\Delta\psi$ represents the misalignment of the 45° splice in the depolarizer 10', or any effective misalignment caused by polarization dependent loss within lengths $L_1$ and $L_2$. Thus, that splice is modeled as there being an angular relationship between the principal birefringent axes of the polarization-maintaining optical fiber segments 10'' and 10''' on either side of the splice thereof, that angular relationship being 45° $+\Delta\psi$. The power ratio has therein variables $P_{PolTran-in}$ and $P_{PolBlock-in}$ representing the wave power incident on the transmission and blocking axes of polarizer 15 on the source side thereof.

Since the value of the function depending on the optical fiber parameters and lengths $L_1$ and $L_2$ can take values on the order of unity, the magnitude of the intensity error will depend on the quality of polarizer 15, represented in the last equation by its extinction coefficient $\epsilon$, and the amount of misalignment error $\Delta\psi$. Since the extinction ratio for polarizer 15 appears in the last equation for the intensity error as the square thereof, a well designed polarizer having its extinction coefficient on the order of 60 db permits $\Delta\psi$ to be on the order of several degrees and still result in the intensity error being negligible. A lesser quality polarizer will require a closer tolerance on the misalignment of the 45° splice at depolarizer 10', but since present day alignment techniques are capable of leaving the angular relationship between the principal birefringent axes in lengths 10'' and 10''' of depolarizer 10'with a deviation from 45° that is on the order of a tenth of a degree, this last expression representing the phase error due to intensity can be kept negligible through use of polarizers of reasonable quality, if not excellent quality.

Source coupler 12 in FIG. 2 is described above as being formed of polarization-maintaining optical fiber thus forming a relatively expensive directional coupler. This kind of directional coupler can be avoided with the use of a further depolarizer with source 11, that is, a directional coupler can be formed of ordinary single mode optical fiber for use as source coupler 12 if another depolarizer is used in series with that coupler to assure insertion of waves reaching polarizer 15 into every polarization mode.

Figure 6:
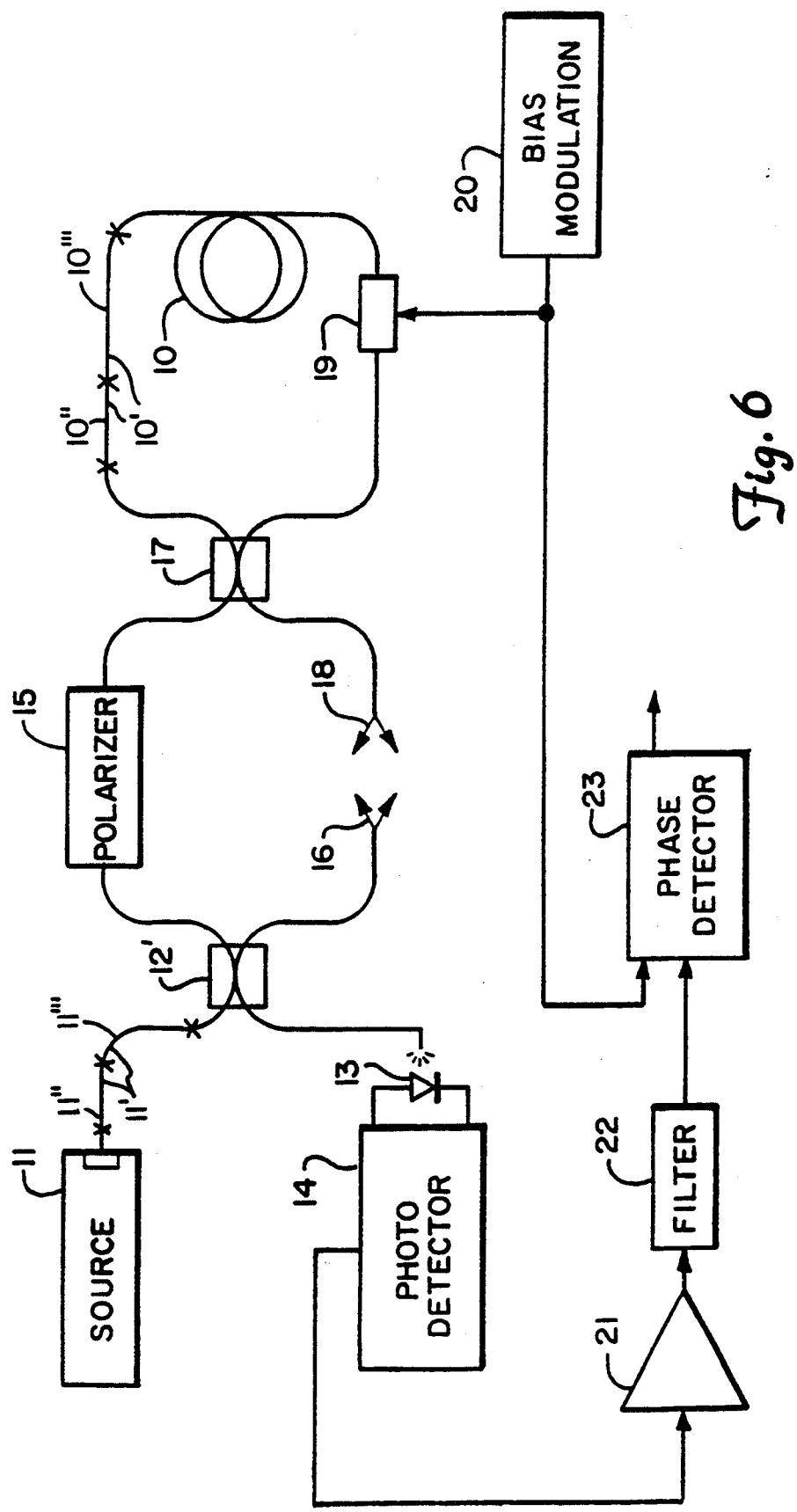
FIG. 6 shows a system schematic diagram combining a signal processing arrangement and an alternative optical transmission path and device arrangement embodying the present invention.

Such an arrangement is shown in FIG. 6 where a further depolarizer, 11', is shown between source 11 and a source coupler, 12', formed of ordinary single mode optical fiber. A length of ordinary single mode optical fiber extends appropriately from the emission face of source 11 to a splice with a first polarization-maintaining optical fiber portion, 11", in depolarizer 11'. A second portion of polarization-maintaining optical fiber, 11''', substantially twice as long as portion 11", is spliced to portion 11" with its principle axes of birefringence at equal angles to those of portion 11, i.e. angles of 45° between axes of one with respect to those of the other to form a 45° splice. Thus, depolarizer 11' is much like depolarizer 10' but the lengths of the corresponding portions of each will typically differ from that of the other.

The remaining end of portion 11''' is spliced to the ordinary single mode optical fiber extending from the coupling region in source coupler 12'. Also extending from that side of coupler 12' is another portion of ordinary single mode optical fiber to photodetector 13. On the opposite side, such a portion of fiber extends to polarizer 15 to be spliced against the transmission and blocking axes thereof (or splice to a length of polarization-maintaining optical fiber extending from polarizer 15 having its principle axes of birefringence aligned with those transmission and blocking axes. Finally, a further such fiber portion ends in a nonreflective termination, 16'.

Although the system of FIG. 6 will operate using an economical source coupler formed of ordinary single mode optical fiber, amplitude related phase errors, which occur therein much like they do in the system of FIG. 2, are somewhat more difficult to reduce or eliminate through proper choices of electromagnetic wave polarization component relative delays in polarizer 15 and depolarizers 10' and 11'. The added delays due to depolarizer 11' also show up in the source complex degree of coherence function in the error terms in addition to those of polarizer 15 and depolarizer 10' making the proper selections of the relative polarization component delays to minimize the value of such functions more difficult.

Figure 7:
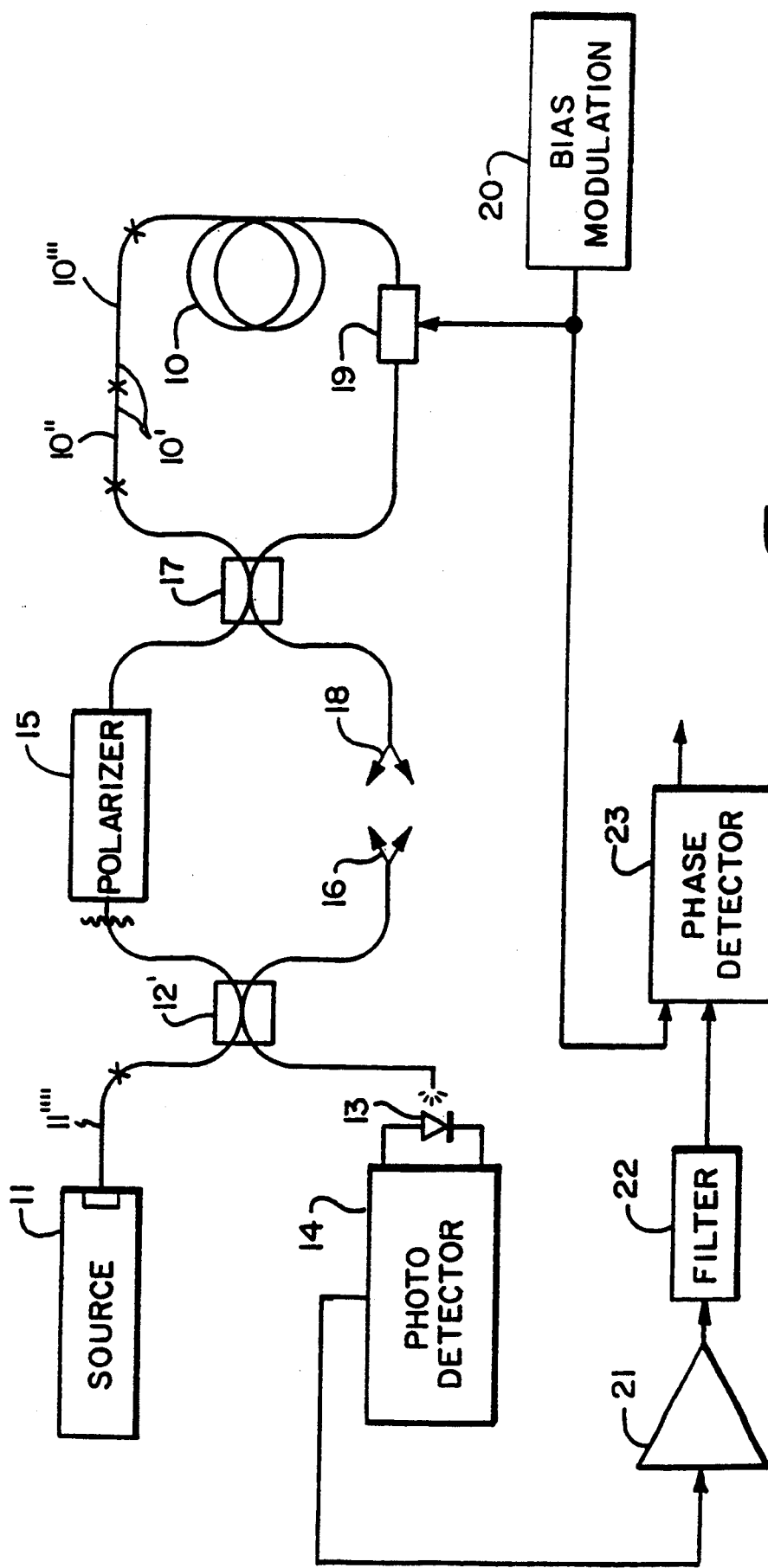
FIG. 7 shows a system schematic diagram combining a signal processing arrangement and an alternative optical transmission path and device arrangement embodying the present invention.

This difficulty can be reduced significantly by a simpler expedient for depolarizer 11' involving use of just a single further relative polarization component delay device. As shown in FIG. 7, a single length of polarization-maintaining optical fiber, 11'''', is used in the system shown there in place of depolarizer 11' in the system of FIG. 6. One end of length 11'''' is spliced to the ordinary single mode optical fiber extending from the coupling region of source coupler 12'. The opposite end of length 11'''' abuts, or is spliced to, the emission face of source 11 with its principle axes of birefringence at equal angles with the uncorrelated emission axes of source 11, i.e. oriented at 45° to these source axes. The other designation numerals in FIG. 7 for the devices, transmission paths, and blocks there are the same as those used for corresponding items in FIG. 2.

Depolarizer fiber segment 11'''', beginning the optical path in the system of FIG. 7 from source 11, is chosen of such a length as to have a delay difference between an electromagnetic wave polarization component propagating along the "y" axis thereof and another orthogonal component propagating along the "x" axis thereof of a value designated $\tau_b$. Here, $\tau_b = l_b \Delta n_{bconst}/c$ for a fixed propagation delay where $l_b$ is the length of beginning fiber segment 11'''' and $\Delta n_{bconst} = n_{xb} - n_{yb}$ is the differential index of refraction between the slow and fast axes thereof, or $$\tau_b \triangleq \frac{l_b}{c}\left\{\overline{\frac{d[\nu \Delta n_b(\nu)]}{d\nu}}\right\}$$

for a fixed group delay. The delay across polarizer 15 from the coupling point thereof to the ordinary single mode optical fibers extending from the coupling regions of source coupler 12 and loop coupler 17, including any polarization-maintaining optical fiber extensions from the main portion of polarizer 15 to reach splices with these coupler fibers, continues to be designated as $\tau_p$.

An analysis of the system of FIG. 7, proceeding like that in connection with FIG. 2, similarly begins with a composite Jones matrix as a matrix operator operating on the expression for the electromagnetic waves appearing at the "wavy" reference line to the left of polarizer 15 which will propagate in the clockwise direction through coil 10. Since this portion of the system in FIG. 7 to the right of the "wavy" line in that figure does not differ from portion to the right of the "wavy" line in FIG. 2, the composite matrix operator for the system of FIG. 7 with the same limitations as above can be repeated as $$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix} = \begin{bmatrix} 1 & 0 \\ 0 & \epsilon e^{-j2\pi\nu\tau_p} \end{bmatrix}[L_2] \times$$

$$\begin{bmatrix} 1 & 0 \\ 0 & e^{-j2\pi\nu 2\tau_d} \end{bmatrix}\begin{bmatrix} \frac{1}{\sqrt{2}} & \frac{1}{\sqrt{2}} \\ -\frac{1}{\sqrt{2}} & \frac{1}{\sqrt{2}} \end{bmatrix}\begin{bmatrix} 1 & 0 \\ 0 & e^{-j2\pi\nu\tau_d} \end{bmatrix}\times$$

$$[L_1]\begin{bmatrix} 1 & 0 \\ 0 & e^{-j2\pi\nu\tau_p} \end{bmatrix}$$

The symbols in this last expression retain the same meaning here as they had for the system of FIG. 2.

This last composite matrix operator for the system of FIG. 7, representing the effects on electromagnetic waves leaving the "wavy" reference line to propagate through coil 10 and return again, has again some terms in those corresponding products of the transfer matrix elements needed to evaluate $\Delta\phi_{AmplTot}$ which have $\tau_d$ appearing therein and some terms which don't just as the system of FIG. 2 does. Once again, those terms in such products which do not have $\tau_d$ appearing in them will be found to sum to zero because of the presence of depolarizer 10' if losses in the optical fiber following polarizer 15 are polarization independent.

As above, completing a finding of the total amplitude phase error $\Delta\phi_{AmplTot}$ for the system as it occurs at the "wavy" reference line, the electromagnetic waves emitted from source 11, passing through the 45° splice at the emission face of that source, optical fiber segment 11'''' and source coupler 12', must be introduced into this last expression. This is accomplished through using the individual equations implied in a Jones matrix equation relating $E_x(t)$ and $E_y(t)$ to $u(t)$ and $v(t)$, but differing from that matrix relating these waves used previously in the analysis of the system of FIG. 2. A new matrix must be used to represent transmission this optical path portion between source 11 and the "wavy" reference line which is $$\begin{bmatrix} E_x \\ E_y \end{bmatrix} = [L_3] \begin{bmatrix} 1 & 0 \\ 0 & e^{-j2\pi\nu\tau_b} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} u \\ v \end{bmatrix}$$

In this last expression, the matrix component $[L_3]$ has within it elements which represent the behavior of the ordinary single spatial mode optical fiber over the extent thereof not involved in forming fiber optic components, and also the behavior of those portions of that fiber in source coupler 12'. These elements will substantially vary with the environment such as changes in the birefringence present therein with changes in temperature, as for the matrices $[L_1]$ and $[L_2]$, and have the general form thereof but using the splitting factor q rather than $p_1$. The matrix component containing the parameter $\tau_b$ represents polarization-maintaining optical fiber segment 11'''', and the remaining matrix component represents the 45° splice at the emission face of source 11.

The products of the composite matrix operator elements in the expression preceding the last needed to evaluate $\Delta\phi_{AmplTot}$ will not be set out here as the overall analysis is very similar to that used in connection with the system of FIG. 2. The result of such an analysis of the system of FIG. 7 shows that there is a complex degree of coherence function in the numerator of $\Delta\phi_{AmplTot}$ which again must be made negligibly small for the purpose of reducing or eliminating the amplitude related phase error, this function being $\gamma(\tau_p+M\tau_b+N\tau_d)$ where $M=-1$ or 1 and $N=-1$, 1, $-2$, 2, $-3$ or 3.

Again, evaluating the denominator $\Delta\phi_{AmplTot-d}$ for $\Delta\phi_{AmplTot}$ gives the result much like that of the system of FIG. 2 in that a complex degree of coherence function is present therein as given hereafter, and so again imposing the signal fading criteria used with that system permits the system of FIG. 7 to reduce or eliminate the amplitude related phase error while also preventing signal fading. Hence, the requirement that $\gamma(N\tau_d+Q\tau_b)=0$ for $N=1, -1, 2, -2, 3$ and $-3$, and for $Q=-1, 0$ and 1. Further, $\gamma(\tau_b)=0$ must be met to a significant extent to assure that the degree of polarization of electromagnetic waves from source 11 is sufficiently low to avoid the possibility of too much blocking of those waves by polarizer 15.

Thus, the source complex degree of coherence function in the in the expression for the numerator of $\Delta\phi_{AmplTot}$, or $\gamma^*(\tau_p+M\tau_b+N\tau_d)$, must be kept at a relatively small value by choosing each of the results of combining (i) the difference in propagation time for electromagnetic waves propagating in the transmission and blocking axes of polarizer 15, $\tau_p$, alternatively (ii) with each of the integral multiples ($M=0$ excluded) of the difference in propagation time of such waves in the "x" and "y" axes of beginning optical fiber 11'''', $M\tau_b$, with each such alternative having in turn added thereto (iii) alternates of the integral multiples ($N=0$ excluded) of the difference in propagation time of such waves in the "x" and "y" axes of section 10'' of depolarizer 10', $N\tau_d$, to have a value for which this complex degree of coherence function is negligibly small. And simultaneously, to avoid signal fading, the source complex degree of coherence function $\gamma(N\tau_d+Q\tau_b)$ must again be kept at a small value (excluding the $N=0$ situation) by having the propagation time difference of electromagnetic waves in the "x" and the "y" axes of section 10'' of depolarizer 10', $\tau_d$, and certain integral multiples thereof, combined alternatively with each of the integral multiples of the difference in propagation time of such waves in the "x" and "y" axes of section 11'''', $Q_b\tau_b$, chosen to have a combined delay value at which this complex degree of coherence function is negligibly small. Thus, the polarization state preserving elements in the optical subsystem after source 11 are chosen to have selected polarization component propagation time differences to keep the amplitude related phase errors relatively small, and to avoid signal fading.

So, polarizer 15 must again be chosen in the system of FIG. 7 to have a certain difference in time between electromagnetic waves propagating therethrough in the blocking and transmission axes thereof, as must the lengths of polarization-maintaining optical fiber for section 10'' of depolarizer 10' and, in addition, of beginning optical fiber 11'''' to set the total delay time between waves propagating in the fast and slow axes thereof. This polarizer 15 time delay and the delays resulting from the lengths chosen for polarization-maintaining optical fiber sections 10'' and 10''' of depolarizer 10', and of polarization-maintaining beginning optical fiber 11'''', must be such that $\tau_p+M\tau_b+N\tau_d$ ($M,N\neq 0$) have values along the time delay axis over which the complex degree of coherence of source 11 is measured that fall between the peaks of that function where it has relatively low values. Similarly, the delay associated with the choice of length of polarization-maintaining optical fiber 10'' and the delay associated with the choice of length of polarization-maintaining optical fiber insert 11'''' must also be such that $N\tau_d+Q\tau_b(N\neq 0)$ has values along the time delay axis over which the complex degree of coherence function of source 11 is measured that simultaneously fall between the peaks of that function where it has relatively low values, and such that $\tau_b$ has values on this axis at which this function is also simultaneously small.

Specifically, a choice of relative polarization component propagation delay times for polarizer 15, sections 10'' and 10''' of depolarizer 10', and beginning fiber 11'''' which has been found satisfactory in the system of FIG. 6 is to choose the delay time $\tau_p$ associated with polarizer 15 (plus any length of polarization-maintaining optical fiber extending therefrom to splices with the ordinary single mode optical fiber extending from couplers 12 and 17) to be equal to a multiple of a retardation interval in the source complex degree of coherence function, i.e. set $\tau_p=m_1\tau_r$ where $m_1$ is an integer. In the same manner, the length of beginning optical fiber 11'''' will be set such that there is a delay $\tau_b$ associated therewith which is also a multiple of a retardation interval in the source complex degree of coherence function, that is, set $\tau_b=m_2\tau_r$ where $m_2$ is an integer which will lead to some signal fading because of only partial depolarization being provided by segment 11''''. After satisfying these requirements, the polarization component relative propagation time delay associated with section 10'' of polarizer 10' is set to be equal to a fraction of the retardation time interval of the source complex degree of coherence function, i.e. $\tau_d=m_3\tau_r$ where $m_3$ is a fraction. Setting $m_3=\frac{1}{4}$ once more is a good choice, as is setting $m_1=2$ and $m_2=4$. The same considerations go into making these choices as went into the same choices selected in connection with the system of FIG. 2 except that $m_2$ is desirably chosen to be an integer greater than one to help reduce signal fading.

One of those considerations is that losses in source coupler 12' and loop coupler 17 may be polarization dependent, such as is effectively the result of having different splitting ratios of electromagnetic waves at two coupler output ports of waves introduced at an input coupler port for each of the two orthogonal wave polarizations. In that circumstance, additional amplitude phase error terms will become significant and appear in the equation for $\Delta\phi_{AmplTot-as}$. Such additional terms will generally depend on the complex degree of coherence function $\gamma(\tau_p + Q\tau_b)$ where $Q=0$, 1 and $-1$. If the delay time $\tau_p$ associated with the polarizer (plus any length of polarization-maintaining optical fiber extending therefrom to the splices with the ordinary single mode optical fiber extending from couplers 12' and 17) and the delay time $\tau_b$ are each set equal to a multiple of a retardation interval in the source complex degree of coherence function, these additional error terms will be significant in the circumstances since the complex degree of coherence function involved will be relatively large. Hence, setting $\tau_p$ to a multiple of the source retardation interval greater than one will substantially reduce this source of error because of the significant diminution in peak values with increasing multiples of the retardation interval in the source complex degree of coherence function. Again, a suitable maximum may have to be set for differential losses between polarization modes from input to outputs for loop coupler 17.

In addition in connection with the system of FIG. 7, finding the total intensity type related error, $\Delta\phi_{IntenTot}$, across the spectral width of at least source 11 requires once again evaluating the general expression therefor given above specifically for this system. This is achieved by again substituting the corresponding transfer matrix elements therein. Since the system to the right of the "wavy" reference line in FIG. 7 is the same as the portion of the system to the right of the "wavy" line in FIG. 2, the same result ensues for the system of FIG. 7 as was found for the system of FIG. 2. However, here the power ratio will be close to zero rather than close to one, as in the system of FIG. 2, because of the depolarization occurring through segment 11''''.

Figure 8:
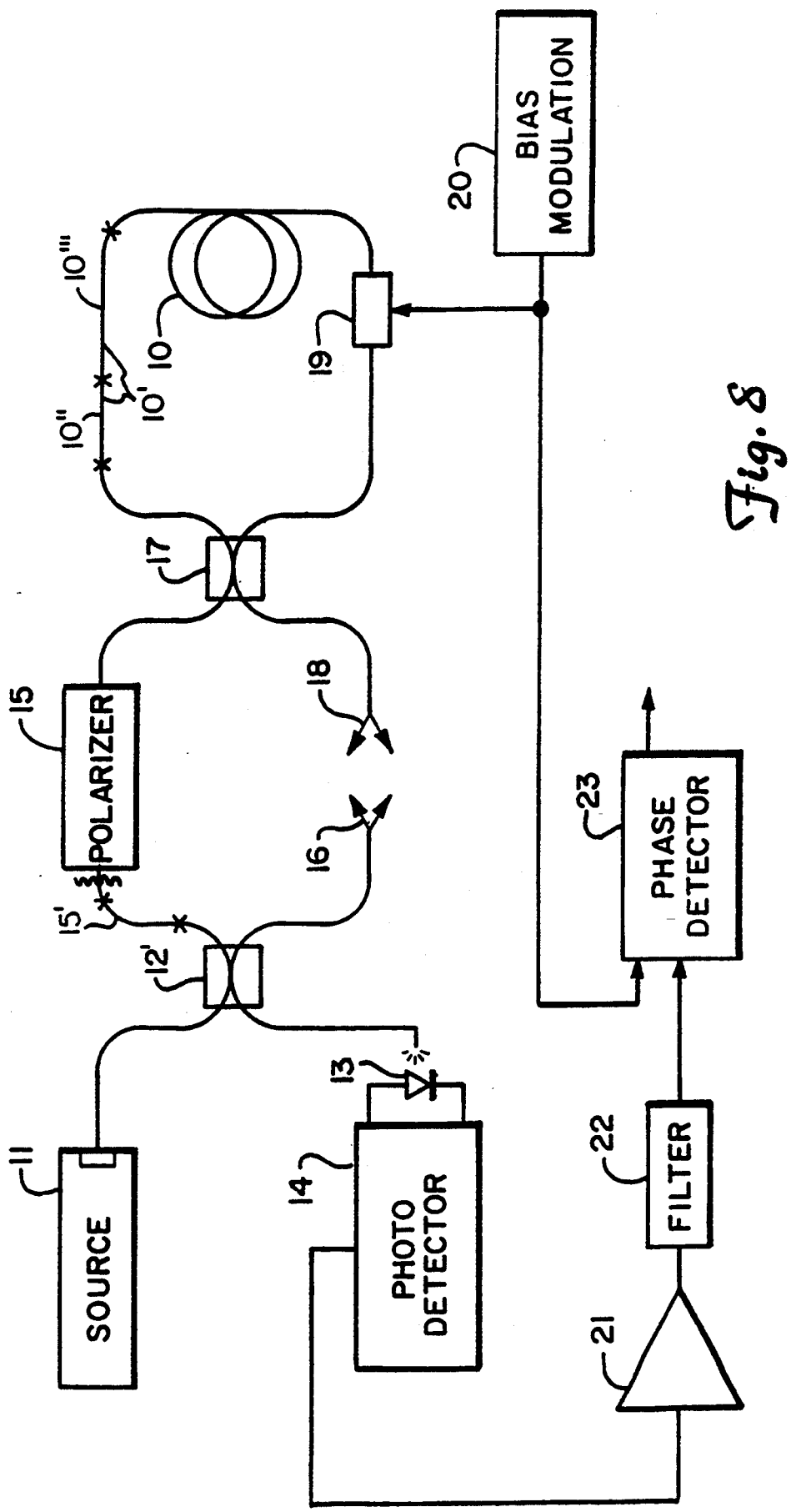
FIG. 8 shows a system schematic diagram combining a signal processing arrangement and an alternative optical transmission path and device arrangement embodying the present invention.

The system of FIG. 7 can be implemented in a further alternative but optically equivalent manner as shown in FIG. 8. Rather than inserting segment 11'''' of polarization-maintaining optical fiber at the emitting surface of source 11, such a segment, now designated 15', can be inserted between the ordinary single mode fiber extension from the coupling region of directional coupler 12' and polarizer 15 with the principle birefringence axes thereof making equal angles with the transmission and blocking axes of polarizer 15. This may be easier and more economical than joining fiber 11'''' to the emission face as previously described. There is a slight difference from that arrangement in FIG. 8 in that a polarization-maintaining optical fiber extension from polarizer 15 is shown in FIG. 8 with its principle birefringence axes aligned with the transmission and blocking axes of polarizer 15, but spliced at equal angles with the principal birefringence axes of polarization-maintaining optical fiber segment 15'. The opposite end of segment 15' is spliced to the ordinary single mode optical fiber extending from coupler 12'. The composite operator used for the clockwise wave in the system of FIG. 7 again applies for the same wave in the system of FIG. 8. Generally, substantially the same analyses and the same results therefrom that occur for the system of FIG. 7 apply to the system of FIG. 8. The delay $\tau_b$ now applies to the relative polarization component delay in segment 15'.

In addition to the errors already described to which the system of FIG. 1 is subject, there is a further source of error which fiber optic gyroscopes will often encounter. Although, as indicated above, there is little birefringence dispersion in coiled single spatial mode optical fibers, this situation can still result in a phase error in a magnetic field, such as the earth's magnetic field, because of the Faraday effect.

That is, if polarized electromagnetic waves having a relatively broad spectral distribution are introduced into the ordinary single spatial mode optical fiber of coil 10, those electromagnetic waves will still be substantially polarized even after propagating through several hundred meters of that fiber. Such a result implies that the electromagnetic waves at all wavelengths follow the same polarization change evolution during propagation.

During the time of propagation that those waves are circularly polarized in coil 10, a uniform magnetic field introduces a non-reciprocal phase shift because of the Faraday effect, i.e. the changing of the indices of refraction for right-handed polarized light and for left-handed polarized light because of the effects of the magnetic field on the medium in which the propagation occurs. The total non-reciprocal phase shift accumulated around coil 10 will average to zero to the extent that waves spend equal time in the right- and left-hand circularized polarization states traveling with and against the magnetic field.

Such a condition is very well met for an interferometric optical fiber gyroscope using polarization-maintaining optical fiber in its coil with the result that such a fiber optic gyroscope is rather insensitive to magnetic fields. On the other hand, the system of FIG. 1, having a single depolarizer therein located between coil 10 and loop coupler 17, does not result in an averaging around the coil which will suppress magnetic field sensitivity even though that depolarizer distributes the polarization states of the waves passing therethrough as a function of the optical wavelength.

The electromagnetic waves passing through loop directional coupler 17 are split into clockwise and counterclockwise waves each with an initial polarization state, these polarization states evolving to new polarization states as the waves propagate in opposite directions through depolarizer 10' and coil 10. Certain portions of the counter propagating electromagnetic waves, having taken the same polarization evolution through coil 10 and depolarizer 10', return to polarizer 15 in such a polarization state as to be passed through the transmission axis thereof. The other portions of the counter-propagating electromagnetic waves which have taken different polarization evolutions will be rejected by polarizer 15.

Depolarizer 10' does not solely control the polarization evolution of electromagnetic waves to distribute which of them are to pass through polarizer 15 along its transmission axis, but only assures that half of those electromagnetic waves do so. However, the particular wavelengths of the electromagnetic waves which will pass through the transmission axis of polarizer 15 vary in time as does the specific polarization history of these waves, this being true because of the inevitable temperature changes of depolarizer 10' and coil 10. Changes in temperature lead to differing values for $\tau_d$ in depolarizer 10', and temperature changes in coil 10 lead to changing birefringence therein, i.e. changing phase relationships between the polarization components of electromagnetic waves propagating therethrough.

For instance, the clockwise electromagnetic waves, after passing through depolarizer 10' on the way to entering at the beginning of coil 10, are evenly divided between a pair of polarization states which are orthogonal to each other. Certain optical wavelengths are sent in one of these states and the remaining optical wavelengths are sent in the other state. Since there is little birefringence dispersion in the coiled single mode fiber, all the waves (i.e. all the wavelengths) in the one state follow the same polarization evolution through coil 10 and present themselves to the transmission axis of polarizer 15 to thereafter reach photodetector 13. Similarly, all the waves in the other state follow the same polarization evolution through coil 10 and present themselves to the blocking axis of polarizer 15. Everywhere within the coil, waves originating in the first state are orthogonal to waves originating in the other state. Due to the changing birefringence of coil 10 over temperature, just which of the waves leaving depolarizer 10' reach the transmission or blocking axes of polarizer 15 will change with temperature. Hence, the magnetic field induced phase differences between the counter-propagating waves reaching photodetector 13 after passing through the transmission axis of polarizer 15 at any particular time will be determined by only those waves having the currently preferred polarization evolution histories.

Similarly, by reciprocity, the counterclockwise electromagnetic waves that reach photodetector 13 will also have been subjected to the effects in coil 10 that the clockwise waves reaching photodetector 13 have, but in the reverse direction. Thus, the polarization evolution of the waves reaching photodetector 13 is being detected for both the clockwise and counterclockwise propagating waves.

As a result, the phase differences of the electromagnetic waves reaching photodetector 13 have a time varying component therein. Those electromagnetic waves traveling in opposite directions through coil 10 will alternately be speeded or slowed with respect to the opposite direction wave in the same polarization state at the same wavelength because of propagating with and then against the direction of the magnetic field with unequal times spent in right and left circularly polarized states. The changing wavelength of the waves reaching photodetector 13 due to changing temperature means that waves associated with a propagation direction will have varying phase evolution histories in reaching photodetector 13 so that the magnetic field sensitivity leads to a bias drift in the gyroscope output signal over environmental changes in the presence of a magnetic field.

In addition, if the temperature changes in coil 10 are relatively rapid, a further source of non-reciprocal phase shifts arises, i.e. another source of phase error indistinguishable from the Sagnac effect. During times of such temperature changes, the preferred polarization paths of each of the counterpropagating electromagnetic waves in coil 10 are as a result changing. Since corresponding portions of these counterpropagating waves propagate through any particularly part of coil 10 (excepting the coil midpoint) at different times, they will propagate along different preferred paths in that coil enroute to polarizer 15 thereby having such a non-reciprocal phase shift between them. This phase error arises independently of the well-known errors due to time-varying temperature gradients occurring because of uneven heating and cooling occurring through the bulk of coil 10.

The addition of a second depolarizer between polarizer 15 and loop coupler 17 assures that there will be no preferred polarization evolution history in the waves reaching photodetector 13, but rather that there will be contributions from all such histories reaching photodetector 13 to effectively average to zero the magnetic field phase difference and the rapid temperature change induced phase difference associated with each such history and so eliminate drift in the output bias. The use of a partial depolarizer instead of a full second depolarizer will lead to partial averaging, and so partially eliminate drifting in the output bias.

Figure 9:
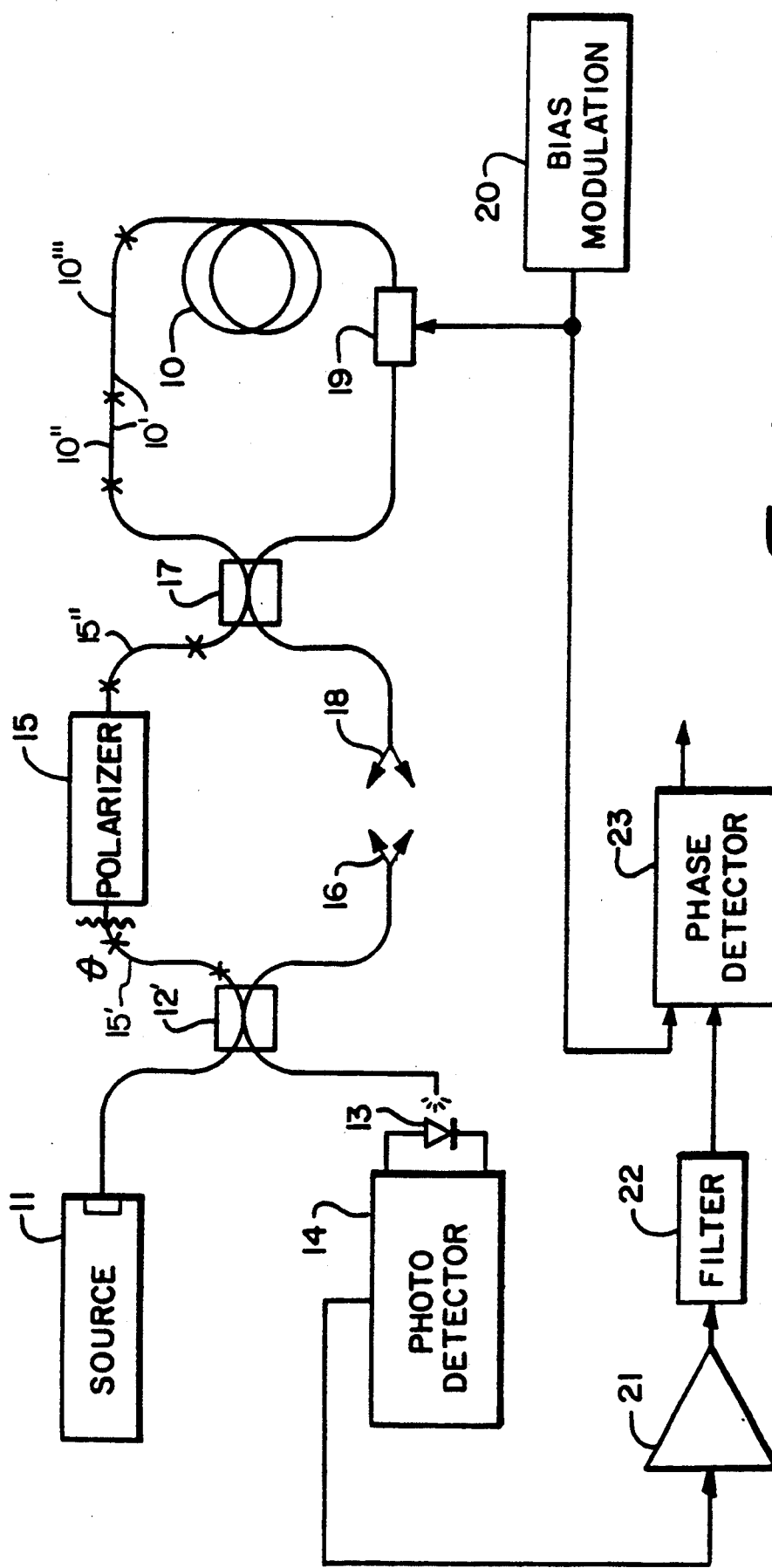
FIG. 9 shows a system schematic diagram combining a signal processing arrangement and an alternative optical transmission path and device arrangement embodying the present invention.

Such a system is shown in FIG. 9 where a further portion of polarization-maintaining optical fiber, 15", has been added as an insert between polarizer 15 and loop coupler 17 as compared with the system of FIG. 2. Polarizer 15 is shown having a portion of polarization-maintaining optical fiber extending to the right therefrom with its "x" axis aligned with the transmission axis of polarizer 15 and its "y" axis aligned with the blocking axis of polarizer 15. Polarization-maintaining optical fiber added insert 15" is shown spliced to this piece of fiber extending from polarizer 15 in a 45° splice such that the "x" and "y" principal birefringent axes of insert 15" are at equal angles between the principal birefringent axes of the polarization-maintaining optical fiber extending from polarizer 15, i.e. at 45° from each. A further splice is made between polarization-maintaining optical fiber added insert 15" and the ordinary single spatial mode optical fiber extending from loop coupler 17. The other designation numerals in FIG. 9 for the devices, transmission paths, and blocks shown therein are the same as those used for corresponding items in FIG. 2.

Thus, added insert 15" together with the polarization-maintaining optical fiber extending from polarizer 15 in a 45° splice form a potential full second depolarizer, but this insert alternatively can be configured to actually be a partial depolarizer as will be shown below. However, such a further full or partial depolarizer would also be formed if added insert 15" itself was spliced to polarizer 15 so that its "x" and "y" axes made equal angles with the transmission and blocking axes of polarizer 15, i.e. again at an angle of 45° from each. Hence, a polarization-maintaining optical fiber extension from polarizer 15 before the splice with added insert 15" is an unneeded extension, though it may be provided with polarizer 15, since in the circumstances in which the extension is omitted a depolarizer can be formed by appropriately splicing polarizer 15 and added insert 15" together. Of course, a full two segment depolarizer like depolarizer 10' could be inserted between loop coupler 17 and polarizer 15 if an extension from polarizer 15 were provided of ordinary single mode optical fiber.

Added insert 15" in the system of FIG. 9 is chosen of such a length as to have a delay difference between an electromagnetic wave polarization component propagating along the "y" axis thereof and another orthogonal component propagating along the "x" axis thereof of a value designated $\tau_a$. Here, $\tau_a = l_a \Delta n_{aconst}/c3$ for a fixed propagation delay where $l_a$ is the length of added fiber insert 15" and $\Delta n_{aconst} = n_{xa} - n_{ya}$ is the differential index of refraction between the slow and fast axes thereof, or $$\tau_a \triangleq \frac{l_a}{c}\left\{ \frac{d[\nu \Delta n_a(\nu)]}{d\nu} \right\}$$

for a fixed group delay. The delay across polarizer 15 from the $i^{th}$ coupling point immediately left of the "wavy" reference line, including any polarization-maintaining optical fiber extension from the main portion of polarizer 15 to reach the splice with added insert 15", continues to be designated as $\tau_p$.

The presence of another depolarizing means in the system of FIG. 9, due to including therein added insert 15" therein and the associated 45° splice, results in introducing partially polarized electromagnetic waves into coil 10 in selected circumstances. If the length of insert 15" is chosen so that the relative polarization component delay therethrough equals a multiple of the retardation interval in the complex degree of coherence function of source 11, only partial depolarization will occur.

This can be seen if the orthogonal components of those waves are written $E'_x$ and $E'_y$, and the corresponding, well known coherency matrix is formed therewith, or $$J = \begin{bmatrix} <|E_x(t)|^2> & <E_x^*(t)E_y(t)> \\ <E_x(t)E_y^*(t)> & <|E_y(t)|^2> \end{bmatrix}.$$

The ratio of the intensity of the polarized part of the waves to the intensity of the waves in total is the degree of polarization $\mathcal{P}$ and, as is well known, can be shown to be $$\mathcal{P} = \sqrt{1 - 4\frac{det[J]}{(tr[J])^2}},$$

where det [J] is the determinant of the coherency matrix and tr [J] is the trace of that matrix. For the system of FIG. 9, the degree of polarization of electromagnetic waves entering coil 10 can be shown to be $\mathcal{P} = \gamma(\tau_a)$, and which can further be shown to be the reciprocal of the factor by which the magnetic sensitivity of that system is reduced. Thus, if $\tau_a$ is chosen to have a value equal to a source complex degree of coherence function retardation interval, so that the function has a subsequent value typically from 0.01 to 0.1 or more, the magnetic sensitivity will be correspondingly reduced. The system of FIG. 2, of course, with the propagating waves therein leaving polarizer 15 directly to enter coil 10 through loop coupler 17 without further depolarizing optical components in the path has the degree of polarization of those waves entering coil 10 essentially equal to one to within $\epsilon^2$ thereof.

An analysis of the system of FIG. 9, proceeding like that in connection with FIG. 2, again begins with a composite Jones matrix as a matrix operator operating on the expression for electromagnetic waves appearing at the "wavy" reference line to the left of polarizer 15 which will propagate in the clockwise direction through coil 10. Accepting the same limitations as before, the composite matrix operator for the system of FIG. 9 can be written as $$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix} =$$

$$\begin{bmatrix} 1 & 0 \\ 0 & \epsilon e^{-j2\pi\nu\tau_p} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi\nu\tau_a} \end{bmatrix} [L_2] \times$$

$$\begin{bmatrix} 1 & 0 \\ 0 & e^{-j2\pi\nu 2\tau_d} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi\nu\tau_d} \end{bmatrix} \times$$

$$[L_1]\begin{bmatrix} 1 & 0 \\ 0 & e^{-j2\pi\nu\tau_a} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & \epsilon e^{-j2\pi\nu\tau_p} \end{bmatrix},$$

where again the middle three component matrices in this last expression for the clockwise composite transfer matrix $G_{cw}$ together represent depolarizer 10'.

The additional matrices containing the delay parameter $\tau_a$, and the matrices adjacent thereto containing elements based on the value $1\sqrt{2}$ represent the depolarizer formed by the 45° splice of added insert optical fiber 15" and polarizer 15 (or the polarization-maintaining optical fiber extending therefrom to the splice with insert 15"). The component matrices representing the lengths of ordinary single spatial mode optical fiber $L_1$ and $L_2$, $[L_1]$ and $[L_2]$, can be represented in the same general form as given above therefor. Here, the lengths $L_1$ and $L_2$ extend to either side of depolarizer 10' as before, but each begins at the splice of added insert polarization-maintaining fiber 15" with the ordinary single spatial mode optical fiber extending from loop coupler 17.

This last composite matrix operator for the system of FIG. 9, representing the effects on electromagnetic waves leaving the "wavy" reference line to propagate through coil 10 and return again, again has some terms in those corresponding products of the transfer matrix elements needed to evaluate $\Delta\phi_{AmplTot}$ which have $\tau_d$ appearing therein and some terms which don't. Also once again, those terms in such products which do not have $\tau_d$ appearing in them sum to zero because of the presence of depolarizer 10' if losses in the optical fiber following polarizer 15 are polarization independent. This situation can be shown by substituting in this last composite matrix operator a more general matrix $[L_3]$ in place of the matrices therein representing the effects of added insert optical fiber 15", and of the 45° splice between that insert and polarizer 15 (or the polarization-maintaining optical fiber extending therefrom to the splice if used). Such a substitution provides for any sort of optical fiber insert between polarizer 15 and loop coupler 17 to thereby give a result of greater generality. Doing such substituting leads to a corresponding generalized composite transfer matrix $G_{cw-g}$ operating on electromagnetic waves leaving the "wavy" reference line to propagate through coil 10 and depolarizer 10' and return, or $$G_{cw-g} = \begin{bmatrix} g_{xx-g}(\nu) & \epsilon g_{xy-g}(\nu) \\ \epsilon g_{yx-g}(\nu) & \epsilon^2 g_{yy-g}(\nu) \end{bmatrix} =$$

$$\begin{bmatrix} 1 & 0 \\ 0 & \epsilon e^{-j2\pi\nu\tau_p} \end{bmatrix} [L_3]^T [L_2] \times$$

$$\begin{bmatrix} 1 & 0 \\ 0 & e^{-j2\pi\nu 2\tau_d} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi\nu\tau_d} \end{bmatrix} \times$$

$$[L_1][L_3] \begin{bmatrix} 1 & 0 \\ 0 & e^{-j2\pi\nu\tau_p} \end{bmatrix}$$

where $[L_3]$ will have the same general form, omitting p in the absence of any split of the waves therethrough, as did $[L_1]$ and $[L_2]$. Thus, $[L_3]$ is written as $$[L_3] = \begin{bmatrix} A_3 & B_3 \\ C_3 & D_3 \end{bmatrix} = e^{-\zeta_3} \begin{bmatrix} A_3' & B_3' \\ C_3' & D_3' \end{bmatrix}.$$

Expanding this matrix operator $G_{cw-g}$ allows determining the elements of the composite transfer matrix. The first two are found to be $$g_{xx-g} = A_1A_2A_3^2 + A_1C_2A_3C_3 + B_1A_2A_3C_3 + B_1C_2C_3^2 +$$
$$[C_1A_2C_3^2 + C_1C_2A_3C_3 + D_1A_2A_3C_3 + D_1C_2C_3^2]e^{-j2\pi\nu\tau_d} -$$
$$[A_1B_2A_3^2 + A_1D_2A_3C_3 + B_1B_2A_3C_3 + B_1D_2C_3^2]e^{-j2\pi\nu 2\tau_d} +$$
$$[C_1B_2A_3^2 + C_1D_2A_3C_3 + D_1B_2A_3C_3 + D_1D_2C_3^2]e^{-j2\pi\nu 3\tau_d},$$

and $$g_{xy-g} = \{A_1A_2A_3B_3 + A_1C_2B_3C_3 + B_1A_2A_3D_3 + B_1C_2C_3D_3 +$$
$$[C_1A_2A_3B_3 + C_1C_2B_3C_3 + D_1A_2A_3D_3 + D_1C_2C_3D_3]e^{-j2\pi\nu\tau_d} -$$
$$[A_1B_2A_3B_3 + A_1D_2B_3C_3 + B_1B_2A_3D_3 + B_1D_2C_3D_3]e^{-j2\pi\nu 2\tau_d} +$$
$$[C_1B_2A_3B_3 + C_1D_2B_3C_3 + D_1B_2A_3D_3 + D_1D_2C_3D_3]e^{-j2\pi\nu 3\tau_d}\}.$$

In finding the amplitude phase error $\Delta\phi_{AmplTot}$, the first numerator term $\Delta\phi_{AmplTot-fn}$ requires finding the product $g_{xx-g} g_{xy-g}$ as indicated above. From the foregoing transfer matrix elements of the composite transfer matrix, one can see that this product will contain 256 terms of which 64 will not contain the delay parameter $\tau_d$.

Because of exhibiting losses independent of polarization (though this may not always be true in every instance as indicated below), matrix $[L_3]$ and again matrices $[L_1]$ and $[L_2]$ will be unitary, and so $$B_1^*A_1 + D_1^*C_1 = 0,$$

$$A_2^*C_2 + B_2^*D_2 = 0,$$

and $$A_3^*B_3 + C_3^*D_3 = 0.$$

Using these equations, the result for the product $*g_{xx-g} g_{xy-g}$ will have the 64 terms without $\tau_d$ therein summed to zero leaving only terms in which the parameter $\tau_d$ appears. A similar result can be shown for the product $g_{xx-g}(\nu) *g_{yx-g}(\nu)$, and so the evaluation of $\Delta\phi_{AmplTot}$ can proceed for the system of FIG. 9 essentially as it proceeded for the system of FIG. 2. In this analysis, the relationship between the electric fields at the "wavy" reference line and emission electric fields at source 11 is again the one used in the analysis of the system in FIG. 2 rather than the relationship set out for the analysis of the system of FIG. 7. As a result, the numerator of $\Delta\phi_{AmplTot}$ for the system of FIG. 9 is found to be $$\epsilon Im(\Delta\phi_{AmplTot-fn} + \Delta\phi_{AmplTot-sn}) =$$

$$\frac{k\epsilon}{2}(P_v - P_u)Im\left[\sum_{M=-1}^{1} \sum_{N=-3}^{3} \eta_{M,N}\gamma^*(\tau_p + M\tau_a + N\tau_d)\right],$$

where $\eta_{-1,0} = \eta_{0,0} = \eta_{1,0} = 0$, and the other values for $\eta_{M,N}$ obtained from analysis are not presented since only the complex degree of coherence of source 11 in the numerator of $\Delta\phi_{AmplTot}$, having the system imposed relative delays of the polarization components in its argument as given in the last equation, is needed for the purpose of designing the system of FIG. 9 to reduce or eliminate the amplitude related phase error.

Evaluating the denominator $\Delta\phi_{AmplTot-d}$ for $\Delta\phi_{AmplTot}$ gives a result for the system of FIG. 9 very much like that for the system of FIG. 2 in that a complex degree of coherence function is present therein as given below. Hence, again imposing the signal fading criteria used with that system permits the system of FIG. 9 to reduce or eliminate the amplitude related phase error while also preventing signal fading.

Thus, the source complex degree of coherence function in the last expression $\gamma^*(\tau_p + M\tau_a + N\tau_d)$ must be kept at a relatively small value by choosing each of the results of combining (i) the difference in propagation time for electromagnetic waves propagating in the transmission and blocking axes of polarizer 15, $\tau_p$, alternatively (ii) with each of the integral multiples of the difference in propagation time of such waves in the "x" and "y" axes of added insert 15", $M\tau_a$, with each such alternative having in turn added thereto (iii) alternates of the integral multiples (N=0 excluded) of the difference in propagation time of such waves in the "x" and "y" axes of section 10" of depolarizer 10', $N\tau_d$, to have a value for which this complex degree of coherence function is negligibly small. Again simultaneously, to avoid signal fading, the source complex degree of coherence function $\gamma(N\tau_d + Q2\tau_a)$ with Q=-1, 0, 1 must be kept at a small value (excluding the N=0 situation) by having the propagation time difference of electromagnetic waves in the "x" and the "y" axes of section 10" of depolarizer 10', $\tau_d$, and certain integral multiples thereof, combined alternatively with each of the integral multiples of twice the difference in propagation time of such waves in the "x" and "y" axes of section 15", $Q2\tau_a$, chosen at values such that this complex degree of coherence function is negligibly small in these other situations. Thus, again, the polarization state preserving elements on the loop or coil side of the coupling point to the left of polarizer 15 are chosen to have selected polarization component propagation time differences to keep the amplitude related phase errors relatively small, and to avoid signal fading.

Thus, polarizer 15 must again be chosen in the system of FIG. 9 to have a certain difference in time between electromagnetic waves propagating therethrough in the blocking and transmission axes thereof, as must the lengths of polarization-maintaining optical fiber for section 10" of depolarizer 10' and, now also, of added insert 15" to set the total delay time between waves propagating in the fast and slow axes thereof. This polarizer 15 time delay and the delays resulting from the lengths chosen for polarization-maintaining optical fiber sections 10" and 10''' of depolarizer 10', and of polarization-maintaining optical fiber added insert 15", must be such that $\tau_p + M\tau_a + N\tau_d (N \neq 0)$ have values along the time delay axis over which the complex degree of coherence of source 11 is measured that fall between the peaks of that function where it has relatively low values. Similarly, the delay associated with the choice of length of polarization-maintaining optical fiber 10" and the delay associated with the choice of length of polarization-maintaining optical fiber insert 15" must also be such that $N\tau_d + 2Q\tau_a (N \neq 0)$ has values along the time delay axis over which the complex degree of coherence function of source 11 is measured that simultaneously fall between the peaks of that function where it has relatively low values.

Selecting again one particular choice of relative polarization component propagation delay times for polarizer 15, sections 10" and 10''' of depolarizer 10', and added insert 15" which has been found satisfactory in the system of FIG. 9 is to choose the delay time $\tau_p$ associated with polarizer 15 (plus any length of polarization-maintaining optical fiber extending therefrom to a splice with added insert 15", and plus any length from the opposite side of polarizer 15 to the $i^{th}$ coupling point between polarizer 15 and source 11) to be equal to a multiple of a retardation interval in the source complex degree of coherence function, i.e. set $\tau_p = m_1 \tau_r$ where $m_1$ is an integer. Similarly, the length of added optical fiber insert 15" will be set such that there is a delay $\tau_a$ associated therewith which is also a multiple of a retardation interval in the source complex degree of coherence function, that is, set $\tau_a = m_2 \tau_r$ where $m_2$ is an integer. Then, again, the polarization component relative propagation time delay associated with section 10" of polarizer 10' is set to be equal to a fraction of the retardation time interval of the source complex degree of coherence function, i.e. $\tau_d = m_3 \tau_r$ where $m_3$ is a fraction. Again, setting $m_3 = \frac{1}{4}$ is a good choice, as is setting $m_1 = 2$ and $m_2 = 4$.

If the extinction coefficient of polarizer 15 is small enough and the polarization dependent loss over lengths $L_1$ and $L_2$ is small enough, the choices of $m_1 = 1$ and $m_2 = 2$ can be made (without an undue increase in intensity error or amplitude error). Note that with either of these sets of choices, the degree of polarization $\mathcal{P}$ of electromagnetic waves entering coil 10 is $\gamma(\tau_a = 4\tau_r \text{ or } 2\tau_r)$ so that this function is evaluated at a peak in the source coherence function and is relatively large in value typically being in the range of several hundredths to a tenth or more for a typical source.

As before, the same considerations go into making these choices here as went into the similar choices made in connection with the system of FIG. 2. Thus, if different splitting ratios of electromagnetic waves, introduced at an input coupler or port of loop coupler 17, occur at two of its coupler output ports for each of the two orthogonal wave polarizations so that the losses in loop coupler 17 are polarization dependent, additional amplitude phase error terms will become significant and appear in the equation for $\Delta\phi_{AmplTot\text{-}as}$ which can be obtained for the system of FIG. 9 though not set out here. Such additional terms will generally have the forms $$(A_1 B_1^* + C_1 D_1^*) \frac{P_u - P_v}{P_u} k \epsilon \gamma(\tau_p + M\tau_a),$$

$$(A_2 B_2^* + C_2 D_2^*) \frac{P_u - P_v}{P_u} k \epsilon \gamma(\tau_p + M\tau_a)$$

where $M = 1$ and $-1$, and $$[(C_2^2 + D_2^2) - (B_1^2 + D_1^2)] \frac{P_u - P_v}{P_u} k \epsilon \gamma(\tau_p).$$

$P_u$ and $P_v$ remain the powers of the electromagnetic waves emitted along the orthogonal axes of source 11. The first two of these last three equations shows that the choice of $m_1 = m_2$ should not be made in setting values for $\tau_p$ and $\tau_a$ above because the argument of the second complex degree of coherence function would then take a value of zero for $M = -1$, a situation which leads to errors due to polarization dependent loss that are unacceptably large.

If, as is suggested above, the delay time $\tau_p$ associated with the polarizer (plus any length of polarization-maintaining optical fiber extending therefrom to the splice with added optical fiber insert 15", and plus any such length of fiber extending from the opposite side of polarizer 15 to the $i^{th}$ coupling point between polarizer 15 and source 11) is set equal to a multiple of a retardation interval in the source complex degree of coherence function, these additional error terms will be significant in the circumstances since the complex degree of coherence function involved will be relatively large (particularly if $\tau_a$ is also set to a multiple of a retardation interval in the source complex degree of coherence function). Hence, setting $\tau_p$ to a multiple of the source retardation interval greater than one, as also suggested above, will substantially reduce this source of error because of the significant diminution in peak values with increasing multiples of the retardation interval in the source complex degree of coherence function. Further, the loss difference between the two polarization modes in coupler 17 between an input port or fiber and an output port or fiber may in this situation also have to be specified at a suitable maximum.

An alternative solution to the presence of error terms due to polarization dependent losses in the optical subsystem of FIG. 9, one which uses less of the expensive polarization-maintaining optical fiber, is to not set $\tau_p$ to equal a multiple of the retardation interval in the source complex degree of coherence function. Thus, instead, set $m_1$ in $\tau_p = m_1 \tau_r$ equal to a mixed whole and fractional number greater than one, such as $1\frac{1}{2}$ or $2\frac{1}{2}$, etc., leaving $m_2$ in $\tau_a = m_2 \tau_r$ an integer such as one. Then $m_3$ in $\tau_d = m_3 \tau_r$ remains a fraction but a choice giving the greatest margin between resulting delay values and adjacent peaks in the pertinent source complex degree of coherence function is $m_3 = \frac{1}{8}$. With these choices, the error terms arising because of polarization dependent optical losses will remain small because the resulting delay values in the corresponding source complex degree of coherence functions will be such that these functions will have relatively small values.

Further for the system of FIG. 9, finding the total intensity type related error, $\Delta\phi_{IntenTot}$, across at least the spectral width of source 11 requires once again evaluating the general expression therefor given above adapted specifically for this system. This is achieved by again substituting the corresponding transfer matrix elements therein.

Here again, such an analysis, based on substitutions of the appropriate transfer matrix elements, proceeds much as the analysis did in the determination of the amplitude related phase error for the system of FIG. 2. Again, the steps in this analysis will not be repeated here as the phase error related to intensity turns out to be relatively insignificant. As before, just a single term in the resulting equation found for the intensity error has the potential to give a magnitude which could be sufficiently large to add appreciably to the total phase error. That term is of the form $$\Delta\phi_{IntenTot} = 2\epsilon^2 \Delta\psi \gamma(\tau_a) f([L_1], [L_2]),$$

where again $f([L_1],[L_2])$ represents a function of the matrix elements in the matrix operators $[L_1]$ and $[L_2]$ representing optical fiber lengths $L_1$ and $L_2$, respectively. The symbol $\Delta\psi$ again represents the misalignment of the 45° splice in the depolarizer 10′, and the effective misalignment caused by polarization dependent loss within the lengths $L_1$ and $L_2$. This splice in depolarizer 10′ again has the angular relationship of 45° $+\Delta\psi$.

Since the value of the function depending on the optical fiber parameters and lengths $L_1$ and $L_2$ will again be on the order of unity, the magnitude of the intensity error will depend on the quality of polarizer 15, represented in the last equation by its extinction coefficient $\epsilon$, the amount of misalignment error $\Delta\psi$, and the source coherence function $\gamma(\tau_a)$ with the polarization components represented thereby delayed one with respect to the other by the delay through added insert fiber 15″. In view of the extinction ratio for polarizer 15 appearing in the last equation for the intensity error as the square thereof, a well designed polarizer having its extinction coefficient on the order of 60 db permits $\Delta\psi$ to be on the order of several degrees and still result in the intensity error being negligible. The presence of the source coherence function reinforces this tolerance since its typical value, given above as hundredths to a tenth or more, further acts to suppress this intensity type phase error. This added source of error suppression would also aid in permitting use of a lesser quality polarizer.

Figure 10A:
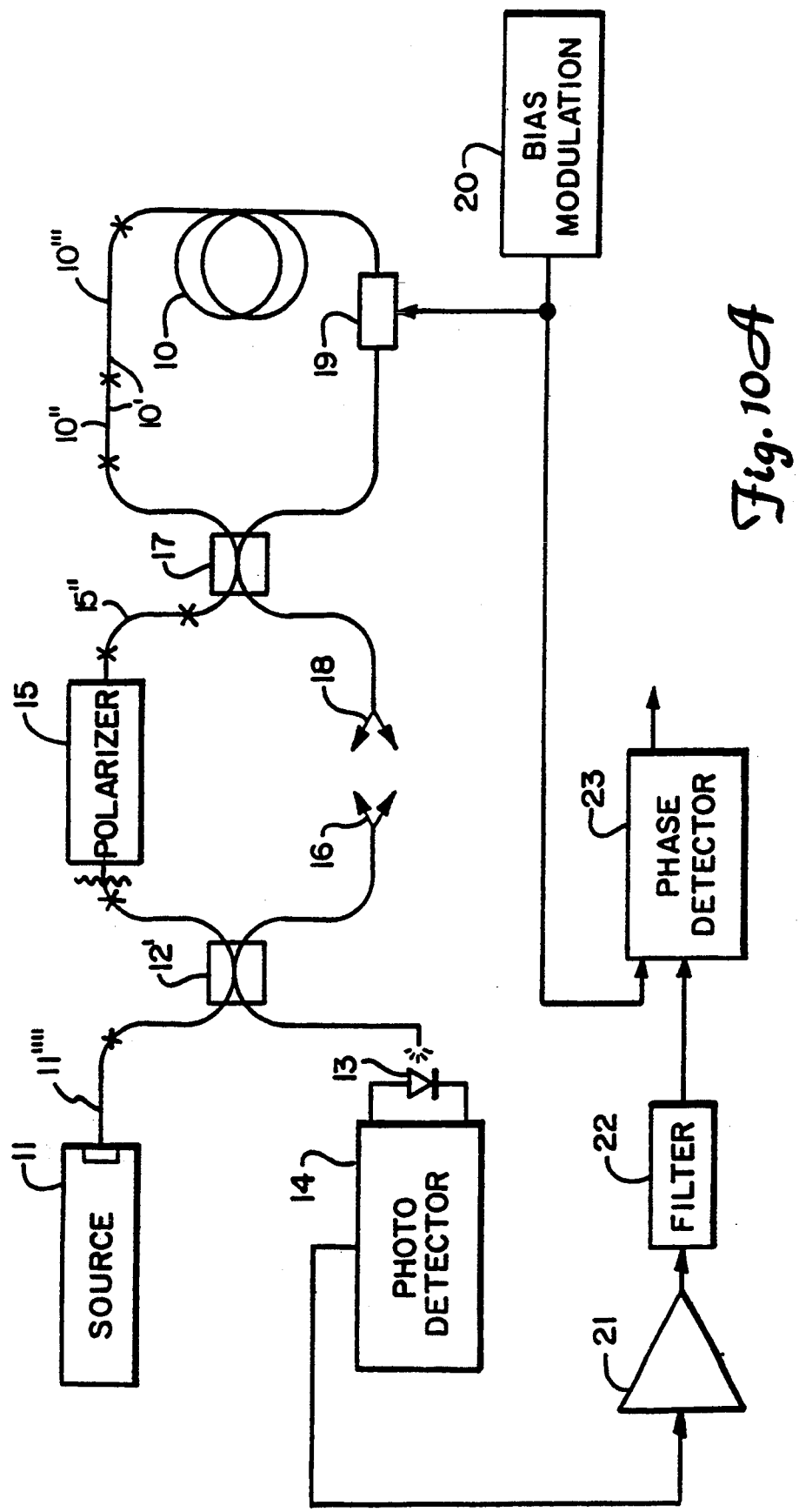
FIGS. 10A and 10B each show a system schematic diagram combining a signal processing arrangement and an alternative optical transmission path and device arrangement embodying the present invention.
Figure 10B:
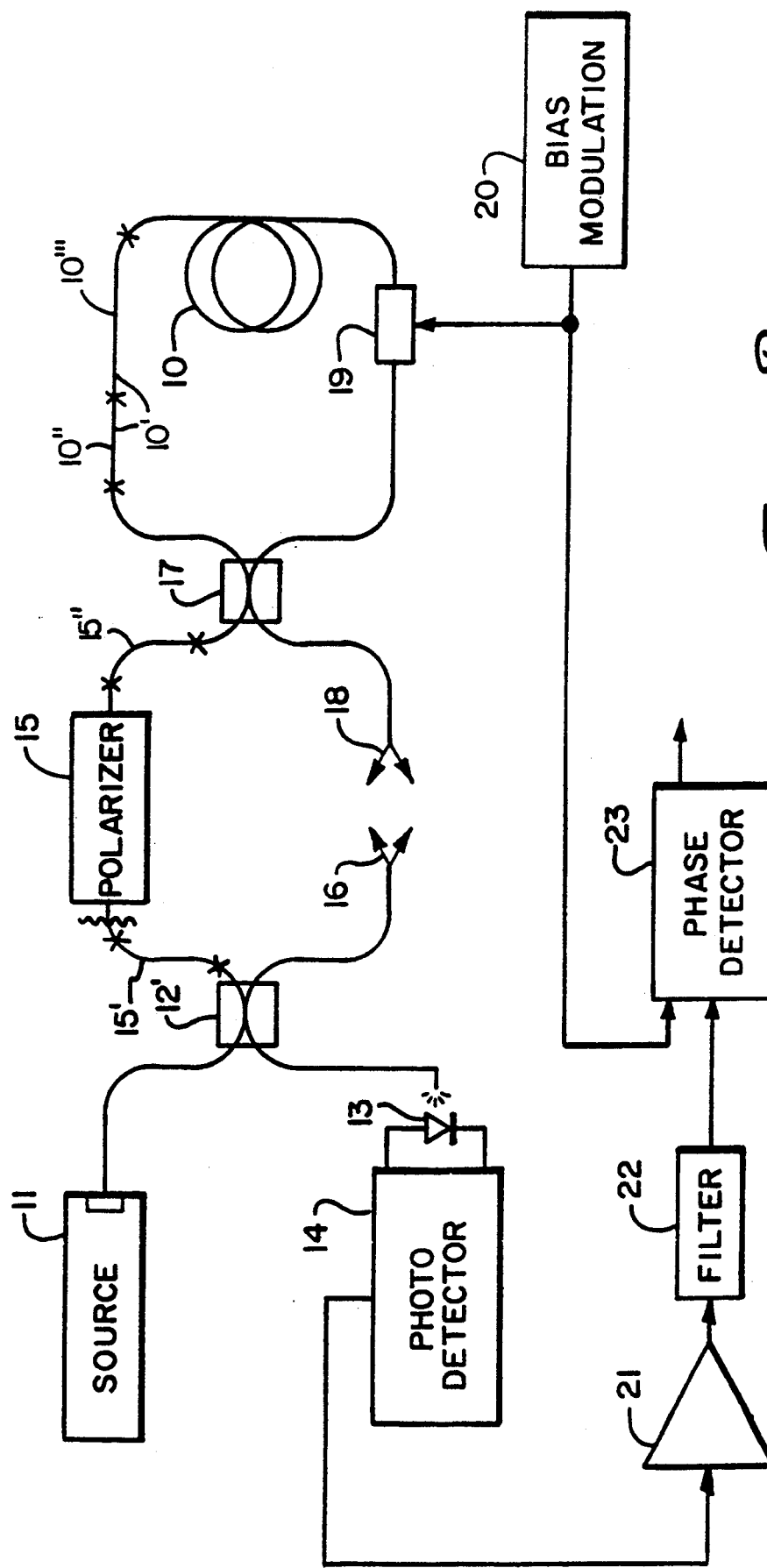

The systems of any of FIGS. 6, 7 or 8 can be combined with the system of FIG. 9 as can be seen in the system of FIG. 10A showing the example of combining the system of FIG. 7 with that of FIG. 9, and in the system of FIG. 10B showing the example of combining the system of FIG. 8 with that of FIG. 9. As an example, an analysis of the system of FIG. 10B follows using (a) the composite matrix operator for FIG. 9, representing the effects of electromagnetic waves leaving the "wavy" reference line to the left of polarizer 15 to thereafter propagate through coil 10 and return, and (b) a matrix to represent the transmission over the optical path portion between source 11 and the "wavy" reference line in FIG. 8, which has its component matrices in just the reverse order from that used for the same portion of the system of FIG. 7 because of the reversing in the system of FIG. 8 of the position of the source to polarizer and the source coupler from that in FIG. 7, or $$\begin{bmatrix} E_x \\ E_y \end{bmatrix} = \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & e^{-j2\pi\nu\tau_b} \end{bmatrix} [L_3] \begin{bmatrix} u \\ v \end{bmatrix}.$$

In this last expression, the various matrices and the symbols therein have the same meaning they had in connection with the equation relating the electric fields at the "wavy" reference line to the source emission electric fields in the analysis of the system of FIG. 7 except that $\tau_b$ is the relative polarization component delay in length 15′.

Following the analysis steps generally given above for the previous systems, the numerator of the total amplitude polarization phase error $\Delta\phi_{AmplTot}$ for the system of FIG. 10B is found to be $$\epsilon I_m(\Delta\phi_{AmplTot-fn} + \Delta\phi_{AmplTot-sn}) = \frac{K\epsilon}{2}(P_v - P_u) I_m \left[ \sum_{M_a=-1}^{1} \sum_{M_b=-1}^{1} \sum_{N=-3}^{3} \zeta_{M_a,M_b,N} \gamma^*(\tau_p + M_a\tau_a + N\tau_d) \right]$$

where $\zeta_{M_a,M_b,0} = 0$, and the other values for $\zeta_{M_a,M_b,N}$, obtained from the analysis are not set out here since only the complex degree of coherence of source 11 in the numerator of $\Delta\phi_{AmplTot}$, having the system imposed relative polarization component delays in its argument as given in the last equation, is needed for the purpose of designing the system of FIG. 10B to reduce or eliminate the amplitude related phase error. In the last equation, $M_a = -1, 0, 1$ and $M_b = -1, 0, 1$ and finally $N = \pm 1, \pm 2, \pm 3$.

Evaluating the denominator $\Delta\phi_{AmplTot-d}$ for $\Delta\phi_{AmplTot}$ again gives a result for the system of FIG. 10B very much like that for the system of FIG. 2 in that a complex degree of coherence function is again present therein as will be set out below. Here too, again imposing the signal fading criteria used with that system permits the system of FIG. 10B to reduce or eliminate the amplitude related phase error while also preventing signal fading.

As the result above for the system of FIG. 10B shows, the source complex degree of coherence function in the last expression, $\gamma^*(\tau_p + M_a\tau_a + M_b\tau_b + N\tau_d)$, must again be effectively kept at a relatively small value by choosing each of the results of combining (i) the difference in propagation time for electromagnetic waves propagating in the transmission blocking axes of polarizer 15, $\tau_p$, alternatively (ii) with each of the integral multiples of the difference in propagation time of such waves in the "x" and "y" axes of added insert 15″, $M_a\tau_a$, with each such alternative having in turn added thereto (iii) alternates of the integral multiples of the difference in propagation time of such waves in the "x" and the "y" axes of added insert 15′, $M_b\tau_b$, with each resulting one of the foregoing alternatives having in turn added thereto (iv) alternates of the integral multiples (N=0 excluded) of the difference in propagation time of such waves in the "x" and the "y" axes of section 10″ of depolarizer 10′, $N\tau_d$, to have a value for which this complex degree of coherence function is negligibly small. Here too, in avoiding signal fading, the source complex degree of coherence function $\gamma(N\tau_d + Q_a 2\tau_a + Q_b 2\tau_b)$, where $Q_a, Q_b = -1, 0, 1$, must be simultaneously kept at a small value by choosing each of the results of combining (i) the integral multiples of the difference in propagation time of the waves in the "x" and the "y" axes of section 10'' of depolarizer 10', $N\tau_d$, alternatively (ii) with each of the integral multiples of the difference in propagation time of such waves in the "x" and the "y" axes of added insert 15'', $Q_a\tau_a$, with each such alternative having in turn added thereto (iii) alternates of the integral multiples of the difference in propagation time of such waves in the "x" and the "y" axes of added insert 15', $Q_b\tau_b$, to have a value for which this complex degree of coherence function is acceptably small. In other words, the polarization state preserving elements after source 11 are together chosen to have selected polarization component propagation time differences to keep the amplitude related phase errors relatively small, and to avoid significant signal fading.

Hence, polarizer 15 must again be chosen in the system of FIG. 10B (or FIG. 10A) to have a certain difference in time between electromagnetic waves propagating therethrough and the blocking and transmission axes thereof, as must the lengths of polarization maintaining optical fiber for section 10'' of depolarizer 10', of added insert 15'', and of added insert 15' to set the total delay time between waves propagating in the fast and slow axes thereof. This polarizer 15 time delay between wave polarization components propagating therethrough, and the delays resulting in these components from the lengths chosen for polarization-maintaining optical fiber sections 10'' and 10''' of depolarizer 10', and of polarization-maintaining optical fiber added inserts 15'' and 15', must be such that $\tau_p + M_a\tau_a + M_b\tau_b + N\tau_d(N \neq 0)$ have values along the time delay axis over which the complex degree of coherence of source 11 is measured that fall between the peaks of that function where it has relatively low values. Similarly and simultaneously, the delay associated with the choice of length of polarization-maintaining optical fiber 10'' and the delay associated with the choice of length of polarization-maintaining optical fiber inserts 15'' and 15' must also be such that $N\tau_d + Q_a\tau_a + Q_b\tau_b(N \neq 0)$ has values along the time delay axis over which the complex degree of coherence function of source 11 is measured that fall between the peaks of that function where it has relatively low values, and such that $\tau_b$ has values on this axis at which this function is also simultaneously small.

The choice of relative polarization component propagation delay times for polarizer 15, sections 10'' and 10''' of depolarizer 10', and added inserts 15'' and 15' which has been found satisfactory for the system of FIG. 10B (and so for the system of FIG. 10A) is one having delay time $\tau_p$ associated with polarizer 15 (plus any length of polarization-maintaining optical fiber extending therefrom to a splice with added inserts 15'' or 15' or both) to be equal to a multiple of a retardation interval in the source complex degree of coherence function, i.e. set $\tau_p = m_1 \tau_r$ where $m_1$ is an integer. Similarly, the length of added optical fiber insert 15'' will be set such that there is a delay $\tau_a$ associated therewith which is a multiple of a retardation interval in the source complex degree of coherence function as will the length of added optical fiber insert 15', that is, set $\tau_a = m_2 \tau_r$ and $\tau_b = m_3 \tau_r$ where $m_2$ and $m_3$ are integers. With these choices, the polarization component relative propagation time delay associated with section 10'' of polarizer 10' is again set to be equal to a fraction of a retardation time interval of the source complex degree of coherence function, or $\tau_d = m_4 \tau_r$ where $m_4$ is a fraction.

A good choice for $m_1$ is to choose $m_1 = 1$ if polarizer 15 is a good quality polarizer with a suitably small extinction coefficient, otherwise $m_1 = 2$ would be chosen to put this delay value on a smaller peak of the complex degree of coherence function for source 11. Then, $m_2 = 2$ would be chosen if $m_1 = 1$, but otherwise $m_2 = 1$ would be chosen if $m_1 = 2$ so that no allowed sum of the delays can add to zero with the choice of $m_3 = 4$ being necessary to avoid the chance of too much blocking by polarizer 15 of electromagnetic waves emitted by source 11 since $\tau_b$ would then be on a relatively low peak of the source coherence function. The fractional value of $m_4$ is then chosen as before as $m_4 = \frac{1}{4}$.

With this choice, the degree of polarization $\mathcal{P}$ of electromagnetic waves entering coil 10 is $\gamma(\tau_a = 2\tau_r$ or $\tau_r)$ so that this function is evaluated at a peak in the source coherence function. Thus, this will be a relatively large value leaving substantial partial polarization in these waves, perhaps as much as ten percent polarized.

Again, of course, any dispersion present over the optical path from source coupler 12 through coil 10 and back means increased delays. Such delays may be fixed delays or group delays, or several differing group delays one in each of several corresponding frequency bands, and the resulting broadening of the delay into ranges of delay must at least be taken into account in determining the propagation time differences between electromagnetic waves traveling through polarizer 15, couplers 12 and 17, polarization-maintaining optical fiber insert 15'' or 15', or depolarizer 10', or through an optical integrated circuit which may be used for optical phase modulator 19 and loop coupler 17, for instance. The ranges of delays resulting from the broadening of the propagation time differences from single values to effectively a range of values requires that the appropriate ranges of delays must be then be kept on the peaks, or between the peaks, as appropriate, of the source complex degree of coherence function to keep at or near the value intended for that function. Thus, many of the same, or closely related, considerations go into the making of the choices for the delay values as went into the similar choices made in connection with the system of FIG. 2.

The last statement also applies to the situation resulting if polarization dependent losses occur such as in loop coupler 17, as previously described, so that additional amplitude phase error terms become significant and thus appear in the equation for $\Delta\phi_{AmplTot\text{-}as}$ which can be obtained for the system of FIG. 10B (and so for FIG. 10A) though not explicitly set forth in this analysis. Such additional terms will generally have the forms $$(A_1 B_1^* + C_1 D_1^*) \frac{P_u - P_v}{P_u} k e \gamma(\tau_p + Q_a\tau_a + Q_b\tau_b),$$

$$(A_2 B_2^* + C_2 D_2^*) \frac{P_u - P_v}{P_u} k e \gamma(\tau_p + Q_a\tau_a + Q_b\tau_b)$$

where $Q_a, Q_b = -1, 0, 1$, and $$[(C_2{}^2 + D_2{}^2) - (B_1{}^2 + D_1{}^2)] \frac{P_u - P_v}{P_u} k\epsilon\gamma(\tau_p).$$

The symbols $P_u$ and $P_v$ are again the electromagnetic wave powers for the waves emitted along the orthogonal axes of source 11. The first two of these last three equations suggests that $m_1$, $m_2$ and $m_3$ should not be chosen to be of equal magnitudes in setting values for $\tau_p$, $\tau_a$ and $\tau_b$ above since then the argument of the complex degree of coherence function in the second equation could then take a value of zero, a result which would lead to errors due to polarization dependent loss that may be unacceptably large.

Should the polarization dependent loss be too great, the complex degree of coherence function in the equation suggests that depolarizer delay $\tau_p$ may have to be placed on a peak of the source complex degree of coherence function or delay axis further out than the peak to keep errors due to this loss sufficiently small. Thus, many of the same considerations with respect to polarization dependent loss in the system of FIG. 10B (and so in FIG. 10A) must be taken into account in the same manner as they were in connection with the system of FIG. 9.

The other type of phase error associated with the system of FIG. 10B (and so FIG. 10A), as in systems previously described, is the total intensity related error $\Delta\phi_{IntTot}$ across at least the spectral width of source 11. This again requires evaluating the general expression therefor given above in terms specifically for this system. Substituting the corresponding transfer matrix elements in that expression is the basis upon which to proceed to find this error.

The analysis proceeds much as the analysis did for determining the amplitude related phase error for the system of FIG. 2 by substituting in the general expression for the intensity error the appropriate transfer matrix elements. Here too, the steps in this analysis will not be repeated due to the similarity of the earlier analysis. As before, the phase error related to intensity turns out to be relatively significant with just a single term in the resulting equation found for the error having the potential to give a magnitude which could be sufficiently large so as to add significantly to the total phase error. That term is of the form $$\Delta\phi_{InterTot} = 2\epsilon^2 \Delta\psi \gamma(\tau_z \pm \tau_b) \mathscr{F}([L_1], [L_2]),$$

again with $\mathscr{F}([L_1],[L_2])$ representing a function of the matrix elements in the matrix operators $[L_1]$ and $[L_2]$ representing optical fiber lengths $L_1$ and $L_2$, respectively. The symbol $\Delta\psi$ again represents the misalignment of the 45° splice in depolarizer 10′, and any effective misalignment caused by polarizer dependent loss within the lengths $L_1$ and $L_2$. Here too, this splice in depolarizer 10′ has the angular relationship of 45° $+\Delta\psi$.

Again, the value of the function $\mathscr{F}([L_1], [L_2])$ will be in the order of unity. As a result, the magnitude of intensity errors shown in the last equation depends primarily on the quality of polarizer 15, as represented in the last equation by its extinction coefficient $\epsilon$, and the amount of the misalignment error $\Delta\psi$ along with the value of the source coherence function $\gamma(\tau_a \pm \tau_b)$ which has the polarization components represented thereby delayed with respect to one another by the combinations of the delays through added optical fiber inserts 15″ and 15′. A well designed polarizer having its extinction coefficient on the order of 60 db means that the dependence of the intensity error on the polarizer will be small because of the extinction coefficient appearing as a square in the last equation. If such a polarizer is used, $\Delta\psi$ can be several degrees with the intensity error still being negligible. The presence of the source coherence function in the intensity error equation should reinforce this tolerance since its typical value will be relatively small in view of the value of $\tau_b$ chosen to be on the fourth peak of that function with $\tau_a$ on the second peak in the choice selected above. If sufficiently small, the coherence function as an added source of error suppression would also allow either the use of a lesser quality polarizer or a few more degrees of misalignment $\Delta\psi$.

Figure 11:
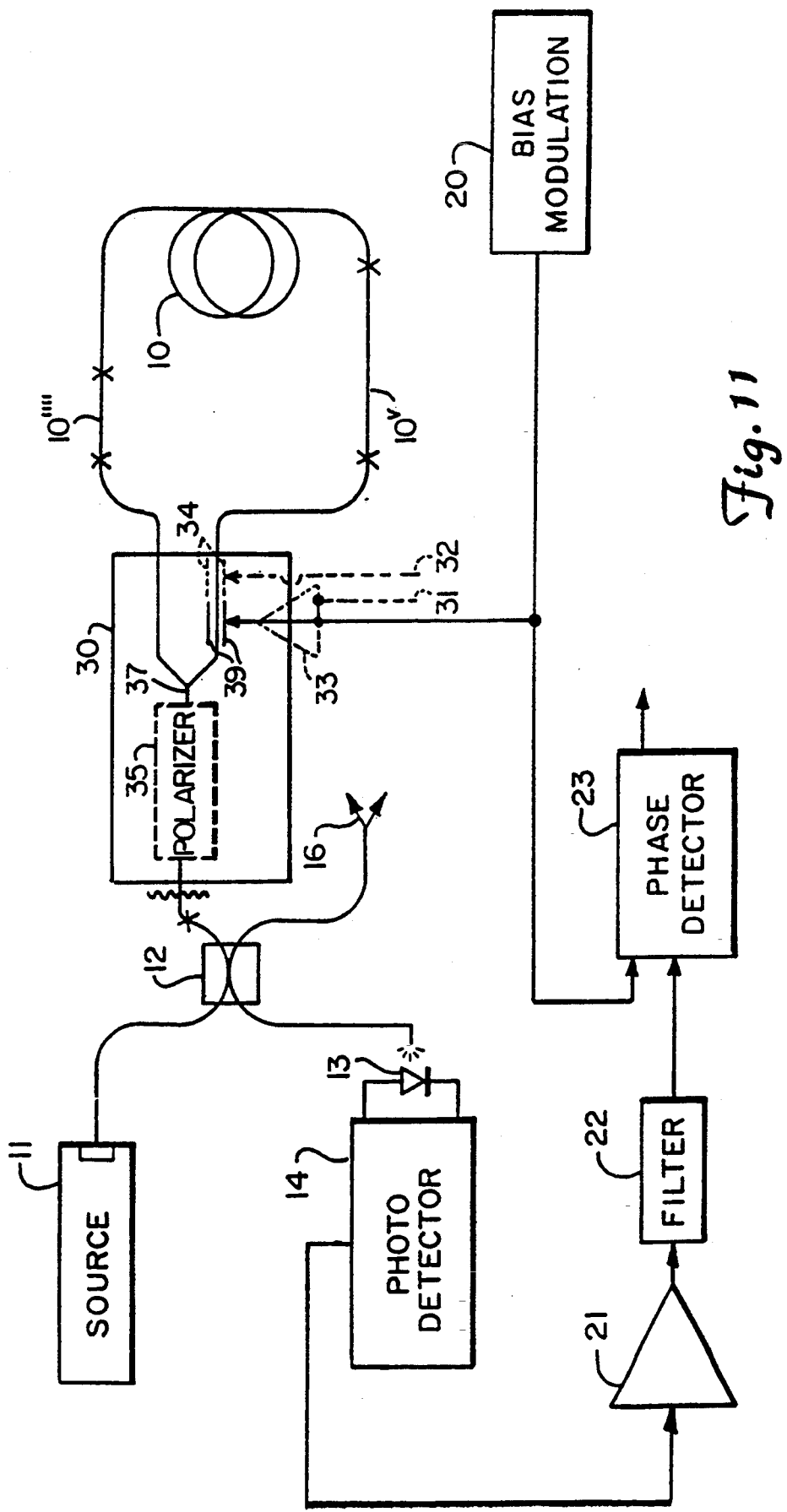
FIG. 11 shows a system schematic diagram combining a signal processing arrangement and an alternative optical transmission path and device arrangement embodying the present invention.

As an alternative to the systems of FIGS. 2, 6, 7, 8, 9, 10A and 10B in which phase modulator 19 was described as being either an optical fiber stretching type of phase modulator or an integrated optic chip type of phase modulator, FIG. 11 shows an integrated optic chip, 30, used to provide not only the desired phase modulator but also the polarizer and the loop coupler used in the systems of FIGS. 2, 6, 7, 8, 9, 10A and 10B as could be done on these systems also. Such an arrangement is especially useful in a closed loop fiber optic gyroscope as opposed to an open loop fiber optic gyroscope, this latter system merely using the output signal of phase detector 23 to give a direct indication of the rotation rate sensed about its sensing axis perpendicular to the plane in which the coil is substantially wound.

In the closed loop system, the output signal from phase detector 23 is, after some manipulation, used to null the phase change caused between the clockwise and counterclockwise waves propagating through coil 10 as a result of rotation of coil 10 about its sensing axis. Typically, the feedback signal from phase detector 23, after various possible manipulations, is introduced into the electromagnetic waves propagating past loop coupler 17 in coil 10 either through having it added to the signal provided by bias modulation generator 20, or separately by use of a further phase modulator provided just for introducing this feedback signal. In the first instance, the feedback signal from phase detector 23, after manipulation, would be introduced into the optical subsystem shown in FIG. 11 at a dashed line, 31, and in the second instance the feedback signal would be introduced at an alternative dashed line, 32.

If the feedback signal in the first instance, provided at line 31, is to be combined with the signal from bias modulation generator 20, a signal combining means, 33, is used having each of these signals as inputs thereto. Alternatively, if the second instance is chosen of a separate phase modulator being provided for introducing the feedback signal, the feedback signal on input dashed line 32 will be routed to such an additional phase modulator, 34, which is shown formed about a waveguide in integrated optics chip 30 to thereby influence electromagnetic waves propagating through that waveguide by virtue of the electrooptic effect.

The other portions of integrated optics chip 30 represent counterparts to the optical components introduced in the systems of FIGS. 2, 6, 7, 8, 9, 10A and 10B, these components including a polarizer, 35, a "Y" junction of waveguides to form a loop coupler, 37, and a phase modulator, 39, also operating about the same waveguide as would phase modulator 34, if used, and similarly making use of the electrooptic effect. Some kinds of integrated optics chips do not need any special or added structure for a polarizer since the waveguides therein substantially attenuate one of the orthogonal polarization components attempting to propagate therethrough. In that situation, polarizer 35 should be considered omitted in integrated optics chip 30 and thus is shown only as a dashed line block in FIG. 11.

The output of signal combining means 33, if used, becomes the input for phase modulator 39. Otherwise, phase modulator 39 is energized directly by bias modulation generator 20 shown by the solid line continuing from bias modulation generator 20 straight through signal combining means 33 to phase modulator 39. If signal combining means 33 is used, the solid line therethrough should be considered omitted in FIG. 11.

The signal to be fed back in a closed loop system is usually desired to be a serrodyne, or "sawtooth" waveform signal, as this waveform allows nulling out a constant phase difference due to a constant input rate. Such a waveform will have substantial high frequency content, and an integrated optics chip is needed in these circumstances because of the wide bandwidth that a phase modulator formed in such a chip offers compared to the bandwidth of a phase modulator in which a length of the optical fiber is stretched and relaxed to provide the desired phase modulation therein.

A polarization-maintaining optical fiber extending from source directional coupler 12 is shown in FIG. 11 coming to a splice with a polarization-maintaining optical fiber extending from the waveguide of chip 30 leading to polarizer 35 therein. At this splice, the "x" axis of each fiber is aligned with one another as are the "y" axes of each. Alternatively, the polarization-maintaining optical fiber extending from source coupler 12 could be directly connected to the waveguide in optics chip 30 leading to polarizer 35 therein. In that situation, the "x" axis of this fiber is aligned with the waveguide such that electromagnetic waves passing therethrough from source coupler 12 will reach the transmission axis of polarizer 35 with relatively little loss (or aligned with the transmission axis of that waveguide if it passes one polarization mode in that axis and blocks the other orthogonal mode inherently without any need for polarizer 35).

On the opposite side of integrated optics chip 30 in FIG. 11, a pair of polarization-maintaining optical fibers extensions extend to splices with two further polarization-maintaining optical fiber segments, 10'''' and 10$^v$. Each of these extensions has its "x" axis aligned with the transmission axis of polarizer 35 or of the waveguides of chip 30 in the absence of a polarizer. The upper polarization-maintaining optical fiber extension in FIG. 11 is joined in a splice with polarization-maintaining optical fiber segment 10'''' such that the principal birefringent axes of the segment 10'''' are at equal angles (45°) with the principal birefringent axes of this fiber extension extending from integrated optics chip 30. The other end of optical fiber segment 10'''' is spliced with the ordinary single spatial mode optical fiber making up much of coil 10. The length of optical fiber segment 10'''' will result in a polarization component relative delay therethrough designated $\tau_d$.

Similarly, polarization-maintaining optical fiber segment 10$^v$ is spliced to the polarization-maintaining optical fiber extension extending from the lower waveguide of integrated optics chip 30 in FIG. 11 such that the principal birefringent axes of each on opposite sides of the splice make equal angles with one another, or 45° angles. The other end of optical fiber segment fiber 10$^v$ is connected in a splice with the ordinary single spatial mode optical fiber forming most of coil 10. The length of optical fiber segment 10$^v$ is chosen to give a relative polarization component delay for electromagnetic waves propagating therethrough of substantially twice that of segment 10'''' and so designated $2\tau_d$.

Alternatively, optical fiber segment 10'''' can be connected directly to the edge of integrated optics chip 30 at the waveguide forming the upper branch of "Y" coupler 37 in FIG. 11, the principal birefringent axes of segment 10'''' each being at an equal angle with respect to the direction of polarization of electromagnetic waves which will emanate from this upper branch waveguide along the transmission axis of polarizer 35 or of the chip waveguides if polarizer 35 is not needed. Similarly, optical fiber segment 10$^v$ can also be joined directly to integrated optics chip 30 at the lower branch waveguide leading from "Y" coupler junction 37 in FIG. 11 again with its birefringent axes at equal angles to the polarization direction of electromagnetic waves which will emanate from chip 30 along the transmission axis of this waveguide or of polarizer 35. The other numerical designations used in FIG. 11 for the various devices, transmission paths, and blocks shown there are the same as those used for corresponding items in FIG. 2.

In either arrangement, the 45° splice at the left end of optical fiber insert 10'''' in effect forms a depolarizer in series with the upper branch of "Y" junction coupler 37. Similarly, optical fiber segment 10$^v$ forms depolarizer in series with the lower branch of "Y" junction coupler 37 in either connection alternative for optical fiber 10$^v$. The presence of these two depolarizers in coil 10 provides the averaging of the polarization components desired to reduce the external magnetic field sensitivity of the system of FIG. 11.

As stated above, a separate polarizer 35 is shown in integrated optics chip 30, even though in some constructions of such chips the waveguides themselves are essentially polarizers so that they substantially pass only one polarization component with the other being substantially attenuated because of the nature of the waveguide itself. In other integrated optics chip constructions, the waveguides can support both orthogonal polarization components and a metal strip across the waveguide is used as a specific polarizer to substantially attenuate one of the polarization components. However, in either situation, just as for polarizer 15 in the systems of FIGS. 2, 6, 7, 8, 9, 10A and 10B, the polarizing action is not perfect in integrated optics chip 30, and therefore a strong polarization component will pass along the waveguides to reach coil 10, and there will also be an attenuated orthogonal polarization component passing along the waveguides to also reach coil 10. The relative delay between these two components propagating from a coupling point between source coupler 12 and integrated optics chip 30 (here arbitrarily marked with an "x" at the splice immediately to the left of the "wavy" reference line assuming use of a polarization-maintaining optical fiber extension from chip 30 to the splice) to the "Y" junction of coupler 37 and through its upper branch to the splice with optical fiber segment 10'''' will be designated $\tau_{IOC\text{-}u}$. Similarly, the relative polarization component delay from the same coupling point to the left of integrated optics chip 30 to "Y" junction coupler 37 and through the lower branch thereof to the splice with optical fiber segment $10^v$ will be designated $\tau_{IOC-l}$.

Once again, an analysis of the system of FIG. 11, proceeding in the manner followed for the system of FIG. 2, starts with a composite Jones matrix as an operator on the expression for the electromagnetic waves appearing at the "wavy" reference line to the left of integrated optics chip 30 propagating in one of the two opposite directions through coil 10, here the clockwise direction. Again, accepting the same limitations as before, the composite matrix operator for the system of FIG. 11 is written as $$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix}$$

$$= \begin{bmatrix} p_1 & 0 \\ op_1\epsilon e^{-j2\pi\nu\tau_{IOC-l}} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 & oe^{-j2\pi\nu\tau_d} \end{bmatrix} [L_c] \times$$

$$\begin{bmatrix} 1 & 0 \\ oe^{-j2\pi\nu\tau_d} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} p_1 & 0 \\ op_1\epsilon e^{-j2\pi\nu\tau_{IOC-u}} \end{bmatrix},$$

where the matrix $[L_c]$ represents the length of ordinary single spatial mode optical fiber in coil 10 from the splices with that fiber and fiber segments $10''''$ and $10^v$. As before, this matrix has the general form $$[L_c] = \begin{bmatrix} A_c B_c \\ C_c D_c \end{bmatrix} = e^{-\zeta_c} \begin{bmatrix} A_c' B_c' \\ C_c' D_c' \end{bmatrix}.$$

Since the phase modulator, or modulators, are now in integrated optics chip 30, the matrix $[L_c]$ represents only that length of fiber.

Four of the other matrices in the composite matrix for $G_{cw}$ have a corresponding delay parameter therein identifying which component or portion of the system of FIG. 11 it represents. The remaining two matrices, each having $1\sqrt{2}$ with one or the other algebraic sign as each of the elements thereof, represent the 45° splices involving optical fiber segments $10''''$ and $10^v$. The parameter $p_1$ again represents the splitting of the electromagnetic waves between the waveguides in loop directional coupler 37 and losses therein.

As before, this last composite matrix operator for the system of FIG. 11 has some terms in those products of the corresponding transfer matrix elements needed to evaluate $\Delta\phi_{AmplTot}$ which have $\tau_d$ appearing therein and some terms that do not have that parameter appearing therein. Those terms in such products which do not have $\tau_d$ appearing in them again sum to zero because of the presence of the depolarizers associated with optical fiber segments $10''''$ and $10^v$ if the losses in coil 10 and optical fiber segments $10''''$ and $10^v$ are polarization independent. This conclusion comes about in much the same manner as did similar conclusions for the systems of FIGS. 2 and 9, and so will not be shown here. The losses through optical integrated circuit chip 30 are, of course, desired to be polarization dependent, including through "Y" junction coupler 37, since the chip acts as the system polarizer.

The products of the composite matrix operator elements needed to evaluate $\Delta\phi_{AmplTot}$ will not be set out here as the analysis is quite similar to that used in connection with the system of FIG. 2. The result of such an analysis of the system of FIG. 11 shows that there is a sum involving two complex degree of coherence functions in the numerator of $\Delta\phi_{AmplTot}$, each of which must be made negligibly small for the purpose of reducing or eliminating the amplitude related phase error, these functions being $\gamma(\tau_{IOC-u}+N\tau_d)$ and $\gamma(\tau_{IOC-l}+M\tau_d)$, here $N=-3, -2, -1, 1, 2$ or 3 and $M=-3, -1, 1$ or 3. Again, evaluating the denominator $\Delta\phi_{AmplTot-d}$ for $\Delta\phi_{AmplTot}$ gives a result very similar to that for the system of FIG. 2, and so again imposing the signal fading criteria used with that system permits the system of FIG. 11 to reduce or eliminate the amplitude related phase error while also preventing signal fading.

Hence, the complex degree of coherence functions just given must each be kept relatively small by choosing the sums of (i) the difference in propagation times for electromagnetic waves propagating in the transmission and blocking axes of integrated optics chip 30 (whether determined by polarizer 35 or the waveguides) in the upper and lower waveguide branches, either $\tau_{IOC-u}$ or $\tau_{IOC-l}$, plus alternatively (ii) the corresponding integral multiples ($N=0$ and $M=0$ excluded) of the difference in propagation time of such waves in the "x" and "y" axes of segment $10''''$, at values for which these functions are negligibly small. Also simultaneously, to avoid signal fading, source complex degree of coherence function $\gamma(N\tau_d)$ must be kept at a small value (excluding the $N=0$ situation) by choosing the propagation time difference of electromagnetic waves in the "x" and the "y" axes of segment $10''''$, $\tau_d$, to have values such that this function is negligibly small.

Thus, optical integrated chip 30 must be chosen in the system of FIG. 11 by size and waveguide construction to have a certain difference in time between electromagnetic waves propagating therethrough in the blocking and transmission waveguides thereof, as must the length of polarization-maintaining optical fiber for segment $10''''$ to set the total delay time between waves propagating in the fast and slow axes thereof. This chip 30 time delay and the delays resulting from the lengths chosen for polarization-maintaining optical fiber sections $10''''$ and $10^v$ must be such that $\tau_{IOC-u}+N\tau_d$ and $\tau_{IOC-l}+N\tau_d$ ($N\neq 0$) have values along the time delay axis over which the complex degree of coherence of source 11 is measured that fall between the peaks of that function where it has relatively low values. Similarly, the delay associated with the choice of length of polarization-maintaining optical fiber $10''$ must also be such that $N\tau_d(N\neq 0)$ has values along the time delay axis over which the complex degree of coherence function of source 11 is measured that simultaneously fall between the peaks of that function where it has relatively low values.

In this regard, the size of integrated optics chip 30 (or chip 30 plus appropriate polarization-maintaining optical fiber extensions from the waveguides therein), insofar as the relative polarization component delays therethrough given the waveguide construction therein, is chosen for the system of FIG. 11 such that $\tau_{IOC-u}$ and $\tau_{IOC-l}$ are each at a multiple of a retardation interval, that is, $\tau_{IOC-u}=m_1\tau_r$ and $\tau_{IOC-l}=m_2\tau_r$. Again, $\tau_d$ then is chosen as a fraction of a retardation interval, or $\tau_d=m_3\tau_r$ where $m_3$ is a fraction, with $m_3=\frac{1}{4}$ again being a good choice.

Typically, $m_1$ and $m_2$ may be set to each equal 2 to be assured that the amplitude phase error is sufficiently reduced even though difficulties not covered in the above analysis occur such as some of the optical losses not being entirely polarization independent. If losses in the system of FIG. 11 are polarization dependent, additional amplitude phase error terms will become significant and appear in the equation for $\Delta\phi_{AmplTot\text{-}as}$ which can be obtained for the system of FIG. 11 but have not been set out here. Such additional terms will generally have the forms $$(A_c^2 B_c^2 + C_c^2 - D_c^2)\frac{P_u - P_v}{P_u} k\epsilon\gamma(\tau_{IOC\text{-}u})$$

and $$(-A_c^2 B_c^2 + C_c^2 - D_c^2)\frac{P_u - P_v}{P_u} k\epsilon\gamma(\tau_{IOC\text{-}l}).$$

If the delay times $\tau_{IOC\text{-}u}$ and $\tau_{IOC\text{-}l}$ associated with the upper and lower waveguide branches of chip 30 are set equal to a multiple of a retardation interval in the source complex degree of coherence function as suggested above, these additional error terms will be significant in the circumstances since the complex degree of coherence function involved will be relatively large. Hence, setting delay times $\tau_{IOC\text{-}u}$ and $\tau_{IOC\text{-}l}$ to a multiple of the source retardation interval greater than one will substantially reduce this source of error because of the significant diminution in peak values with increasing multiples of the retardation interval in the source complex degree of coherence function.

The system of FIG. 11 also can exhibit the intensity type of phase error as generally found above, and finding the total intensity type related error, $\Delta\phi_{IntenTot}$, across at least the spectral width of source 11 requires once again evaluating the general expression therefor given above but specifically for this system. This is achieved by again substituting the corresponding transfer matrix elements therein.

As before, such an analysis, based on substitutions of the appropriate transfer matrix elements, proceeds much as the analysis did in the determination of the amplitude related phase error for the system of FIG. 2. Also again, the steps in this analysis will not be repeated here as the phase error related to intensity turns out to be relatively insignificant. Once again, just a single term in the resulting equation found for the intensity error has the potential to give a magnitude which could be sufficiently large to add appreciably to the total phase error. That term is of the form $$\Delta\phi_{IntenTot} = \epsilon^2 \frac{P_{PolTran\text{-}in} - P_{PolBlock\text{-}in}}{P_{PolTran\text{-}in}}\gamma(\tau_{IOC\text{-}u} - \tau_{IOC\text{-}l}),$$

where $\epsilon$ is the extinction ratio for the polarization effect in chip 30 whether due to a specific polarization structure 35 or the inherent polarization properties of the waveguides in chip 30.

Thus, the magnitude of the intensity error will depend on the quality of polarizer 35 (or of the inherent polarization of the waveguides in chip 30), represented in the last equation by its extinction coefficient $\epsilon$, and the source coherence function $\gamma(\tau_{IOC\text{-}u} - \tau_{IOC\text{-}l})$ with the polarization components represented thereby having a difference in the relative polarization component delays through the upper and lower branches of the waveguides in chip 30. Since the extinction ratio for polarizer 35 (or the waveguides of chip 30) appears in the last equation for the intensity error as the square thereof, a well designed polarizer having its extinction coefficient on the order of 60 db permits the intensity error to be negligible. The presence of the source coherence function could reinforce this tolerance if the upper and lower branch relative polarization component delays differ significantly since this function can be made to range in value from hundredths to a tenth or more to further act to suppress this phase intensity error. This added source of error suppression would also aid in permitting use of a lesser quality polarizer.

Figure 12:
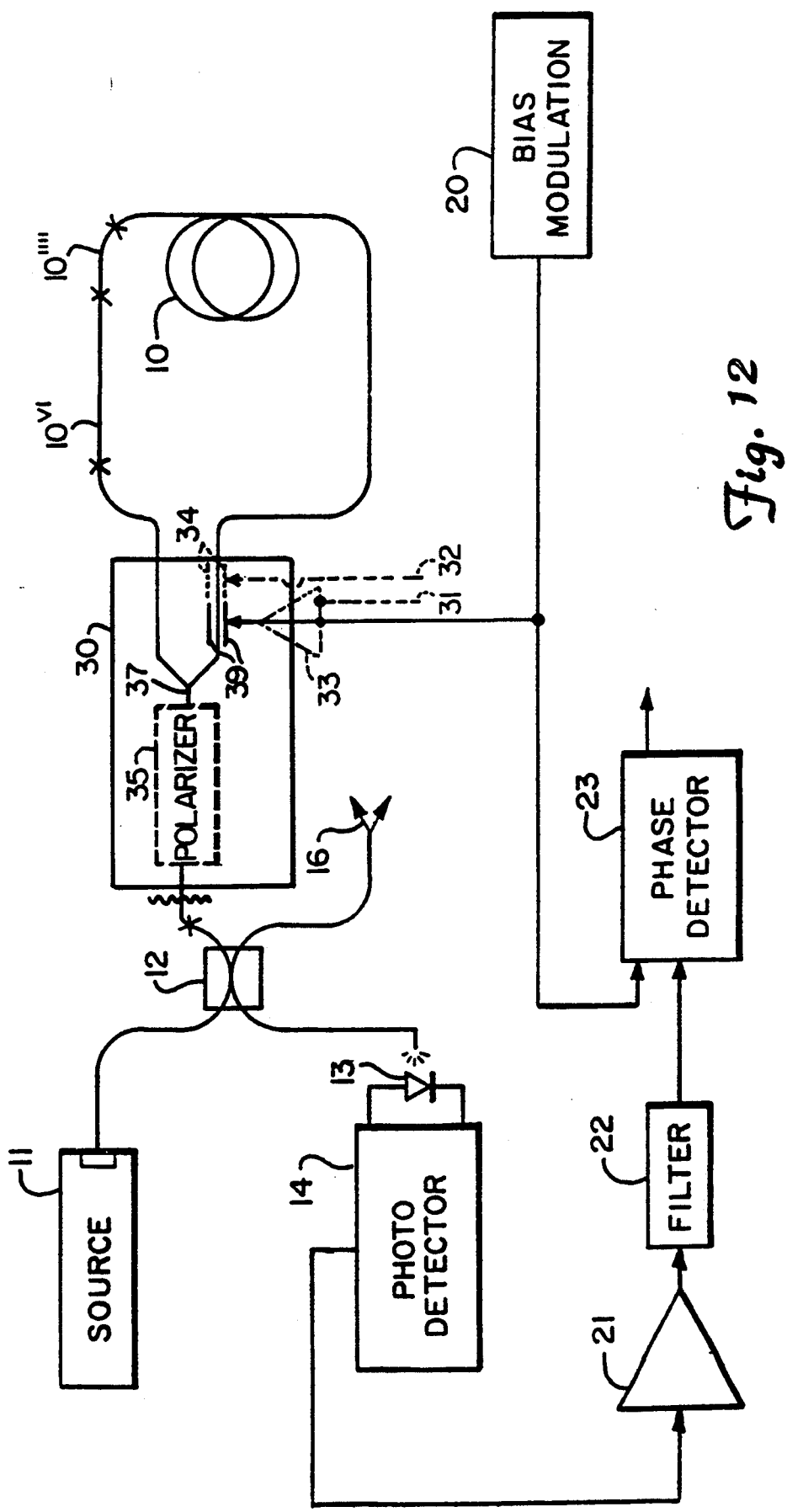
FIG. 12 shows a system schematic diagram combining a signal processing arrangement and an alternative optical transmission path and device arrangement embodying the present invention.

As an alternative to the system of FIG. 11 making use of integrated optics chip 30 for closed loop operation, polarization-maintaining optical fiber segment 10$^v$ can be transferred to the opposite side of coil 10 to be spliced in a 45° splice with polarization-maintaining optical fiber segment 10''''. This results in effectively a single depolarizer on the coil side of loop coupler 17 rather than two effective depolarizers as in the system of FIG. 11. Such a system is shown in FIG. 12 where this transferred polarization-maintaining optical fiber segment spliced to segment 10'''' is now designated 10$^{v'}$. The other numerical designations used for the devices, transmission paths and blocks in the system of FIG. 12 are the same as those used for corresponding items in the system of FIG. 11. The remaining end of the ordinary single mode optical fiber in coil 10 formerly spliced to fiber segment 10$^v$ is than abutted, or spliced, directly to the edge of integrated optics chip 30 at the waveguide forming the lower branch of "Y" coupler 37 in FIG. 12 or, alternatively, to an extension length of polarization-maintaining optical fiber extending from the lower waveguide of integrated optics chip 30.

Thus, polarization-maintaining optical fiber segment 10$^{v'}$ is spliced to polarization-maintaining optical fiber segment 10'''' such that the principal birefringent axes of each on opposite sides of the splice make equal angles with one another, i.e. 45° angles. Again, segment 10'''' has its opposite end spliced to the ordinary single-spatial mode optical fiber comprising most of coil 10. Segment 10'''' has a length resulting in a relative delay of orthogonal polarization components propagating therethrough of $\tau_d$ as in the system of FIG. 11.

The opposite end of optical fiber segment 10$^{v'}$ can again be spliced to a polarization-maintaining optical fiber extension extending from the upper waveguide of integrated optics chip 30 in FIG. 12, and such a splice can be made with any angle $\theta$ between the principal birefringent axes in the two polarization-maintaining optical fiber portions on either side of that splice. Alternatively, that same end of optical fiber segment 10$^{v'}$ can be abutted, or spliced, directly to the edge of integrated optics chip 30 at the waveguide forming the upper branch of "Y" coupler 37 in FIG. 12. This joining can be made at any angle $\theta$ with respect to the direction of polarization of electromagnetic waves which will emanate from this upper branch waveguide i.e. at any angle with respect to the transmission axis of polarizer 35 or of the inherently polarizing waveguide without the presence of polarizer 35. As a further alternative, the extension from integrated optics chip 30 to optical fiber segment 10$^{v'}$ can be provided using ordinary single spatial mode optical fiber entirely instead of any polarization-maintaining optical fiber in this extension.

The delay $\tau_{IOC\text{-}u}$ between the orthogonal polarization wave components for the electromagnetic waves propagating in the upper waveguide branch in chip 30 is measured from the coupling point to the left of chip 30 to the edge of chip 30 at which optical fiber segment $10^{v'}$ receives light from that chip. Alternatively, if a polarization-maintaining optical fiber extension is used in the system of FIG. 12 in connection with the upper branch of coupler 37 as was done in the system of FIG. 11, the delay then is then measured over a path extending to the splice of that extension with segment $10^{v'}$. Segment $10^{v'}$ is twice as long as segment $10''''$ with a relative polarization component delay of $2\tau_d$.

In any event, a single depolarizer adjacent the upper branch of coupler 37 is formed with optical fiber segments $10''''$ and $10^{v'}$. The use of such a single depolarizer in coil 10 used with chip 30 results in depolarized electromagnetic waves being introduced into that coil; however, the sensitivity of the system of FIG. 12 to external magnetic fields is no longer suppressed as it was for the system of FIG. 11.

As before, a analysis of the system of FIG. 12, proceeding in the manner followed for the system of FIG. 2, starts with a composite Jones matrix as an operator operating on the expression for the electromagnetic waves appearing at the "wavy" reference line to the left of integrated optics chip 30. Accepting again the same limitations as before, the composite matrix operator for the system of FIG. 12 is written as $$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix}$$

$$= \begin{bmatrix} p_1 & 0 \\ 0 p_1 \epsilon e^{-j2\pi\nu\tau_{IOC-1}} \end{bmatrix} [L_c] \times$$

$$\begin{bmatrix} 1 & 0 \\ 0 e^{-j2\pi\nu\tau_d} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} 1 & 0 \\ 0 p_1 \epsilon e^{-j2\pi\nu\tau_d} \end{bmatrix} \times$$

$$\begin{bmatrix} \cos\theta & \sin\theta \\ -\sin\theta & \cos\theta \end{bmatrix} \begin{bmatrix} p_1 & 0 \\ 0 p_1 \epsilon e^{-j2\pi\nu\tau_{IOC-u}} \end{bmatrix},$$

where the middle row of multiplied matrices represents the depolarizer.

The other matrices in this composite matrix operator are associated with components in the system of FIG. 12 by the corresponding delay parameters or length occurring therein with the exception of that matrix involving the angle $\theta$. This angle is the angle indicated above between the birefringent axes of optical fiber segment $10^{v'}$ and those of a polarization-maintaining optical fiber extension extending from the upper waveguide of coupler 37 in integrated optics chip 30 as in FIG. 11, or with the direction of polarization of waves emanating from that waveguide in the absence of any such extension in which segment $10^{v'}$ is directly spliced to chip 30. Again, that polarization direction is set either by polarizer 35 or the inherent polarization direction of the waveguides in chip 30 in the absence of any need for polarizer 35 because of the polarizing nature of these waveguides. The ordinary single mode optical fiber of coil 10 from the splice with segment $10''''$ to the splice with the lower waveguide branch of chip 30, or to any polarization-maintaining extension therefrom, is again represented by matrix $[L_c]$ without any other optical components being represented thereby.

Once more, this last composite matrix operator for the system of FIG. 12 has some terms in those products of the corresponding transfer matrix elements needed to evaluate $\Delta\phi_{AmplTot}$ which have $\tau_d$ appearing therein, and some terms without that appearance therein. As before, those terms in such products which do not have $\tau_d$ appearing therein again sum to zero because of the presence of the depolarizer in coil 10 if the losses in integrated optics chip 30, coil 10 and optical fiber segments $10''''$ and $10^{v'}$ are polarization independent. The situation with respect to polarization independent losses in coil 10 and chip 30 is essentially the same in the system of FIG. 12 as it is in the system of FIG. 11.

Because of the similarity with the analysis used for the system of FIG. 2, the products of the composite matrix operator elements needed to evaluate $\Delta\phi_{AmplTot}$ for the system of FIG. 12 will not be set out here. The result of such an analysis of the system of FIG. 12 shows that there is again a sum involving two complex degree of coherence functions in the numerator of $\Delta\phi_{AmplTot}$, each of which must be made negligibly small for the purpose of reducing or eliminating the amplitude related phase error. These functions are for the most part, just as they were for the system of FIG. 11, $\gamma(\tau_{IOC-u}+N\tau_d)$ and $(\tau_{IOC-l}+M\tau_d)$ where N and M equal $-3$, $-2, -1, 1, 2,$ or 3. However, setting $\theta=0°$ makes segment $10^{v'}$ (and any polarization-maintaining optical fiber extension between chip 30 and that segment) in effect an extension of the upper waveguide in chip 30 with the result these complex degree of coherence functions become $\gamma(\tau_{IOC-u}+N\tau_d)$, where $N=-1, 0$ or 1, and $\gamma(\tau_{IOC-l}+M\tau_d)$, where $M=-1$, or 1.

Similarly, in this situation for angle $\theta=0$, the evaluation of the denominator term $\Delta\phi_{AmplTot-d}$ also changes, which value generally would otherwise give a result similar to that for the systems of FIGS. 2 and 11. That is, the "x" axis of optical fiber segment $10^{v'}$ is aligned with the polarization of the electromagnetic waves emanating from chip 30, or with one of the principal birefringent axes of any polarization-maintaining optical fiber extension between chip 30 and segment $10^{v'}$. In that alignment, the denominator term has the complex degree of coherence function in it of $\gamma(\tau_d)$ rather than one having relative polarization component delays depending on multiples of $\tau_d$.

As before for the system of FIG. 11, the numerator complex degree of coherence functions just given above for the system of FIG. 12 must each be kept relatively small by choosing the sum of (i) the difference in propagation times for electromagnetic waves propagating in the transmission and blocking axis of integrated optics chip 30, either $\tau_{IOC-u}$ or $\tau_{IOC-l}$, combined with (ii) the difference in propagation time of such waves in the "x" and "y" axes of segment $10''''$ (other than the situation of $N=0$ where just $\tau_{IOC-u}$ need meet this criterion), at values for which these complex degree of coherence functions are negligibly small. Also simultaneously, to avoid signal fading, source complex degree of coherence function $\gamma(\tau_d)$ must be kept at a small value by choosing the propagation time difference of electromagnetic waves in the "x" and "y" axes of segment $10''''$, $\tau_d$, to have values such that this complex degree of coherence function is negligibly small.

These requirements provide an advantage for the system of FIG. 12 for this situation in which $\theta=0°$ since fewer relative polarization component delay values need be located between adjacent peaks in the source complex degree of coherence function. Such a result is in contrast to the relatively many delay values required to be located between such peaks in the systems of FIGS. 2, 6, 7, 8, 9, 10A, 10B and 11. This locating of fewer delays between adjacent peaks of this function is more easily accomplished because fewer conditions have to be met by such a system to satisfactorily reduce errors.

Hence, as above, optical integrated chip 30 must again be chosen in the system of FIG. 12 by size and waveguide construction to have a certain difference in time between electromagnetic waves propagating therethrough in the blocking and transmission waveguides thereof, as must the length of polarization-maintaining optical fiber for segments 10'''' and 10$^{v}$ to set the total delay time between waves propagating in the fast and slow axes thereof. This chip 30 time delay and the delays resulting from the lengths chosen for polarization-maintaining optical fiber sections 10'''' and 10$^{v'}$ must be such that $\tau_{IOC-u}N\tau_d$ and $\tau_{IOC-l}M\tau_d$ have values along the time delay axis over which the complex degree of coherence of source 11 is measured that fall between the peaks of that function where it has relatively low values.

Along these lines, the size of integrated optics chip 30 (or chip 30 plus appropriate polarization-maintaining optical fiber extensions from the waveguides therein), insofar as the relative polarization component delays therethrough given the waveguide construction therein, is chosen for the system of FIG. 12 with $\theta \neq 0$ such that $\tau_{IOC-u}$ and $\tau_{IOC-l}$ are each a multiple of a retardation interval (assuming as we have that the intervals are of equal duration), or $\tau_{IOC-u} = m_1\tau_r$ and $\tau_{IOC-l} = m_2\tau_r$. As before, $\tau_d$ is then chosen as a fraction of a retardation interval, or $\tau_d = m_3\tau_r$ where $m_3$ is a fraction, with $m_3 = \frac{1}{4}$ being a good choice in the situation for $\theta \neq 0°$. Again, $m_1$ and $m_2$ may be set each equal to 2 to be certain that the amplitude phase error is sufficiently reduced even though difficulties unaccounted for the in above analysis occur.

In the situation of $\theta = 0$, $\tau_{IOC-2}$ effectively increases to include the relative polarization component delay of segment 10$^{v'}$. In this circumstance, a good choice for $\tau_{IOC-u}$ is an integer multiple of a retardation interval plus or minus a quarter of such an interval with $\tau_{IOC-l}$ being an integer multiple of such a retardation interval. Once again, $\tau_d$ is chosen as a fraction of a retardation interval, here a half of such an interval. Again, the integer multiple associated with the choices of $\tau_{IOC-u}$ and $\tau_{IOC-l}$ may be chosen to be greater than one to be assured that the amplitude phase error is sufficiently small.

As in the system of FIG. 11, some of the optical losses in the system of FIG. 12 may be polarization dependent, and so again additional amplitude phase error terms will become significant and appear in the equation for $\Delta\phi_{AmplTot-as}$ which can be obtained for the system of FIG. 12 although not set out here. The dominant additional term will have the form $$(A_c^* C_c + B_c^* D_c)\frac{P_u - P_v}{P_u} k\epsilon\gamma(\tau_{IOC-l})$$

for any value of $\theta$.

As indicated above, if the delay time $\tau_{IOC-l}$ associated with the lower waveguide branch of chip 30 is set equal to a multiple of a retardation interval in the source complex degree of coherence function as suggested above, this additional error term will be significant in the circumstances since the complex degree of coherence function involved will be relatively large. Hence, setting delay time $\tau_{IOC-l}$ equal to a multiple of the source retardation interval greater than one will substantially reduce this source of error because of the significant diminution in peak values with increasing multiples of the retardation interval in the source complex degree of coherence function.

Here also, the system of FIG. 12 can exhibit the intensity type of phase error and, again, finding the total intensity type related error, $\Delta\phi_{IntenTot}$, across at least the spectral width of source 11 requires once more evaluating the general expression therefor given above specifically representing this system. This is achieved by again substituting the corresponding transfer matrix elements therein.

Such an analysis, based on substitutions of the appropriate transfer matrix elements, again proceeds much as the analysis did in the determination of the amplitude related phase error for the system of FIG. 2. Here too, the steps in this analysis will not be repeated as the phase error related to intensity turns out to be relatively insignificant. Assuming the relative polarization component delays are chosen as suggested above, just a single term in the resulting equation found for the intensity error has again the potential to give a magnitude which could be sufficiently large to add appreciably to the total phase error. However, the term differs depending on whether $\theta = 0$ or $\theta \neq 0$. In the situation of $\theta \neq$, that term is of the form $$\Delta\phi_{IntenTot} = 4\epsilon^2 \frac{P_{PolTran-in} - P_{PolBlock-in}}{P_{PolTran-in}}\Delta\psi\gamma(\tau_{IOC-u} - \tau_{IOC-l}),$$

where again $\epsilon$ is the extinction ratio for the polarization effect in chip 30 whether due to a specific polarization structure 35 or the inherent polarization properties of the waveguides in chip 30. The symbol here again represents the misalignment of the 45° splice in the depolarizer 10', this splice having the angular relationship between principle birefringent axes of the polarization-maintaining fiber lengths on either side thereof of 45° $+\Delta\psi$. If, alternatively, the value of $\theta \neq 0$, the term has the form $$\Delta\phi_{IntenTot} =$$
$$\epsilon^2 \frac{P_{PolTran-in} - P_{PolBlock-in}}{P_{PolTran-in}}\gamma(\tau_{IOC-u} - \tau_{IOC-l} \pm \tau_d)$$

As can be seen, the magnitude of the intensity error $\theta \neq 0$ will depend on the quality of polarizer 35 (or of the inherent polarization of the waveguides in chip 30), represented in the last equation by its extinction coefficient $\epsilon$, the amount of misalignment error $\gamma\psi$, and the source coherence function $\gamma(\tau_{IOC-u} - \tau_{IOC-l})$ with the polarization components represented thereby having a difference in the relative polarization component delays through the upper and lower branches of the waveguides in chip 30. Because the extinction ratio for polarizer 35 (or the waveguides of chip 30) appears in the last equation for the intensity error as the square thereof, a well designed polarizer having its extinction coefficient on the order of 60 db here also permits $\Delta\psi$ to be on the order of several degrees and still result in the intensity error being negligible. The presence of the source coherence function will not reinforce this tolerance for the suggested values for $\tau_{IOC-u}$ and $\tau_{IOC-l}$ given above as being equal.

In the situation of $\theta = 0$, the source coherence function for the values suggested above for $\tau_{IOC-u}$ and $\tau_{IOC-l}$ will reinforce the error suppression provided by polarizer 15 since its typical value will be quite low. Thus, this additional error suppression would aid in permitting use of a lesser quality polarizer.

Although the present invention has been described with reference to preferred embodiments, workers skilled in the art will recognize that changes may be made in form and detail without departing from the spirit and scope of the invention.

What is claimed is:

1. A rotation sensor capable of sensing rotation about an axis of a coiled optical fiber, said sensing based on electromagnetic waves propagating in opposite directions in said coiled optical fiber to impinge on a photodetector with a phase relationship, said rotation sensor comprising:

a source capable of supplying an emitted electromagnetic wave characterized by an autocorrelation relationship over relative retardation time having therein a succession of peak values each separated from any other peak value adjacent thereto in said succession by a corresponding retardation interval, said autocorrelation relationship, for at least a plurality of initial ones of said retardation intervals, having values during a fraction of each that are relatively smaller than those said peak values thereof correspondingly adjacent to such retardation interval fractions;

a loop coupler having a pair of ports on a loop side thereof, and at least one port on a source side thereof, such that electromagnetic waves, occurring at said source side port, are substantially transmitted through a coupling region in said loop coupler to thereafter occur at least in part at both of said loop side ports, and such that electromagnetic waves, occurring at said loop side ports, are substantially transmitted through said coupling region to thereafter occur at least in part at said source side port;

a first coupling means for coupling said pair of loop side ports of said loop coupler to corresponding ends of said coiled optical fiber such that electromagnetic waves, occurring at said loop side ports, are substantially transmitted to said coiled optical fiber to result in electromagnetic waves propagating through said coiled optical fiber in opposite directions, a selected one of said first coupling means and said coiled optical fiber further comprising a first depolarizer positioned therein so that electromagnetic waves propagating in opposite directions in said coiled optical fiber propagate therethrough such that an electromagnetic wave polarization component entering said first depolarizer has at least portions thereof exiting said first depolarizer at times differing by at least a first depolarizer base differential propagation time delay;

a polarizer having first and second ports each with a corresponding pair of principle polarization axes such that polarized electromagnetic waves, occurring along a transmission axis of said pair of principle polarization axes of one of said first and second ports thereof, are substantially transmitted to result in polarized electromagnetic waves appearing along said transmission axis of that remaining one of said ports, and such that polarized electromagnetic waves, occurring along a blocking axis of said pair of principle polarization axes of one of said first and second ports thereof, are substantially blocked from being transmitted to that corresponding said blocking axis of that remaining one of said ports but, to that extent to which such polarized electromagnetic waves are transmitted to that remaining port blocking axis, there is a polarizer differential propagation time delay separating them and corresponding polarized electromagnetic waves appearing along said transmission axis of that said port, said polarizer differential propagation time delay and said first depolarizer base differential propagation time delay having values selected therefor such that selected sums of electromagnetic wave polarization components differential propagation time delays through birefringent optical path components in those optical paths followed by electromagnetic waves in propagating through said coiled optical fiber after emission from said source, including said polarizer and said first depolarizer, differ substantially from delay values occurring at ends of any of an initial five of said retardation intervals beginning from delay value zero;

a second coupling means coupling said first port of said polarizer to said source such that electromagnetic waves, emitted by said source, occur along at least said transmission principle polarization axis of said first port; and a third coupling means coupled at one end thereof to said second port of said polarizer and being coupled at an opposite end thereof to said source side port of said loop coupler and capable of permitting electromagnetic waves to propagate therethrough between said ends thereof.

2. The apparatus of claim 1 wherein said second coupling means comprises at least a portion of a second depolarizer positioned between said polarizer first port and said source to permit electromagnetic waves to propagate therethrough, and which is one of said selected birefringent optical path components.

3. The apparatus of claim 1 wherein said third coupling means comprises at least a portion of a second depolarizer positioned between said ends thereof to permit electromagnetic waves to propagate therethrough, and which is one of said selected birefringent optical path components.

4. The apparatus of claim 1 wherein said first depolarizer base differential propagation time delay has a value selected such that said first depolarizer base differential propagation time delay and multiples thereof less than four differ substantially from delay values occurring at ends of said initial five retardation intervals.

5. The apparatus of claim 1 wherein said selected sums of electromagnetic wave polarization components differential propagation time delays through said birefringent optical path components in said optical paths comprise sums of (i) said polarizer differential propagation time delay, and (ii) N times said first depolarizer base differential propagation time delay where N is an integer having an absolute value of three or less but greater than zero.

6. The apparatus of claim 1 wherein said polarizer has polarization-maintaining optical fiber extensions coupling said first and second ports thereof to remaining portions thereof.

7. The apparatus of claim 1 wherein said first depolarizer is formed of a pair of polarization-maintaining optical fiber segments each having a pair of principle birefringent axes with said segments spliced together in a splice such that said pair of principle birefringent axes of each segment are oriented at substantially equal angles to those of that segment on an opposite side of said splice, with one of said pair of segments being sufficiently long to provide said first depolarizer base differential propagation time between corresponding polarization components of electromagnetic waves propagating therethrough, and with that remaining said segment in said pair thereof being substantially twice as long.

8. The apparatus of claim 1 wherein said coiled optical fiber is formed of ordinary single mode optical fiber other than said first depolarizer if present therein.

9. The apparatus of claim 1 wherein said third coupling means is formed of ordinary single mode optical fiber.

10. The apparatus of claim 1 wherein said first coupling means also comprises at least one phase modulator.

11. The apparatus of claim 1 wherein said loop coupler, said third coupling means and said polarizer are formed in an integrated optics chip, and wherein said first coupling means also comprises at least one phase modulator also formed in said integrated optics chip.

12. The apparatus of claim 1 wherein said loop coupler is formed in an integrated optics chip with said polarizer being formed by waveguides in said chip which are inherently polarizing of electromagnetic waves propagating therethrough and with said third coupling means being a portion of such a waveguide, and wherein said first coupling means also comprises at least one phase modulator also formed in said integrated optics chip.

13. The apparatus of claim 2 wherein at least portions of components of corresponding polarized electromagnetic waves exiting from said second depolarizer after passing therethrough have at least a second depolarizer base differential propagation time delay separating them.

14. The apparatus of claim 2 wherein said third coupling means comprises at least a portion of a third depolarizer positioned between said ends thereof to permit electromagnetic waves to propagate therethrough, and which is one of said selected birefringent optical path component.

15. The apparatus of claim 3 wherein at least portions of components of corresponding polarized electromagnetic waves exiting from said second depolarizer after passing therethrough have at least a second depolarizer base differential propagation time delay separating them.

16. The apparatus of claim 5 wherein said polarizer differential propagation time delay is substantially equal to m times a said retardation interval where m is an integer less than five including zero.

17. The apparatus of claim 5 wherein said polarizer differential propagation time delay is substantially equal to a delay value occurring within any of said initial five retardation intervals other than delay values occurring at substantially any ends thereof.

18. The apparatus of claim 5 wherein said first depolarizer base differential propagation time delay is substantially equal to m times a said retardation interval where m is a fraction less than one.

19. The apparatus of claim 13 wherein said second coupling means further comprises a source coupler having a pair of ports on a source side thereof, and at least one port on a loop side thereof, such that electromagnetic waves, occurring at said loop side port, are substantially transmitted through a coupling region in said source coupler to thereafter occur at least in part at both of said source side ports, and such that electromagnetic waves, occurring at said source side ports, are substantially transmitted through said coupling region to thereafter occur at least in part at said loop side port, said source coupler being formed of ordinary single mode optical fiber.

20. The apparatus of claim 13 wherein said selected sums of electromagnetic wave polarization components differential propagation time delays through said birefringent optical path components in said optical paths comprise sums of (i) said polarizer differential propagation time delay, and (ii) M times said second depolarizer base differential propagation time delay where M is an integer having an absolute value of one, and (iii) N times said first depolarizer base differential propagation time delay where N is an integer having an absolute value of three or less but greater than zero.

21. The apparatus of claim 14 wherein at least portions of components of corresponding polarized electromagnetic waves exiting from said second depolarizer after passing therethrough have at least a second depolarizer base differential propagation time delay separating them, and wherein at least portions of components of corresponding polarized electromagnetic waves exiting from said third depolarizer after passing therethrough have at least a third depolarizer base differential propagation time delay separating them.

22. The apparatus of claim 15 wherein said second depolarizer comprises a length of polarization-maintaining optical fiber abutting said polarizer second port with its principle axes of birefringence oriented to be at substantially equal angles with said polarizer transmission axis at said second port.

23. The apparatus of claim 15 wherein said selected sums of electromagnetic wave polarization components differential propagation time delays through said birefringent optical path components in said optical paths comprise sums of (i) said polarizer differential propagation time delay, and (ii) M times said second depolarizer base differential propagation time delay where M is an integer having an absolute value of one, and (iii) N times said first depolarizer base differential propagation time delay where N is an integer having an absolute value of three or less but greater than zero.

24. The apparatus of claim 17 wherein said polarizer differential propagation time delay is substantially equal to a delay value occurring halfway between that pair of ends of a selected one of said initial five retardation intervals.

25. The apparatus of claim 19 wherein said second depolarizer comprises a length of polarization-maintaining optical fiber abutting said source with its principle axes of birefringence oriented to be at substantially equal angles with said source uncorrelated emission axes, and also spliced to a said source side coupler port of said source coupler.

26. The apparatus of claim 19 wherein said second depolarizer comprises a length of polarization-maintaining optical fiber abutting said polarizer first port with its principle axes of birefringence oriented to be at substantially equal angles with said polarizer transmission axis at said first port, and also spliced to said loop side port of said source coupler.

27. The apparatus of claim 20 wherein said polarizer differential propagation time delay is substantially equal to m times a said retardation interval where m is an integer less than five.

28. The apparatus of claim 20 wherein said polarizer differential propagation time delay is substantially equal to m times a said retardation interval where m is a mixed number less than five.

29. The apparatus of claim 20 wherein said second depolarizer base differential propagation time delay is substantially equal to m times a said retardation interval where m is an integer less than five.

30. The apparatus of claim 20 wherein said first depolarizer base differential propagation time delay is substantially equal to m times a said retardation interval where m is a fraction less than one.

31. The apparatus of claim 21 wherein said second coupling means further comprises a source coupler having a pair of ports on a source side thereof, and at least one port on a loop side thereof, such that electromagnetic waves, occurring at said loop side port, are substantially transmitted through a coupling region in said source coupler to thereafter occur at least in part at both of said source side ports, and such that electromagnetic waves, occurring at said source side ports, are substantially transmitted through said coupling region to thereafter occur at least in part at said loop side port, said source coupler being formed of ordinary single mode optical fiber.

32. The apparatus of claim 21 wherein said third depolarizer comprises a length of polarization-maintaining optical fiber abutting said polarizer second port with its principle axes of birefringence oriented to be at substantially equal angles with said polarizer transmission axis at said second port.

33. The apparatus of claim 21 wherein said selected sums of electromagnetic wave polarization components differential propagation time delays through said birefringent optical path components in said optical paths comprise sums of (i) said polarizer differential propagation time delay, and (ii) $M_1$ times said second depolarizer base differential propagation time delay where $M_1$ is an integer having an absolute value of one or zero, and (iii) $M_2$ times said third depolarizer base differential propagation time delay where $M_2$ is an integer having an absolute value of one or zero, and (iii) N times said first depolarizer base differential propagation time delay where N is an integer having an absolute value of three or less but greater than zero.

34. The apparatus of claim 23 wherein said polarizer differential propagation time delay is substantially equal to m times a said retardation interval where m is an integer less than five.

35. The apparatus of claim 23 wherein said polarizer differential propagation time delay is substantially equal to m times a said retardation interval where m is a mixed number less than five.

36. The apparatus of claim 23 wherein said second depolarizer base differential propagation time delay is substantially equal to m times a said retardation interval where m is an integer less than five.

37. The apparatus of claim 23 wherein said first depolarizer base differential propagation time delay is substantially equal to m times a said retardation interval where m is a fraction less than one.

38. The apparatus of claim 31 wherein said second depolarizer comprises a length of polarization-maintaining optical fiber abutting said source with its principle axes of birefringence oriented to be at substantially equal angles with said source uncorrelated emission axes, and also spliced to a said source side coupler port of said source coupler.

39. The apparatus of claim 31 wherein said second depolarizer comprises a length of polarization-maintaining optical fiber abutting said polarizer first port with its principle axes of birefringence oriented to be at substantially equal angles with said polarizer transmission axis at said first port, and also spliced to said loop side port of said source coupler.

40. The apparatus of claim 33 wherein said polarizer differential propagation time delay is substantially equal to m times a said retardation interval where m is an integer less than five.

41. The apparatus of claim 33 wherein said second depolarizer base differential propagation time delay is substantially equal to m times a said retardation interval where m is an integer less than five.

42. The apparatus of claim 33 wherein said third depolarizer base differential propagation time delay is substantially equal to m times a said retardation interval where m is an integer less than five.

43. The apparatus of claim 33 wherein said first depolarizer base differential propagation time delay is substantially equal to m times a said retardation interval where m is a fraction less than one.

* * * * *